United States Patent
Goss et al.

(10) Patent No.: US 9,667,425 B2
(45) Date of Patent: May 30, 2017

(54) METHODS, APPARATUS, AND SYSTEMS FOR SECURE DEMAND PAGING AND OTHER PAGING OPERATIONS FOR PROCESSOR DEVICES

(71) Applicant: TEXAS INSTRUMENTS INCORPORATED, Dallas, TX (US)

(72) Inventors: Steven Goss, Addison, TX (US); Gregory Remy Philippe Conti, Saint Paul (FR); Narendar M. Shankar, San Jose, CA (US); Mehdi-Laurent Akkar, Paris (FR); Aymeric Vial, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 108 days.

(21) Appl. No.: 14/458,571

(22) Filed: Aug. 13, 2014

(65) Prior Publication Data

US 2015/0033038 A1 Jan. 29, 2015

Related U.S. Application Data

(62) Division of application No. 13/345,484, filed on Jan. 6, 2012, now Pat. No. 8,812,804, which is a division (Continued)

(51) Int. Cl.
*H04L 9/32* (2006.01)
*G06F 12/14* (2006.01)
(Continued)

(52) U.S. Cl.
CPC ........ *H04L 9/3236* (2013.01); *G06F 9/45558* (2013.01); *G06F 9/461* (2013.01);
(Continued)

(58) Field of Classification Search
None
See application file for complete search history.

(56) References Cited

U.S. PATENT DOCUMENTS 4,758,944 A 7/1988 Bartley et al.
4,987,595 A 1/1991 Marino et al.
(Continued)

FOREIGN PATENT DOCUMENTS

EP 1429224 6/2004

OTHER PUBLICATIONS

Suh, et al., "Efficient Memory Integrity Verification and Encryption for Secure Processors", IEEE Computer Society 36th International Symposium on Microarchitecture, Dec. 3-5, 2003.

(Continued)

*Primary Examiner* — Denise Tran
(74) *Attorney, Agent, or Firm* — Ronald O. Neerings; Charles A. Brill; Frank D. Cimino

(57) ABSTRACT

A secure demand paging system includes a processor operable for executing instructions, an internal memory for a first page in a first virtual machine context, an external memory for a second page in a second virtual machine context, and a security circuit coupled to the processor and to the internal memory for maintaining the first page secure in the internal memory. The processor is operable to execute sets of instructions representing: a central controller, an abort handler coupled to supply to the central controller at least one signal representing a page fault by an instruction in the processor, a scavenger responsive to the central controller and operable to identify the first page as a page to free, a virtual machine context switcher responsive to the central controller to change from the first virtual machine context to the second virtual machine context; and a swapper manager operable to swap in the second page from the external (Continued)

memory with decryption and integrity check, to the internal memory in place of the first page.

56 Claims, 24 Drawing Sheets

Related U.S. Application Data of application No. 11/426,597, filed on Jun. 27, 2006, now Pat. No. 8,108,641.

(51) Int. Cl.

| G06F 21/57 | (2013.01) |
|---|---|
| G06F 21/79 | (2013.01) |
| H04L 29/06 | (2006.01) |
| H04L 12/06 | (2006.01) |
| G06F 12/08 | (2016.01) |
| H04L 9/08 | (2006.01) |
| G06F 9/455 | (2006.01) |
| G06F 9/46 | (2006.01) |
| G06F 12/02 | (2006.01) |
| H04W 12/06 | (2009.01) |

(52) U.S. Cl.
CPC ........ *G06F 12/0246* (2013.01); *G06F 12/145* (2013.01); *G06F 12/1408* (2013.01); *G06F 12/1483* (2013.01); *G06F 21/575* (2013.01); *G06F 21/79* (2013.01); *H04L 9/0897* (2013.01); *H04L 63/18* (2013.01); *H04L 63/20* (2013.01); *H04W 12/06* (2013.01); *G06F 12/08* (2013.01); *G06F 2009/45583* (2013.01); *G06F 2009/45587* (2013.01); *G06F 2212/171* (2013.01); *G06F 2212/402* (2013.01); *G06F 2212/7201* (2013.01); *Y02B 60/1225* (2013.01)

(56) References Cited

U.S. PATENT DOCUMENTS

| 5,321,836 | A | | 6/1994 | Crawford et al. |
|---|---|---|---|---|
| 5,396,614 | A | | 3/1995 | Khalidi et al. |
| 5,680,568 | A | | 10/1997 | Sakamura |
| 5,757,919 | A | | 5/1998 | Herbert et al. |
| 5,917,912 | A | | 6/1999 | Ginter et al. |
| 6,003,117 | A | | 12/1999 | Buer et al. |
| 6,021,201 | A | * | 2/2000 | Bakhle ............ H04L 9/3239 380/269 |
| 6,128,713 | A | | 10/2000 | Eisler et al. |
| 6,201,871 | B1 | | 3/2001 | Bostley, III et al. |
| 6,223,263 | B1 | | 4/2001 | Mathews et al. |
| 6,233,430 | B1 | * | 5/2001 | Helferich ............ H04W 84/025 340/7.21 |
| 6,282,605 | B1 | | 8/2001 | Moore |
| 6,363,410 | B1 | | 3/2002 | Kanamori et al. |
| 6,385,727 | B1 | | 5/2002 | Cassagnol et al. |
| 6,397,331 | B1 | | 5/2002 | Ober et al. |
| 6,480,950 | B1 | | 11/2002 | Lyubashevskiy et al. |
| 6,643,742 | B1 | | 11/2003 | Vidwans et al. |
| 6,708,274 | B2 | | 3/2004 | Herbert et al. |
| 6,854,046 | B1 | | 2/2005 | Evans et al. |
| 7,013,484 | B1 | | 3/2006 | Ellison et al. |
| 7,111,145 | B1 | | 9/2006 | Chen et al. |
| 2002/0099946 | A1 | | 7/2002 | Herbert et al. |
| 2002/0129245 | A1 | | 9/2002 | Cassagnol et al. |
| 2003/0056107 | A1 | | 3/2003 | Cammack et al. |
| 2003/0133574 | A1 | | 7/2003 | Caronni et al. |
| 2003/0140205 | A1 | | 7/2003 | Dahan et al. |
| 2003/0140244 | A1 | | 7/2003 | Dahan et al. |
| 2003/0140245 | A1 | | 7/2003 | Dahan et al. |
| 2004/0025010 | A1 | | 2/2004 | Azema et al. |
| 2004/0054907 | A1 | | 3/2004 | Chateau et al. |
| 2004/0186994 | A1 | | 9/2004 | Herbert et al. |
| 2005/0086436 | A1 | | 4/2005 | Modha |
| 2005/0235114 | A1 | | 10/2005 | Megiddo et al. |
| 2005/0239494 | A1 | | 10/2005 | Klassen et al. |
| 2005/0268092 | A1 | * | 12/2005 | Shankar ............ G06F 21/575 713/164 |
| 2005/0268095 | A1 | | 12/2005 | O'Connor |
| 2007/0061581 | A1 | | 3/2007 | Holtzman et al. |
| 2007/0061597 | A1 | | 3/2007 | Holtman et al. |

OTHER PUBLICATIONS

Baron, "Five Chips from TI—or, Is It Six?", Microprocessor Report, In-Stat/MDR, Mar. 17, 2003.

"VM/386 Technical Specifications"and "IGC Corporate History", www. igcinc.com/vmspecs.html, 5 pp., date unknown.

Claessens, et al., "How Can Mobile Agents Do Secure Electronic Transactions on Untrusted Hosts? A Survey of the Security Issue and the Current Solutions", ACM Transactions on Internet Technology, Feb. 2003, Sections 3.2-3.4.

Clarke, et al., "Incremental Multiset Hash Functions and Their Application to Memory Integrity Checking", In Technical Report MIT-LCS-TR-899, May 2003, pp. 1-20.

Lie, et al., "Architectural Support for Copy and Tamper Resistant Software", In Proceedings of the 9th International Conference on Architectural Support for Programming Languages and Operating Systems (ASPLOS-IX), Nov. 2000, pp. 169-177.

Smith, et al., "Building a High-Performance, Programmable Secure Coprocessor", In Computer Networks (Special Issue on Computer Network Security), vol. 31, Apr. 1999, pp. 831-860.

Suh, et al., "AEGIS: Architecture for Tamper-Evident and Tamper-Resistant Processing", In Proceedings of the 17th International Conference on Supercomputing, Jun. 2003, pp. 160-171.

\* cited by examiner

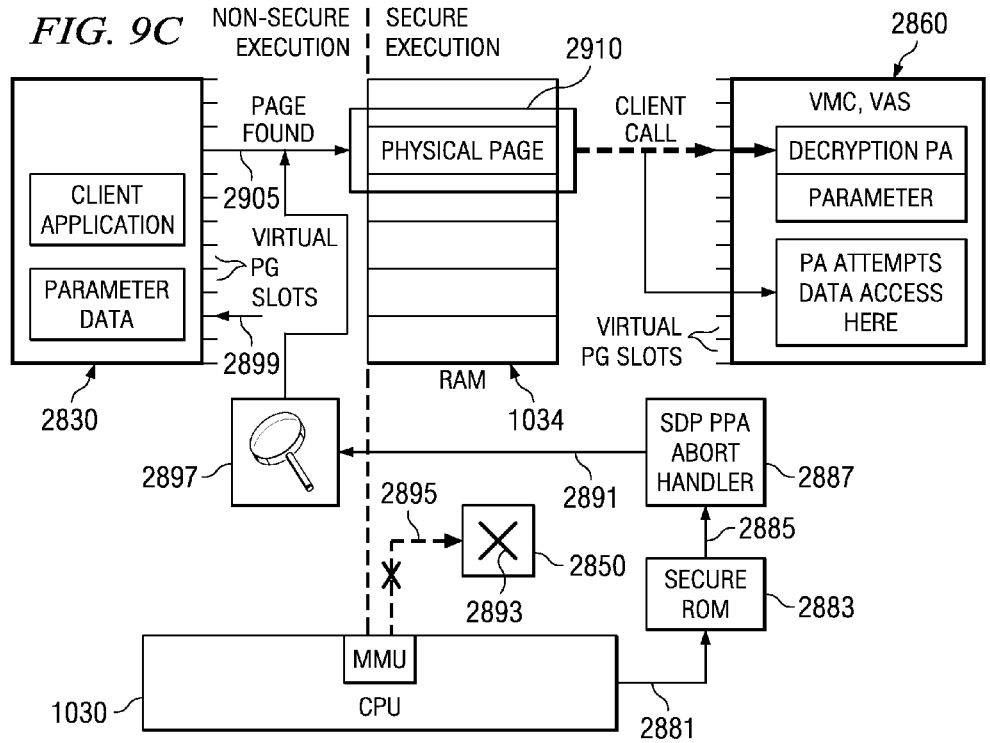
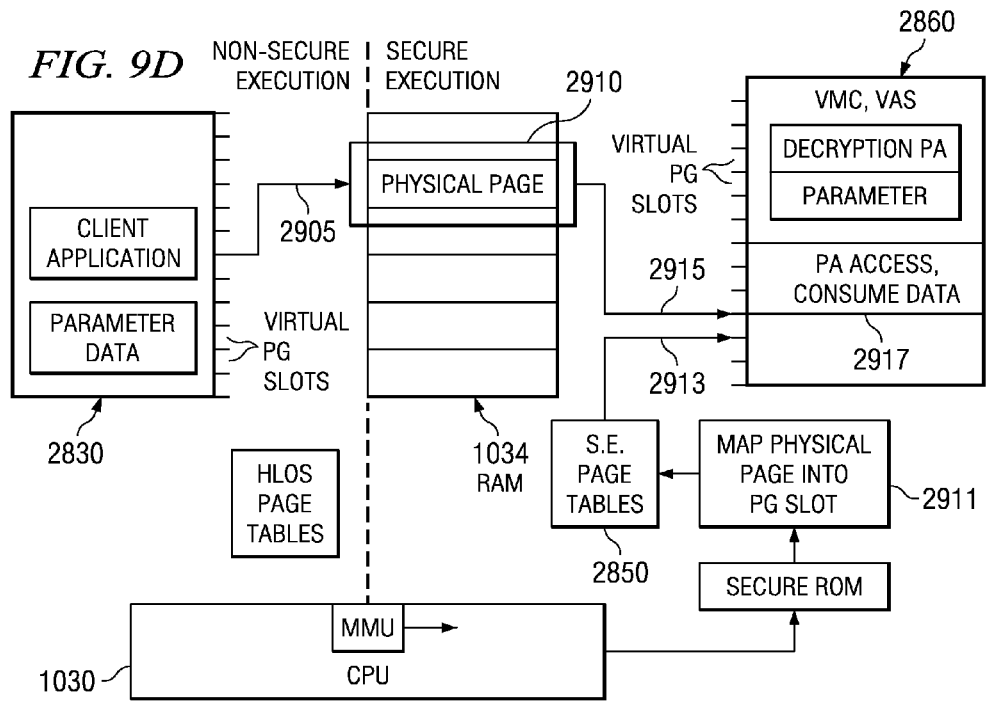

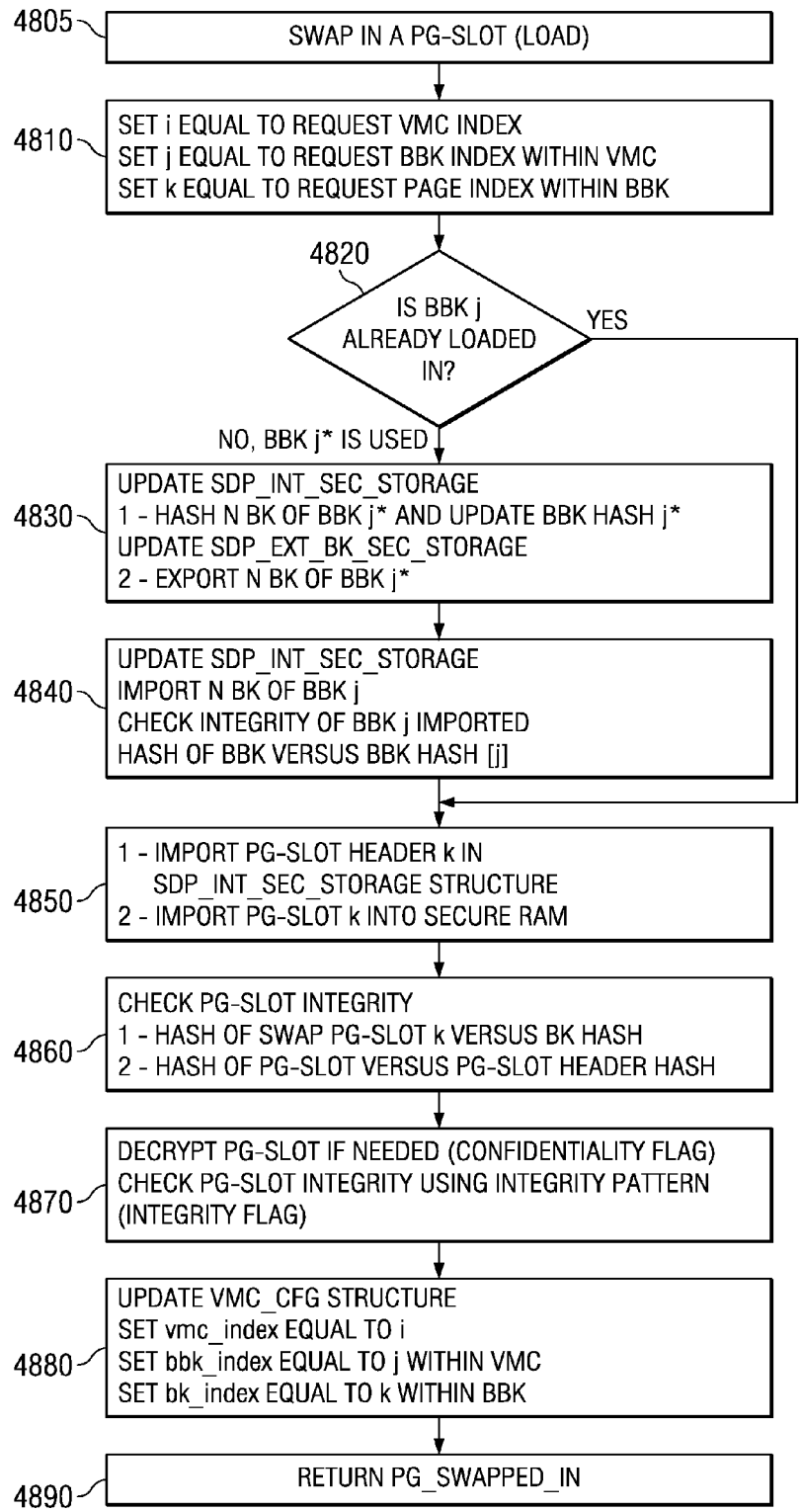

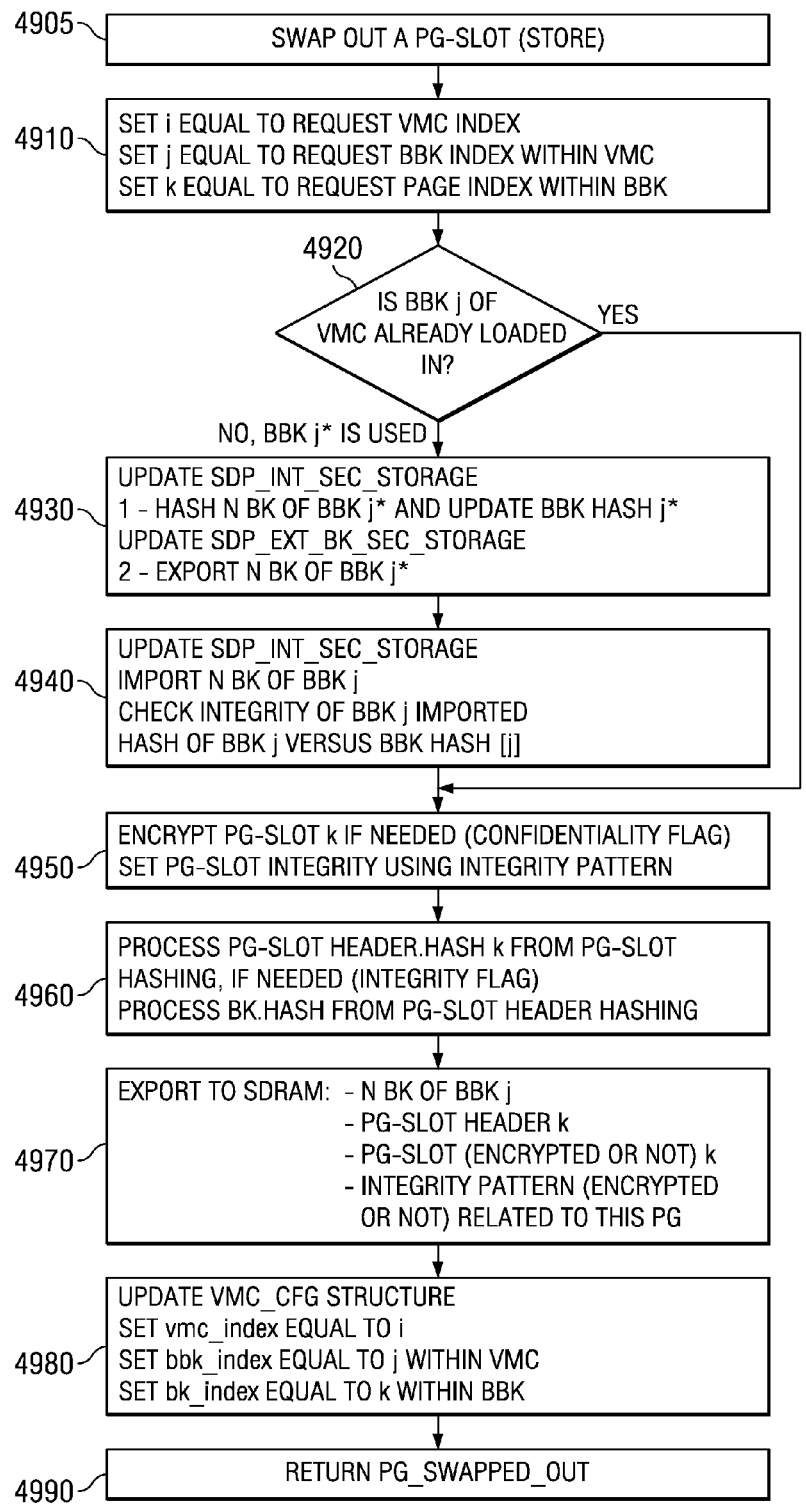

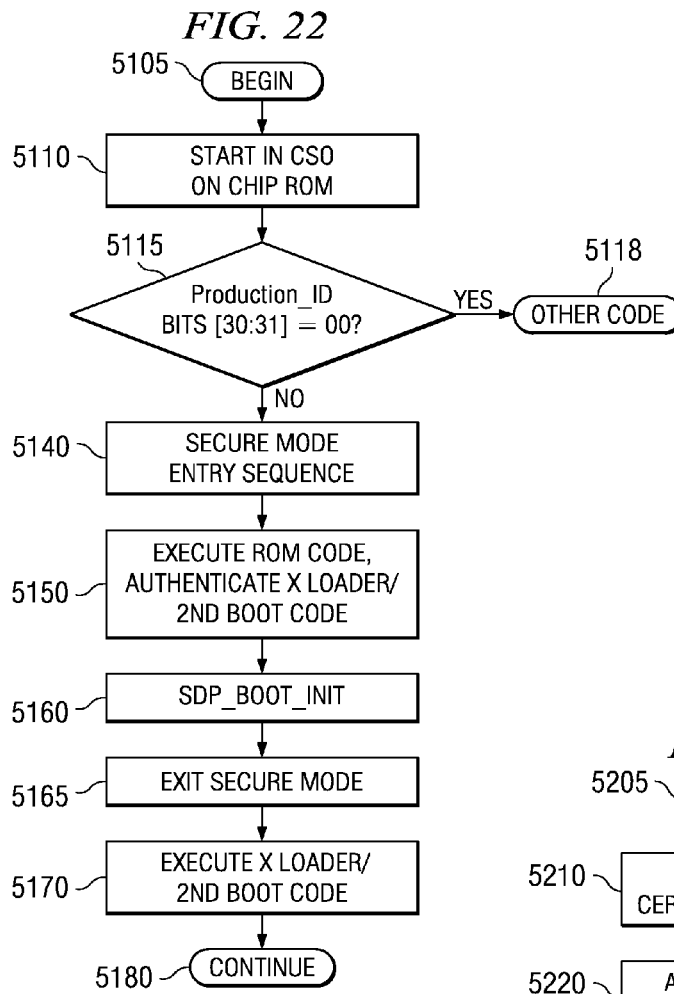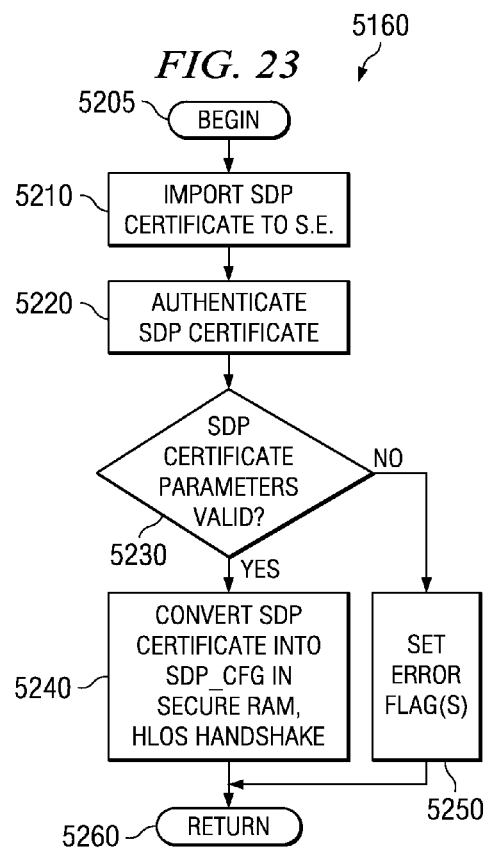

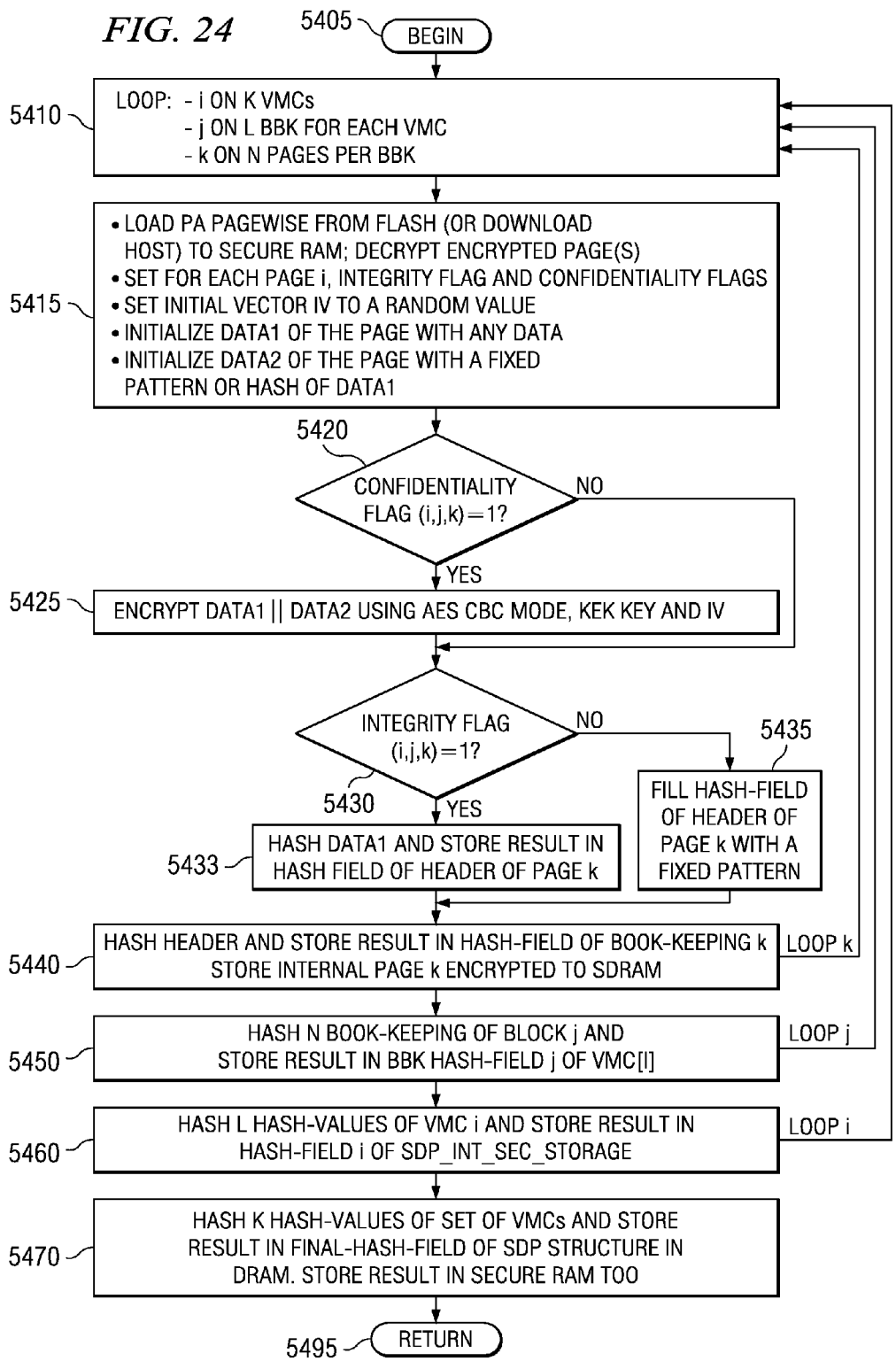

METHODS, APPARATUS, AND SYSTEMS FOR SECURE DEMAND PAGING AND OTHER PAGING OPERATIONS FOR PROCESSOR DEVICES

CLAIM OF PRIORITY

This application is a divisional of application Ser. No. 13/345,484, filed Jan. 6, 2012, now U.S. Pat. No 8,812,804, which is a divisional of and incorporates by reference application Ser.No. 11/426,597, filed Jun. 27, 2006, now U.S. Pat. No. 8,108,641, entitled "Methods, Apparatus, and Systems for Secure Demand Paging and Other Paging Operations for Processor Devices".

CROSS-REFERENCE TO RELATED APPLICATIONS

This patent application is related to provisional application TI-38213PS, U.S. Ser. No. 60/561,130, filed Apr. 8, 2004, entitled "Methods, Apparatus, and Systems for Secure Demand Paging for Processor Devices" of Steven C. Goss and Narendar Shankar which is hereby incorporated herein by reference.

This patent application incorporates herein by reference the following U.S. patent applications, U.S. Ser. No. 11/100,689 filed Apr. 7, 2005, now U.S. Pat. No. 8,239,673, entitled "Methods, Apparatus and Systems with Loadable Kernel Architecture for Processors"; U.S. Ser. No. 11/100,690 filed Apr. 7, 2005, now U.S. Pat. No. 7,940,932, entitled "Methods, Apparatus, and Systems for Securing SIM (Subscriber Identity Module) Personalization and Other Data on a First Processor and Secure Communication of the SIM Data to a Second Processor"; U.S. Ser. No. 10/915,830 filed Aug. 10, 2004, now U.S. Pat. No. 8,112,618, entitled "Less Secure Processors, Integrated Circuits, Wireless Communication Apparatus, Methods and Processes of Making"; and U.S. Ser. No. 11/426,598, now abandoned, entitled "Page Processing Circuits, Devices, Methods and Systems for Secure Demand Paging and Other Operations"

STATEMENT REGARDING FEDERALLY SPONSORED RESEARCH OR DEVELOPMENT

Not applicable.

BACKGROUND OF THE INVENTION

This invention is in the field of electronic computing hardware and software and communications, and is more specifically directed to improved processes, circuits, devices, and systems for page processing and other information and communication processing purposes, and processes of making them. Without limitation, the background is further described in connection with demand paging for communications processing.

Wireline and wireless communications, of many types, have gained increasing popularity in recent years. The personal computer with a wireline modem such as DSL (digital subscriber line) modem or cable modem communicates with other computers over networks. The mobile wireless (or "cellular") telephone has become ubiquitous around the world. Mobile telephony has recently begun to communicate video and digital data, and voice over packet (VoP or VoIP), in addition to cellular voice. Wireless modems, for communicating computer data over a wide area network, using mobile wireless telephone channels and techniques are also available.

Wireless data communications in wireless local area networks (WLAN), such as that operating according to the well-known IEEE 802.11 standard, has become popular in a wide range of installations, ranging from home networks to commercial establishments. Short-range wireless data communication according to the "Bluetooth" technology permits computer peripherals to communicate with a personal computer or workstation within the same room. Numerous other wireless technologies exist and are emerging.

Security techniques are used to improve the security of retail and other business commercial transactions in electronic commerce and to improve the security of communications wherever personal and/or commercial privacy is desirable. Security is important in both wireline and wireless communications.

As computer and communications applications with security become larger and more complex, a need has arisen for technology to inexpensively handle large amounts of software program code and the data in a secure manner such as in pages for those applications and not necessarily require substantial amounts of additional expensive on-chip memory for a processor to handle those applications.

Processors of various types, including DSP (digital signal processing) chips, RISC (reduced instruction set computing) and/or other integrated circuit devices are important to these systems and applications. Constraining or reducing the cost of manufacture and providing a variety of circuit and system products with performance features for different market segments are important goals in DSPs, integrated circuits generally and system-on-a-chip (SOC) design.

Further alternative and advantageous solutions would, accordingly, be desirable in the art.

SUMMARY OF THE INVENTION

Generally and in one form of the invention, a secure demand paging system includes a processor operable for executing instructions, an internal memory for a first page in a first virtual machine context, an external memory for a second page in a second virtual machine context, and a security circuit coupled to the processor and to the internal memory for maintaining the first page secure in the internal memory. The processor operable to execute sets of instructions representing: a central controller, an abort handler coupled to supply to the central controller at least one signal representing a page fault by an instruction in the processor, a scavenger responsive to the central controller and operable to identify the first page as a page to free, a virtual machine context switcher responsive to the central controller to change from the first virtual machine context to the second virtual machine context; and a swapper manager operable to swap in the second page from the external memory with decryption and integrity check, to the internal memory in place of the first page.

Generally, another form of the invention involves a wireless communications unit including a wireless antenna, a wireless transmitter and receiver coupled to the wireless antenna, a DRAM (dynamic random access memory), and a microprocessor. The microprocessor has a secure internal memory and is coupled to at least one of the transmitter and receiver. The microprocessor is operable for multi-threading a secure demand paging process and a non-secure process, and operable to establish page configuration data and to secure demand page between the secure internal memory and the DRAM in response to a page fault in the secure internal memory, and operable to apply confidentiality processing page-specifically when the page configuration data signifies confidentiality for the page, and to apply integrity processing page-specifically when the page configuration data signifies integrity protection for the page. A user interface is coupled to the microprocessor.

Generally, a further form of the invention involves a method of secure demand paging (SDP) for portable telecommunication device having a processor, a secure internal memory, and an external DRAM. The method includes configuring with configuration data indicating pages for confidentiality protection, and pages for integrity protection; multi-threading an SDP process and a non-secure process; executing the SDP process to swap between the external DRAM and the secure internal memory in response to page faults in the secure internal memory so that confidentiality processing is applied specifically to pages for which the configuration data indicates confidentiality protection, and integrity verification is applied specifically to pages for which the configuration data indicates integrity protection; and applying a process for determining when page replacement in the secure internal memory is necessary, and if so then applying a page replacement process for determination of priority for page replacement, that downgrades data pages in priority relative to code pages, downgrades recently loaded or accessed pages in priority relative to earlier loaded or accessed pages, and downgrades dirty pages in priority relative to clean pages in priority for page replacement.

Generally, a yet further form of the invention involves a secure demand paging (SDP) system including a dynamic random access memory (DRAM), a microprocessor having a secure internal memory and coupled to the DRAM, and a non-volatile memory storing a representation of operations accessible by the microprocessor including a coded physical representation of operations to configure an SDP space in the DRAM, to organize the SDP space into virtual machine contexts, to organize at least one of the virtual machine contexts into block book keeping blocks and book keeping spaces in the block book keeping blocks, and to execute a secure demand paging process between the secure internal memory and the DRAM.

Generally, another additional form of the invention involves a demand paging system including a dynamic random access memory (DRAM), a microprocessor for executing a protected application having a secure internal memory having a physical address space and coupled to the DRAM, and a non-volatile memory storing a coded physical representation of operations accessible by the microprocessor and including a coded physical representation of operations to establish a data structure pertaining at least in part to both the secure internal memory and the DRAM, the data structure organizing the protected application in the secure internal memory into virtual pages by a first index for a book keeping element in use, and a second index for a block book keeping block in use, and operations to demand page between the secure internal memory and the DRAM utilizing the data structure.

Generally, a still another form of the invention involves a secure demand paging (SDP) system comprising an external volatile memory, a microprocessor having a secure internal memory having a physical address space and the microprocessor operable for executing at least one protected application in the secure internal memory, and a non-volatile memory storing a coded physical representation of operations accessible by the microprocessor including a representation of operations for run-time initializing SDP including loading a protected application page-wise from the non-volatile memory into the secure internal memory, indexing each page and integrity-flagging pages for which integrity processing is directed, and confidentiality-flagging pages for which confidentiality processing is directed, hashing each integrity-flagged page of the protected application to provide a respective page hash, and encrypting each confidentiality-flagged page together with the respective page hash, providing a header for pages including the page hash, hashing the header, storing the header hash into a hash-field of a book keeping element for the page, and storing each book keeping element and encrypted page into the external volatile memory.

Generally, another further form of the invention involves a secure demand paging (SDP) system including an external volatile memory, an external non-volatile memory storing a coded physical representation of operations accessible by the microprocessor including a representation of operations for an operating system, a client application, an SDP protected application and at least one additional protected application; and a microprocessor having a non-secure memory space and a secure memory space having a physical page space and the microprocessor operable to load the SDP protected application from the external non-volatile memory into a portion of the secure memory protected from unauthorized alteration. The SDP protected application includes an SDP abort handler and a representation of operations to load the additional protected application page-wise from the external non-volatile memory via decryption, authentication, encryption and integrity protection governed by a page-specific confidentiality flag and page-specific integrity flag into the external volatile memory. The microprocessor is further operable to execute an access in non-secure space by the client application directed to the additional protected application, to detect an access abort and to vector the access abort to the SDP abort handler, the SDP protected application including operations to find a pertinent page of the additional protected application in the secure memory and if the page is absent then to load the pertinent page of the additional protected application into the secure memory from the external volatile memory by decryption and authentication governed by the confidentiality flag and the integrity flag, and to initiate re-queue of the access to the pertinent page in the secure memory.

Generally, a yet further form of the invention involves an article including a storage medium and a coded physical representation established in the storage medium to represent electronic processor operations including operations for an operating system, a client application, a secure demand paging (SDP) protected application and at least one additional protected application, the SDP protected application including an SDP abort handler and a representation of operations to memory-save the additional protected application page-wise via decryption, authentication, encryption and integrity protection governed by a page-specific confidentiality flag and page-specific integrity flag; the client application including a representation of an access directed to a pertinent page of the additional protected application, the operating system including a representation of an access abort detection and an operation to vector access abort to the SDP abort handler, the SDP protected application further including a representation of an operation to search for the pertinent page of the protected application, a load of a pertinent page of the protected application by decryption and authentication governed by the confidentiality flag and the integrity flag, and re-queue of the access to the pertinent page.

Generally, a further additional form of the invention involves a secure demand paging (SDP) system including an external volatile memory, a microprocessor coupled to the external volatile memory, the microprocessor having a secure internal memory having a physical address space, and the microprocessor operable for executing at least one protected application in the secure internal memory; and a non-volatile memory storing a coded physical representation of operations accessible by the microprocessor including a representation of operations to establish a code page, a data page, and a stack in the secure internal memory and further to establish a secure demand paging configuration in the secure internal memory, the configuration including a page mapping of physical addresses to virtual addresses for a virtual machine context, an index of the virtual machine context, and at least one page-specific lock for a page in the virtual machine context.

Generally, a still further additional form of the invention involves a secure demand paging (SDP) system including an external volatile memory, a microprocessor having a secure internal memory having a physical address space and the microprocessor operable for executing at least one protected application in the secure internal memory; and a non-volatile memory storing a coded physical representation of operations accessible by the microprocessor including a representation of operations to establish a table identifying pages by page type alternatives code and data and a representation of operations to request by page type a new page that is absent from the secure internal memory, to search physical pages in the secure internal memory to identify a physical page to wipe based on page type of physical page and page type of the requested page, and to access the external volatile memory for a new page.

Generally, another further additional form of the invention involves a secure demand paging (SDP) system comprising an internal secure memory for pages in a first virtual machine context; an external memory for pages in the first virtual machine context and in a second virtual machine context; a processor coupled to the internal secure memory and to the external memory; and a non-volatile memory storing a coded physical representation of operations accessible by the microprocessor including a representation of operations to handle an asynchronous message for the second virtual machine context when pages for the first virtual machine context are in the internal secure memory, the operations to handle including operations to freeze execution in the first virtual machine context, to wipe a particular page in internal secure memory occupying a predetermined page slot for handling the asynchronous message, to prepare for handling the asynchronous message, and to receive the asynchronous message into the predetermined page slot.

Generally, yet another further additional form of the invention involves a secure demand paging system including a secure internal memory, an external non-volatile memory having encrypted and integrity-protected code pages, an external volatile memory for swap pages; and a processor coupled to the secure internal memory and to the external non-volatile memory and operable to decrypt and verify the integrity of the code pages thereby to transfer code pages to the secure internal memory directly from the external non-volatile memory bypassing the external volatile memory in respect of the code pages, and to swap out and swap in the swap pages between secure internal memory and the external volatile memory bypassing the external non-volatile memory in respect of the swap pages for the external volatile memory.

Generally, still another further form of the invention involves a secure demand paging system including a processor, a cryptographic accelerator, a hash accelerator, and a secure memory coupled to the processor and coupled to transfer the same secure memory data to the cryptographic accelerator and the hash accelerator in parallel, the hashing accelerator operable to deliver a hash result directly to the processor.

Generally, still another further form of the invention involves a process of manufacturing a secure demand paging (SDP) system including providing a non-volatile memory with a signed SDP certificate including a configuration parameters for the SDP system, providing a processor responsive to the non-volatile memory to configure and execute an SDP protected application, and manufacturing a telecommunications end product combining a wireless modem with the non-volatile memory and the processor.

Generally, still another further form of the invention involves a secure demand paging device including a cryptographic circuit, a direct memory access (DMA) circuit coupled to the cryptographic circuit, a secure memory coupled by the DMA circuit to the cryptographic circuit; and a processor operable for page scavenging of the secure memory substantially in parallel time-wise with at least some operation on a first page by the cryptographic circuit.

Generally, still another further form of the invention involves a secure demand paging (SDP) system comprising an external volatile memory, a microprocessor coupled to the external volatile memory, the microprocessor having a secure internal memory having a physical address space, and the microprocessor operable to execute at least one protected application in the secure internal memory and to execute a client application at intervals and also have at least one interval of lower-activity status, and a non-volatile memory storing a coded physical representation of operations accessible by the microprocessor including a representation of an SDP protected application including a page scavenger, and an operation to schedule the page scavenger for the at least one interval of lower-activity status.

Other forms of the invention involving processes of manufacture, processes of operation, circuits, devices, articles of manufacture, wireless communications products, wireless handsets and systems are disclosed and claimed.

BRIEF DESCRIPTION OF THE DRAWINGS

FIG. 5 is a block diagram further illustrating an inventive process and circuit for secure demand paging performing a Swap In.

FIGS. 9A, 9B, 9C, 9D, 9E are partially-block, partially virtual address space, and partially-process diagrams showing an inventive sequence of operations wherein a client application in non-secure execution space successfully calls a secure application (Protected Application PA) involving inventive Secure Demand Paging.

FIG. 19 is an inventive process block diagram for Secure Demand Paging, detailing portions of FIG. 18 involving calls to a Swapper Manager and an SDP External Storage Manager of FIG. 17 for Swap Out and Swap In.

FIG. 20 is an inventive process block diagram for Secure Demand Paging, detailing portions of FIG. 19 involving Swap In operations of SDP External Storage Manager.

FIG. 21 is an inventive process block diagram for Secure Demand Paging, detailing portions of FIG. 19 involving Swap Out operations of SDP External Storage Manager.

FIG. 22 is an inventive process block diagram for Secure Demand Paging, detailing secure bootstrapping including SDP Boot Initialization.

FIG. 23 is an inventive process block diagram for Secure Demand Paging, detailing a process of SDP Boot Initialization in FIG. 22, pertaining to converting an SDP Certificate from Flash memory to a configuration SDP_CFG in Secure RAM of FIG. 11.

FIG. 24 is an inventive process block diagram for Secure Demand Paging, detailing a process of SDP Runtime Initialization, pertaining among other things to organizing and loading software from Flash or download Host into the FIG. 12 data structure DRAM_PG_TRACK_ARRAY including Virtual Machine Contexts (VMCs) in external DRAM as well as initializing portions of Secure RAM of FIG. 11.

DETAILED DESCRIPTION OF EMBODIMENTS

Figure 1:
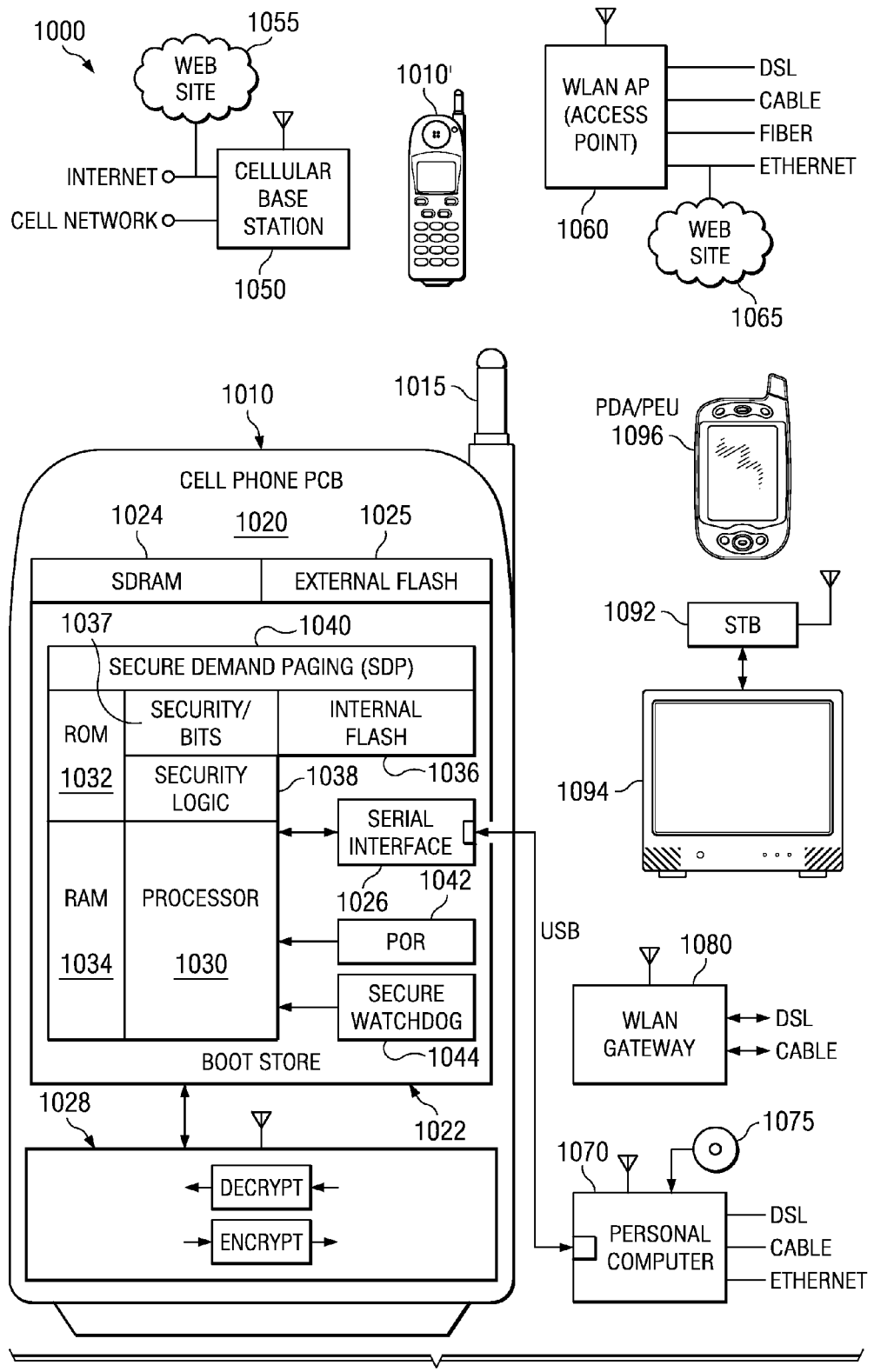
FIG. 1 is a pictorial diagram of a communications system including system blocks, for example a cellular base station, a WLAN AP (wireless local area network access point), a WLAN gateway, a personal computer, and two cellular telephone handsets, any one, some or all of the foregoing improved according to the invention.

In FIG. 1, an improved communications system 1000 has system blocks as described next. Any or all of the system blocks, such as cellular mobile telephone and data handsets 1010 and 1010', a cellular (telephony and data) base station 1050, a WLAN AP (wireless local area network access point, IEEE 802.11 or otherwise) 1060, a Voice WLAN gateway 1080 with user voice over packet telephone (not shown), and a voice enabled personal computer (PC) 1070 with another user voice over packet telephone (not shown), communicate with each other in communications system 1000. Each of the system blocks 1010, 1010', 1050, 1060, 1070, 1080 are provided with one or more PHY physical layer blocks and interfaces as selected by the skilled worker in various products, for wireless, and/or for DSL (digital subscriber line broadband over twisted pair copper infrastructure), cable (DOCSIS and other forms of coaxial cable broadband communications), premises power wiring, fiber (fiber optic cable to premises), and Ethernet wideband network. Cellular base station 1050 two-way communicates with the handsets 1010, 1010', with the Internet, with cellular communications networks and with PSTN (public switched telephone network). Improved television apparatus includes a set top box 1092 and television display 1094 provided as separate products or integrated together into the same unit and further arranged as described herein.

In this way, advanced networking capability for services, software, and content, such as cellular telephony and data, audio, music, voice, video, e-mail, gaming, security, e-commerce, file transfer and other data services, internet, world wide web browsing, TCP/IP (transmission control protocol/Internet protocol), improved television, voice over packet and voice over Internet protocol (VoP/VoIP), and other services accommodates and provides security for secure utilization and entertainment appropriate to the just-listed and other particular applications.

The embodiments, applications and system blocks disclosed herein are suitably implemented in fixed, portable, mobile, automotive, seaborne, and airborne, communications, control, set top box, and other apparatus. The personal computer (PC) 1070 is suitably implemented in any form factor such as desktop, laptop, palmtop, organizer, mobile phone handset, PDA personal digital assistant and/or personal entertainment unit (PEU) 1096, internet appliance, wearable computer, personal area network, or other type. Internet sources, such as web sites 1055 and 1065, are accessible by wireline and/or wireless apparatus as described herein. Downloadable content and software are provided from and by any of the devices in the system 1000. Optical disk 1075 is also an example of an article for providing coded physical representations of data structures and processes for executing on apparatus herein.

Figure 2:
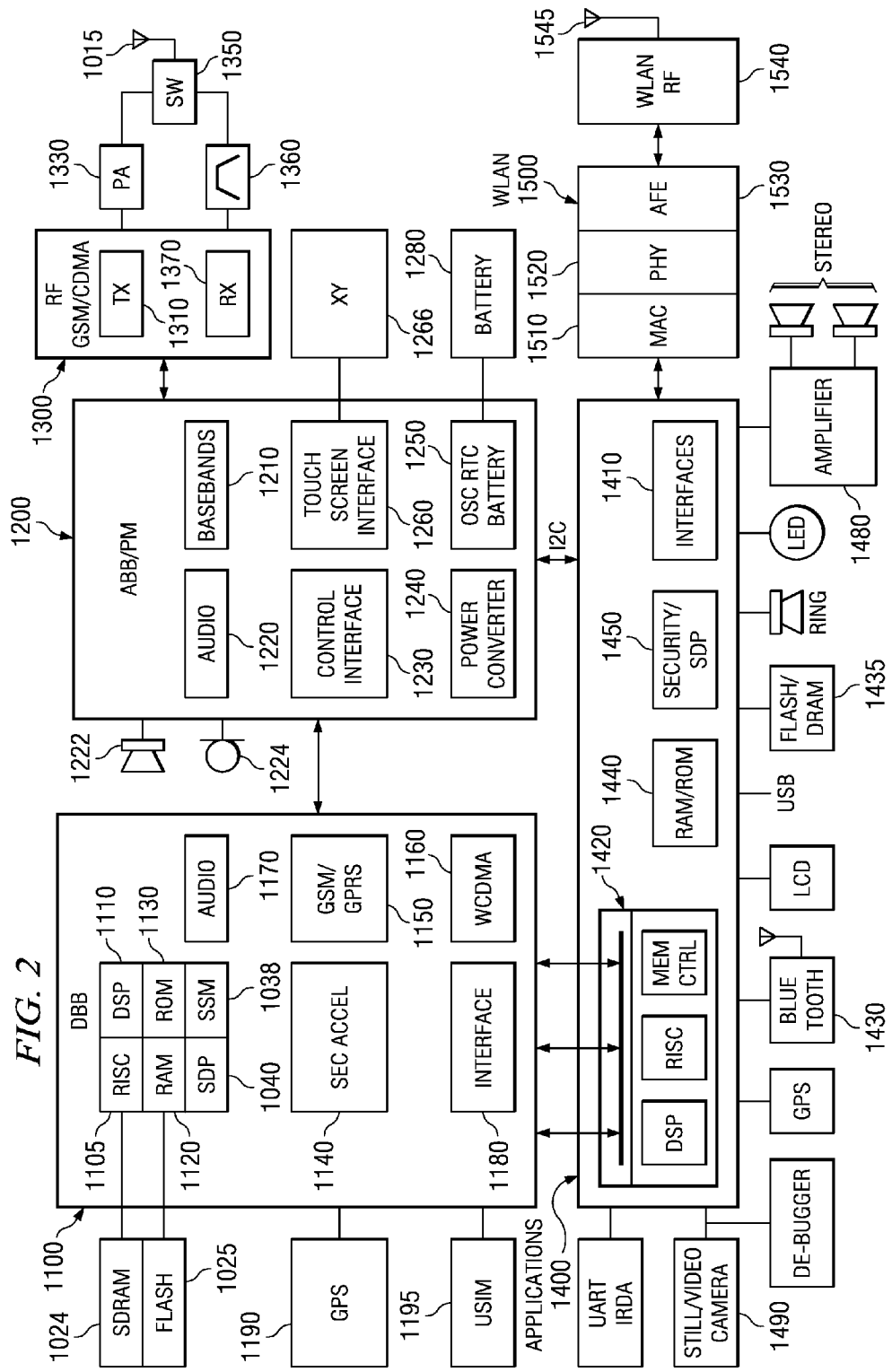
FIG. 2 is a block diagram of inventive integrated circuit chips for use in the blocks of the communications system of FIG. 1.

For example, handset 1010 is improved and remains interoperable and able to communicate with all other similarly improved and unimproved system blocks of communications system 1000. On a cell phone printed circuit board (PCB) 1020 in handset 1010, FIGS. 1 and 2 show a processor integrated circuit and a serial interface such as a USB interface connected by a USB line to the personal computer 1070. Reception of software, intercommunication and updating of information are provided between the personal computer 1070 (or other originating sources external to the handset 1010) and the handset 1010. Such intercommunication and updating also occur automatically and/or on request via WLAN, Bluetooth, or other wireless circuitry.

For example, handset 1010 is improved for selectively determinable security and economy when manufactured. Handset 1010 remains interoperable and able to communicate with all other similarly improved and unimproved system blocks of communications system 1000. On a cell phone printed circuit board (PCB) 1020 in handset 1010 coupled to a wireless antenna 1015, there is provided a higher-security processor integrated circuit 1022, an SDRAM 1024 and an external flash memory 1025, and a serial interface 1026. Serial interface 1026 is suitably a wireline interface, such as a USB interface connected by a USB line to the personal computer 1070 when the user desires and for reception of software intercommunication and updating of information between the personal computer 1070 (or other originating sources external to the handset 1010) and the handset 1010. Such intercommunication and updating also occur via a processor such as for cellular modem, WLAN, Bluetooth, or other wireless or wireline modem processor and physical layer (PHY) circuitry 1028.

Processor integrated circuit 1022 includes at least one processor (or central processing unit CPU) block 1030 coupled to an internal (on-chip read-only memory) ROM 1032, an internal (on-chip random access memory) RAM 1034, and an internal (on-chip) flash memory 1036. In some embodiments, memory 1036 provides writeable non-volatile memory such as flash memory, ferroelectric memory, or EEPROM (electrically erasable programmable read only memory) or other suitable form. A security logic circuit 1038 is coupled to secure-or-general-purpose-identification value (Security/GPI) bits 1037 of a non-volatile one-time alterable Production ID register or array of electronic fuses (E-Fuses). Depending on the Security/GPI bits, boot code residing in ROM 1032 responds differently to a Power-On Reset (POR) circuit 1042 and to a secure watchdog circuit 1044 coupled to processor 1030. A device-unique security key is suitably also provided in the E-fuses or downloaded to other non-volatile, difficult-to-alter parts of the cell phone unit 1010.

It will be noted that the words "internal" and "external" as applied to a circuit or chip respectively refer to being on-chip or off-chip of the applications processor chip 1022. All items are assumed to be internal to an apparatus (such as a handset, base station, access point, gateway, PC, or other apparatus) except where the words "external to" are used with the name of the apparatus, such as "external to the handset."

ROM 1032 provides a boot storage having boot code that is executable in at least one type of boot sequence. One or more of RAM 1034, internal flash 1036, and external flash memory 1025 are also suitably used to supplement ROM 1032 for boot storage purposes.

Secure Demand Paging SDP circuitry 1040 effectively multiplies the memory space that secure applications can occupy. Processor 1030 is an example of circuitry coupled to the Secure Demand Paging block 1040 to execute a process defined by securely stored code and data from a Secure RAM 1034 as if the secure RAM were much larger by using SDRAM 1024. As described further herein SDP Circuitry 1040 includes real-estate circuitry for determining which secure RAM memory page to wipe, or make available for a new page of code and/or data for a secure application.

FIG. 2 illustrates inventive integrated circuit chips including chips 1100, 1200, 1300, 1400, 1500 for use in the blocks of the communications system 1000 of FIG. 1. The skilled worker uses and adapts the integrated circuits to the particular parts of the communications system 1000 as appropriate to the functions intended. For conciseness of description, the integrated circuits are described with particular reference to use of all of them in the cellular telephone handsets 1010 and 1010' by way of example.

It is contemplated that the skilled worker uses each of the integrated circuits shown in FIG. 2, or such selection from the complement of blocks therein provided into appropriate other integrated circuit chips, or provided into one single integrated circuit chip, in a manner optimally combined or partitioned between the chips, to the extent needed by any of the applications supported by the cellular telephone base station 1050, personal computer(s) 1070 equipped with WLAN, WLAN access point 1060 and Voice WLAN gateway 1080, as well as cellular telephones 1010, 1010', radios and televisions 1092, 1094, Internet audio/video content players, fixed and portable entertainment units 1096, routers, pagers, personal digital assistants (PDA), organizers, scanners, faxes, copiers, household appliances, office appliances, combinations thereof, and other application products now known or hereafter devised in which there is desired increased, partitioned or selectively determinable advantages next described.

In FIG. 2, an integrated circuit 1100 includes a digital baseband (DBB) block 1110 that has a RISC processor (such as MIPS core, ARM processor, or other suitable processor) and a digital signal processor such as from the TMS320C55x™ DSP generation from Texas Instruments Incorporated or other digital signal processor (or DSP core) 1110, communications software and security software for any such processor or core, security accelerators 1140, and a memory controller. Security accelerators block 1140 provide additional computing power such as for hashing and encryption that are accessible, for instance, when the integrated circuit 1100 is operated in a security level enabling the security accelerators block 1140 and affording types of access to the security accelerators depending on the security level and/or security mode. The memory controller interfaces the RISC core 1105 and the DSP core 1110 to Flash memory 1025 and SDRAM 1024 (synchronous dynamic random access memory). On chip RAM 1120 and on-chip ROM 1130 also are accessible to the processors 1110 for providing sequences of software instructions and data thereto. A security logic circuit 1038 of FIGS. 1 and 2 has a secure state machine (SSM) to provide hardware monitoring of any tampering with security features. Secure Demand Paging (SDP) circuit 1040 of FIGS. 1 and 2 is provided and described further herein.

Digital circuitry 1150 on integrated circuit 1100 supports and provides wireless interfaces for any one or more of GSM, GPRS, EDGE, UMTS, and OFDMA/MIMO (Global System for Mobile communications, General Packet Radio Service, Enhanced Data Rates for Global Evolution, Universal Mobile Telecommunications System, Orthogonal Frequency Division Multiple Access and Multiple Input Multiple Output Antennas) wireless, with or without high speed digital data service, via an analog baseband chip 1200 and GSM/CDMA transmit/receive chip 1300. Digital circuitry 1150 includes ciphering processor CRYPT for GSM ciphering and/or other encryption/decryption purposes. Blocks TPU (Time Processing Unit real-time sequencer), TSP (Time Serial Port), GEA (GPRS Encryption Algorithm block for ciphering at LLC logical link layer), RIF (Radio Interface), and SPI (Serial Port Interface) are included in digital circuitry 1150.

Digital circuitry 1160 provides codec for CDMA (Code Division Multiple Access), CDMA2000, and/or WCDMA (wideband CDMA or UMTS) wireless suitably with HSDPA/HSUPA (High Speed Downlink Packet Access, High Speed Uplink Packet Access) (or 1xEV-DV, 1xEV-DO or 3xEV-DV) data feature via the analog baseband chip 1200 and RF GSM/CDMA chip 1300. Digital circuitry 1160 includes blocks MRC (maximal ratio combiner for multipath symbol combining), ENC (encryption/decryption), RX (downlink receive channel decoding, de-interleaving, viterbi decoding and turbo decoding) and TX (uplink transmit convolutional encoding, turbo encoding, interleaving and channelizing). Block ENC has blocks for uplink and downlink supporting confidentiality processes of WCDMA.

Audio/voice block 1170 supports audio and voice functions and interfacing. Speech/voice codec(s) are suitably provided in memory space in audio/voice block 1170 for processing by processor(s) 1110. An applications interface block 1180 couples the digital baseband chip 1100 to an applications processor 1400. Also, a serial interface in block 1180 interfaces from parallel digital busses on chip 1100 to USB (Universal Serial Bus) of PC (personal computer) 1070. The serial interface includes UARTs (universal asynchronous receiver/transmitter circuit) for performing the conversion of data between parallel and serial lines. Chip 1100 is coupled to location-determining circuitry 1190 for GPS (Global Positioning System). Chip 1100 is also coupled to a USIM (UMTS Subscriber Identity Module) 1195 or other SIM for user insertion of an identifying plastic card, or other storage element, or for sensing biometric information to identify the user and activate features.

In FIG. 2, a mixed-signal integrated circuit 1200 includes an analog baseband (ABB) block 1210 for GSM/GPRS/EDGE/UMTS/HSDPA/HSUPA which includes SPI (Serial Port Interface), digital-to-analog/analog-to-digital conversion DAC/ADC block, and RF (radio frequency) Control pertaining to GSM/GPRS/EDGE/UMTS/HSDPA/HSUPA and coupled to RF (GSM etc.) chip 1300. Block 1210 suitably provides an analogous ABB for CDMA wireless and any associated 1xEV-DV, 1xEV-DO or 3xEV-DV data and/or voice with its respective SPI (Serial Port Interface), digital-to-analog conversion DAC/ADC block, and RF Control pertaining to CDMA and coupled to RF (CDMA) chip 1300.

An audio block 1220 has audio I/O (input/output) circuits to a speaker 1222, a microphone 1224, and headphones (not shown). Audio block 1220 has an analog-to-digital converter (ADC) coupled to the voice codec and a stereo DAC (digital to analog converter) for a signal path to the baseband block 1210 including audio/voice block 1170, and with suitable encryption/decryption activated.

A control interface 1230 has a primary host interface (I/F) and a secondary host interface to DBB-related integrated circuit 1100 of FIG. 2 for the respective GSM and CDMA paths. The integrated circuit 1200 is also interfaced to an I2C port of applications processor chip 1400 of FIG. 2. Control interface 1230 is also coupled via access arbitration circuitry to the interfaces in circuits 1250 and the baseband 1210.

A power conversion block 1240 includes buck voltage conversion circuitry for DC-to-DC conversion, and low-dropout (LDO) voltage regulators for power management/sleep mode of respective parts of the chip regulated by the LDOs. Power conversion block 1240 provides information to and is responsive to a power control state machine between the power conversion block 1240 and circuits 1250.

Circuits 1250 provide oscillator circuitry for clocking chip 1200. The oscillators have frequencies determined by one or more crystals. Circuits 1250 include a RTC real time clock (time/date functions), general purpose I/O, a vibrator drive (supplement to cell phone ringing features), and a USB On-The-Go (OTG) transceiver. A touch screen interface 1260 is coupled to a touch screen XY 1266 off-chip.

Batteries such as a lithium-ion battery 1280 and backup battery provide power to the system and battery data to circuit 1250 on suitably provided separate lines from the battery pack. When needed, the battery 1280 also receives charging current from a Battery Charge Controller in analog circuit 1250 which includes MADC (Monitoring ADC and analog input multiplexer such as for on-chip charging voltage and current, and battery voltage lines, and off-chip battery voltage, current, temperature) under control of the power control state machine.

In FIG. 2 an RF integrated circuit 1300 includes a GSM/GPRS/EDGE/UMTS/CDMA RF transmitter block 1310 supported by oscillator circuitry with off-chip crystal (not shown). Transmitter block 1310 is fed by baseband block 1210 of chip 1200. Transmitter block 1310 drives a dual band RF power amplifier (PA) 1330. On-chip voltage regulators maintain appropriate voltage under conditions of varying power usage. Off-chip switchplexer 1350 couples wireless antenna 1015 and switch circuitry to both the transmit portion 1310, 1330 and the receive portion 1360, 1370 next described. Switchplexer 1350 is coupled via band-pass filters 1360 to receiving LNAs (low noise amplifiers) for 850/900 MHz, 1800 MHz, 1900 MHz and other frequency bands as appropriate. Depending on the band in use, the output of LNAs couples to GSM/GPRS/EDGE/UMTS/CDMA receiver (RX) demodulator 1370 to produce the I/Q or other outputs thereof (in-phase, quadrature) to the GSM/GPRS/EDGE/UMTS/CDMA baseband block 1210.

Further in FIG. 2, an integrated circuit chip or core 1400 is provided for applications processing and more off-chip peripherals. Chip (or core) 1400 has interface circuit 1410 including a high-speed WLAN 802.11a/b/g interface coupled to a WLAN chip 1500. Further provided on chip 1400 is an applications processing section 1420 which includes a RISC processor (such as MIPS core, ARM processor, or other suitable processor), a digital signal processor (DSP) such as from the TMS320C55x™ DSP generation from Texas Instruments Incorporated or other digital signal processor, and a shared memory controller MEM CTRL with DMA (direct memory access), and a 2D (two-dimensional display) graphic accelerator. Speech/voice codec functionality is suitably processed in chip 1400, in chip 1100, or both chips 1400 and 1100.

The RISC processor and the DSP in section 1420 have access via an on-chip extended memory interface (EMIF/CF) to off-chip memory resources 1435 including as appropriate, mobile DDR (double data rate) DRAM, and flash memory of any of NAND Flash, NOR Flash, and Compact Flash. On chip 1400, the shared memory controller in circuitry 1420 interfaces the RISC processor and the DSP via an on-chip bus to on-chip memory 1440 with RAM and ROM. A 2D graphic accelerator is coupled to frame buffer internal SRAM (static random access memory) in block 1440. A security block 1450 in security logic 1038 of FIG. 1 includes secure hardware accelerators having security features and provided for secure demand paging 1040 as further described herein and for accelerating encryption and decryption. A random number generator RNG is provided in security block 1450. Among the Hash approaches are SHA-1 (Secured Hashing Algorithm), MD2 and MD5 (Message Digest version #). PKCS (Public Key Cryptography Standard) PSS (Probabilistic Signature Scheme) signature format supports signing. Among the symmetric approaches are DES (Digital Encryption Standard), 3DES (Triple DES), CBC (Cipher-Block Chaining), RC4 (Rivest Cipher), ARC4 (related to RC4), TKIP (Temporal Key Integrity Protocol, uses RC4), AES (Advanced Encryption Standard). Among the asymmetric approaches are RSA, DSA, DH, NTRU, and ECC (elliptic curve cryptography). The security features contemplated include any of the foregoing hardware and processes and/or any other known or yet to be devised security and/or hardware and encryption/decryption processes implemented in hardware or software.

Figure 3:
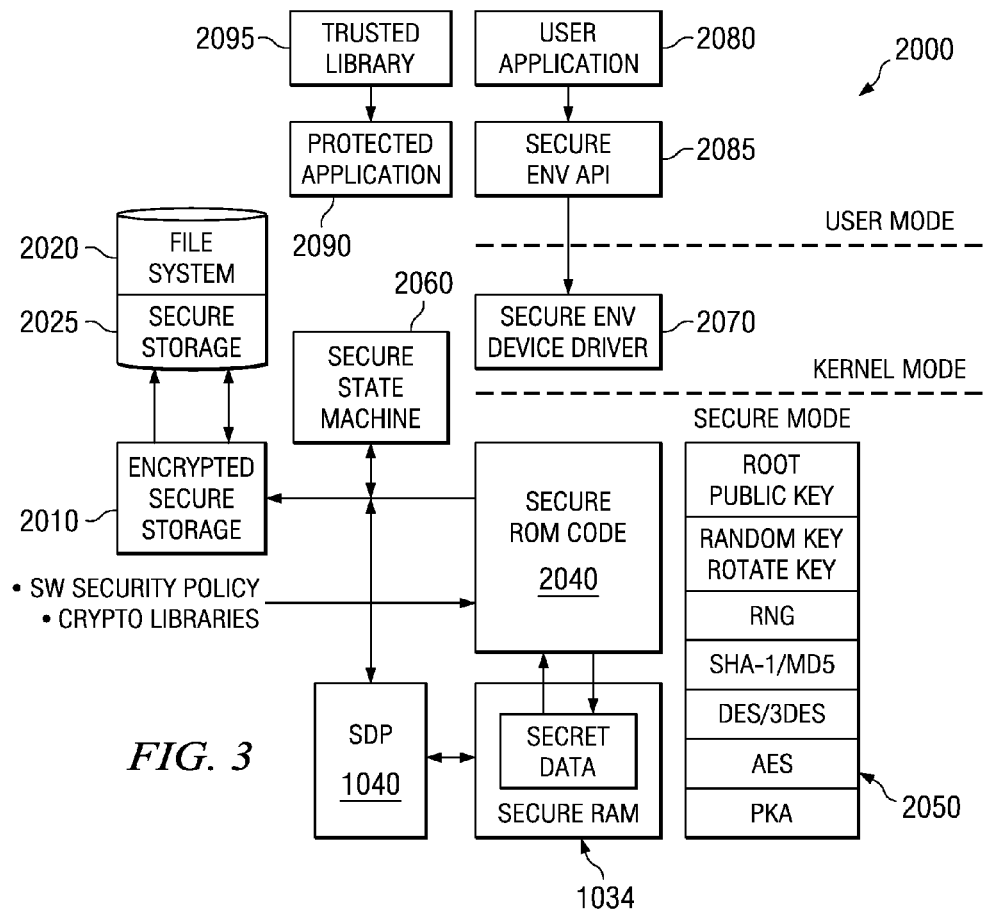
FIG. 3 is a block diagram of inventive hardware and process blocks for selectively operating one or more of the chips of FIG. 2 for the system blocks of FIG. 1.

Security logic 1038 of FIG. 1 and FIG. 2 (1038, 1450) includes hardware-based protection circuitry, also called security monitoring logic or a secure state machine 2060 of FIG. 3. Security logic 1038 is coupled to and monitors busses and other parts of the chip for security violations and protects and isolates the protected areas. Security logic 1038 makes secure ROM space inaccessible, makes secure RAM and register space inaccessible and establishes any other appropriate protections to additionally foster security. In one embodiment such a software jump from Flash memory to secure ROM, for instance, causes a security violation wherein, for example, the security logic 1038 produces an automatic immediate reset of the chip. In another embodiment, such a jump causes the security monitoring logic to produce an error message and a re-vectoring of the jump away from secure ROM. Other security violations would include attempted access to secure register or RAM space.

On-chip peripherals and additional interfaces 1410 include UART data interface and MCSI (Multi-Channel Serial Interface) voice wireless interface for an off-chip IEEE 802.15 ("Bluetooth" and high and low rate piconet and personal network communications) wireless circuit 1430. Debug messaging and serial interfacing are also available through the UART. A JTAG emulation interface couples to an off-chip emulator Debugger for test and debug. Further in peripherals 1410 are an I2C interface to analog baseband ABB chip 1200, and an interface to applications interface 1180 of integrated circuit chip 1100 having digital baseband DBB.

Interface 1410 includes a MCSI voice interface, a UART interface for controls, and a multi-channel buffered serial port (McBSP) for data. Timers, interrupt controller, and RTC (real time clock) circuitry are provided in chip 1400. Further in peripherals 1410 are a MicroWire (u-wire 4 channel serial port) and multi-channel buffered serial port (McBSP) to Audio codec, a touch-screen controller, and audio amplifier 1480 to stereo speakers. External audio content and touch screen (in/out) and LCD (liquid crystal display) are suitably provided. Additionally, an on-chip USB OTG interface couples to off-chip Host and Client devices. These USB communications are suitably directed outside handset 1010 such as to PC 1070 (personal computer) and/or from PC 1070 to update the handset 1010.

An on-chip UART/IrDA (infrared data) interface in interfaces 1410 couples to off-chip GPS (global positioning system block cooperating with or instead of GPS 1190) and Fast IrDA infrared wireless communications device. An interface provides EMT9 and Camera interfacing to one or more off-chip still cameras or video cameras 1490, and/or to a CMOS sensor of radiant energy. Such cameras and other apparatus all have additional processing performed with greater speed and efficiency in the cameras and apparatus and in mobile devices coupled to them with improvements as described herein. Further in FIG. 2, an on-chip LCD controller and associated PWL (Pulse-Width Light) block in interfaces 1410 are coupled to a color LCD display and its LCD light controller off-chip.

Further, on-chip interfaces 1410 are respectively provided for off-chip keypad and GPIO (general purpose input/output). On-chip LPG (LED Pulse Generator) and PWT (Pulse-Width Tone) interfaces are respectively provided for off-chip LED and buzzer peripherals. On-chip MMC/SD multimedia and flash interfaces are provided for off-chip MMC Flash card, SD flash card and SDIO peripherals.

In FIG. 2, a WLAN integrated circuit 1500 includes MAC (media access controller) 1510, PHY (physical layer) 1520 and AFE (analog front end) 1530 for use in various WLAN and UMA (Unlicensed Mobile Access) modem applications. PHY 1520 includes blocks for Barker coding, CCK, and OFDM. PHY 1520 receives PHY Clocks from a clock generation block supplied with suitable off-chip host clock, such as at 13, 16.8, 19.2, 26, or 38.4 MHz. These clocks are compatible with cell phone systems and the host application is suitably a cell phone or any other end-application. AFE 1530 is coupled by receive (Rx), transmit (Tx) and CONTROL lines to WLAN RF circuitry 1540. WLAN RF 1540 includes a 2.4 GHz (and/or 5 GHz) direct conversion transceiver, or otherwise, and power amplifier and has low noise amplifier LNA in the receive path. Bandpass filtering couples WLAN RF 1540 to a WLAN antenna 1545. In MAC 1510, Security circuitry supports any one or more of various encryption/decryption processes such as WEP (Wired Equivalent Privacy), RC4, TKIP, CKIP, WPA, AES (advanced encryption standard), 802.11i and others. Further in WLAN 1500, a processor comprised of an embedded CPU (central processing unit) is connected to internal RAM and ROM and coupled to provide QoS (Quality of Service) IEEE 802.11e operations WME, WSM, and PCF (packet control function). A security block in WLAN 1500 has busing for data in, data out, and controls interconnected with the CPU. Interface hardware and internal RAM in WLAN 1500 couples the CPU with interface 1410 of applications processor integrated circuit 1400 thereby providing an additional wireless interface for the system of FIG. 2. Still other additional wireless interfaces such as for wideband wireless such as IEEE 802.16 "WiMAX" mesh networking and other standards are suitably provided and coupled to the applications processor integrated circuit 1400 and other processors in the system.

Further described next are improved secure circuits, structures and processes and improving the systems and devices of FIGS. 1 and 2 with them.

FIG. 3 illustrates an advantageous form of software modes and architecture 2000 for the integrated circuits 1100 and 1400. Encrypted secure storage 2010 and a file system 2020 provide storage for this arrangement. Selected contents or all contents of encrypted secure storage 2010 are further stored in a secure storage area 2025.

Next a secure mode area of the architecture is described. In a ROM area of the architecture 2000, secure ROM code 2040 together with secure data such as cryptographic key data are manufactured into an integrated circuit such as 1100 or 1400 including processor circuitry. Also a secure RAM 2045 is provided. Secret data such as key data is copied or provided into secure RAM 2045 as a result of processing of the Secure ROM Code 2040. Further in the secure mode area are modules suitably provided for RNG (Random Number Generator), SHA-1/MD5 hashing software and processes, DES/3DES (Data Encryption Standard single and triple-DES) software and processes, AES (Advanced Encryption Standard) software and processes, and PKA (Private Key Authentication) software and processes.

Further in FIG. 3, secure demand paging SDP 1040 hardware and/or software effectively increases Secure RAM 1034 by demand paging from secure storage 2010. A hardware-implemented secure state machine (SSM) 2060 monitors the buses, registers, circuitry and operations of the secure mode area of the architecture 2000. In this way, addresses, bits, circuitry inputs and outputs and operations and sequences of operations that violate predetermined criteria of secure operation of the secure mode area are detected. SSM 2060 then provides any or all of warning, denial of access to a space, forcing of reset and other protective measures. Use of independent on-chip hardware for SSM 2060 advantageously isolates its operations from software-based attacks. SSM 2060 is addressable and configurable to enable a Hashing module, enable an Encryption/Decryption module, and lock Flash and DRAM spaces.

SSM 2060 monitors busses and other hardware blocks, pin boundary and other parts of the chip for security violations and protects and isolates the protected areas. SSM 2060 makes secure ROM and register space inaccessible, and secure RAM space inaccessible and establishes any other appropriate protections to additionally foster security. In one embodiment such a software jump from flash to secure ROM, for instance, causes a security violation wherein, for example, SSM 2060 produces an automatic immediate reset of the chip. In another embodiment, such a jump causes the security monitoring logic to produce an error message and a re-vectoring of the jump away from secure ROM. Other security violations would include attempted access to reconfigure the SSM 2060 or attempted access to secure RAM space.

In FIG. 3, a kernel mode part of the software architecture includes one or more secure environment device drivers 2070. Driver 2070 of FIG. 3 suitably is provided as a secure environment device driver in kernel mode.

Further in FIG. 3, a user application 2080 communicates to and through a secure environment API (application peripheral interface) software module 2085 to the secure environment device driver 2070. Both the user app 2080 and API 2085 are in a user mode part of the software architecture.

A protected application 2090 provides an interface as security may permit, to information in file system 2020, secure storage 2025, and a trusted library 2095 such as an authenticated library of software for the system.

Some Demand Paging embodiments herein provide a way to execute large protected applications (PA) inside Secure RAM in three phases: 1) creation of HW Security Protected Pages, and when a page fault is generated: 2) Swapping Out a page and 3) Swapping In a page. A page fault occurs when a page which is not in the Secure RAM is accessed. It uses the DRAM as a swap file device and swaps pages securely out and in, as between Secure RAM and non-secure DRAM. Page replacement selects a page for phases 2) and 3) when the Secure RAM physical pages available to the embodiment are currently all occupied. The newly freed page is used by secure demand paging for a different part of secure applications code/data at a different virtual address. If tampering has occurred the Secure Swapper notifies the secure kernel and security breach counter measures are invoked. The demand pager herein, or its calling page fault handler, then does an instruction restart for the page faulting PA, and the PA is never aware that the data was missing, because it is replaced by the demand paging system transparently.

Phase 1. Creation of HW Security Protected Pages is done when a PA is loaded into Secure Mode or at boot time. The Applications loaded into Secure Mode are signed and authenticated. While authenticating the application, the Demand pager loads the application in 4k chunks or pages. A hash of the PA is computed over each of these pages. Each page is converted into a Formatted Code Page or a Formatted Data Page.

For example, a formatted page includes a descriptor block that contains the application identifier, page identifier, timestamp, and other management information such as used to administer page replacement scavenging as described herein. The page includes actual encrypted code or encrypted data and an integrity check value. The integrity check is done using HMAC (Hashed Message Authentication Code hashed over the code/data and descriptor block) or another integrity process on the page. In this way, not only is performance enhanced but also a different hash result occurs each time the page/code is swapped in, thereby thwarting replay attack scenarios. An example of an HMAC is a private hash that is computed by taking a confidential key and pre-pending to the data to be hashed while utilizing CBC (cipher block chaining) in the hashing process. This results in a secure hash which secures the SHA or MD5 hash better, particularly when the hash is stored publicly along with the data which has been hashed.

A Key for doing the encryption/decryption is a hardware-based Application Encryption Key accessible only inside Secure Mode, for instance. The key used for integrity is an Application Integrity Key accessible only inside Secure Mode. After the last page is loaded (this may imply removal of some pages—using page replacement algorithms), the application signature is verified. The result of verification is stored in Secure RAM as a tuple (Application ID, Result)

Phase 2. Page Swapping In.

For a Code Page

Verify Integrity/HMAC (using Application Code Integrity Key)

Verify App ID with the tuple table in Secure RAM

Update time stamps and any other management information in descriptor block

Use Code Page

For a Data Page

Decrypt Data (using Application Data Decryption Key)

Verify Integrity/HMAC (using Application Code Integrity Key)
Verify App ID with the tuple table in Secure RAM
Update time stamps and any other management information in descriptor block
Use Data Page
Phase 3. Page Swapping Out.
For Code Page
Update time stamps and any other management information in descriptor block
Compute Integrity/HMAC (using Application Code Integrity Key)
Swap out Code Page
For Data Page
Update time stamps and any other management information in descriptor block
Compute Integrity check (using Application Data Integrity Key)
Encrypt Data (using Application Data Encryption Key) and
Swap out Data Page The secure creation of pages, and secure swapping in and out of pages can be applied to any demand paging scheme. Hardware and/or software security is provided for encryption and data integrity verification (and with generic keys).

The demand pager need not actually distinguish between code and data pages and can treat them like data pages, such as when the demand pager has no knowledge about the structure of the pages. The code pages are then be treated like the data pages in terms of encryption, HMAC etc. If HMAC is not used, it can be substituted with encrypted hash over the encrypted code/data. This confers efficient usage of DMA (Direct Memory Access).

To select a Secure RAM page for replacement, the demand pager herein suitably uses any one or combination of processes such as LFU (Least Frequently Used), OPT, FIFO, Clock, Second-Chance, and LRU (Least Recently Used). The demand pager is suitably used to improve compatible existing devices by loading by loading it as a Protected Application (PA) or Primary Protected Application (PPA) without ROM code changes.

This simple, flexible, secure solution for paging provides a virtual memory capability securely with cryptographic components. Moreover, because DRAM is used for the swap device, it provides a very high performance secure virtual memory system that can virtually extend the limited secure RAM size by many times, thus to provide practically unlimited secure application size without the cost of more secure RAM.

The demand pager herein provides swaps that are orders of magnitude faster than traditional hard disk drive page swaps. The Secure environment memory is significantly expanded without increasing SoC (System on a Chip) Secure static RAM size. This results in enabling larger secure applications without a corresponding increase in chip cost or size. Security solution trends such as TCG (Trusted Computing Group industry group) TPM (Trust Protection Model), OMA DRM (Open Mobile Alliance digital rights management) and Windows DRM, Secure File systems and others, which now and in the future require much more secure memory than current SoC System-on-a-Chip static RAMs provide for, are supported.

In one DRM example, items of music content are provided in a library with respective keys. A DRM Agent at a web site supplies key and content in response to a download request from the mobile device. The digital rights permit listening to the music content for a very limited period of time until, for example, the user pays for the music, whereupon a key is supplied from the web site that is used by the DRM software to play the music indefinitely. DRM represents a case where streaming media such as audio and/or video is subjected to security controls and is processed in real time. The Secure Demand Paging (SDP) methods and apparatus run these applications so that the user experiences continuous streaming content. The improvements herein also facilitate electronic commerce transactions, secure network communications, secure displays, and secure keyboards with secure input and output.

The cell phone and other platforms are now desirable as a ubiquitous platform for audio and video content and large applications like games, e-commerce, e-mail, internet voice and video, and other applications. Significant content applications and significant software applications are supported according to the teachings herein in a manner that accommodates and enhances the security and digital rights management that users and providers would require in a high-computing-performance, power-limited, hand-carried or body-wearable platform that is inexpensive enough to attract mass distribution.

SDP 1040 includes a SDP PPA to provide an on-demand memory management translation layer or interface (MMTL), among its other aspects. SDP PPA mediates and overcomes differences in memory management High Level Operating Systems (HLOS) usage models between the secure state and the non-secure state code typified by complex memory management arrangements that do not map physical memory linearly into the virtual address space. Secure Environment (SE) ROM code desirably is embedded physically in the applications processor chip for security. Cryptographic operations are also provided by hardware accelerators in an elegant manner with low processing burden.

Because changes to the ROM can be inconvenient and expensive, the SDP PPA suitably acts as a memory management translation interface so that the same SE ROM code serves differing HLOS, different applications, and different system configurations. SDP PPA is suitably included in an SE driver for a particular HLOS or provided separately and coupled to such a driver. SDP PPA thus also simplifies design verification for security.

In some embodiments, SE ROM code operates with all virtual addresses mapped Virtual-to-Physical to impede and abrogate MMU attacks from non-secure code, as well as to be OS agnostic. SDP acting as MMTL is, for example, directly coupled to the application and directly responds to parameter data from the application that requested the security service without need of a performance-complicating prior-reserved and physically-contiguous buffer or redundant-copy memory for large parameter blocks. Re-alignment processing is also avoided in embodiments that align data on physically contiguous 4K pages.

SDP PPA intelligently finds physical pages on demand containing or pertaining to secure parameters of user that were inputs to a secure service function call. SDP PPA responds effectively to page faults or data abort exceptions that can occur when secure state PA code does not know where to find the parameter data. The SDP PPA page fault handler then is automatically invoked by the data abort exception and delivers a mapping and access of virtual page address(es) to underlying physical page(s).

Three exemplary patch points for SDP PPA to couple to legacy SE ROM code 2040 are suitably provided as follows: 1) Data Abort Exception vector intercept, and also (if used) Prefetch Abort vector intercept. Patch point should pass control to PPA patch with all registers intact at time of abort. 2) ROM API entry after secure entry at a point where all API input parameters can be examined, optimizes for smaller amounts of data passed so that no Data Aborts occur on small data which should already be copied to contiguous RAM. 3) ROM exit before cleanup where API return parameter can be examined.

Figure 4:
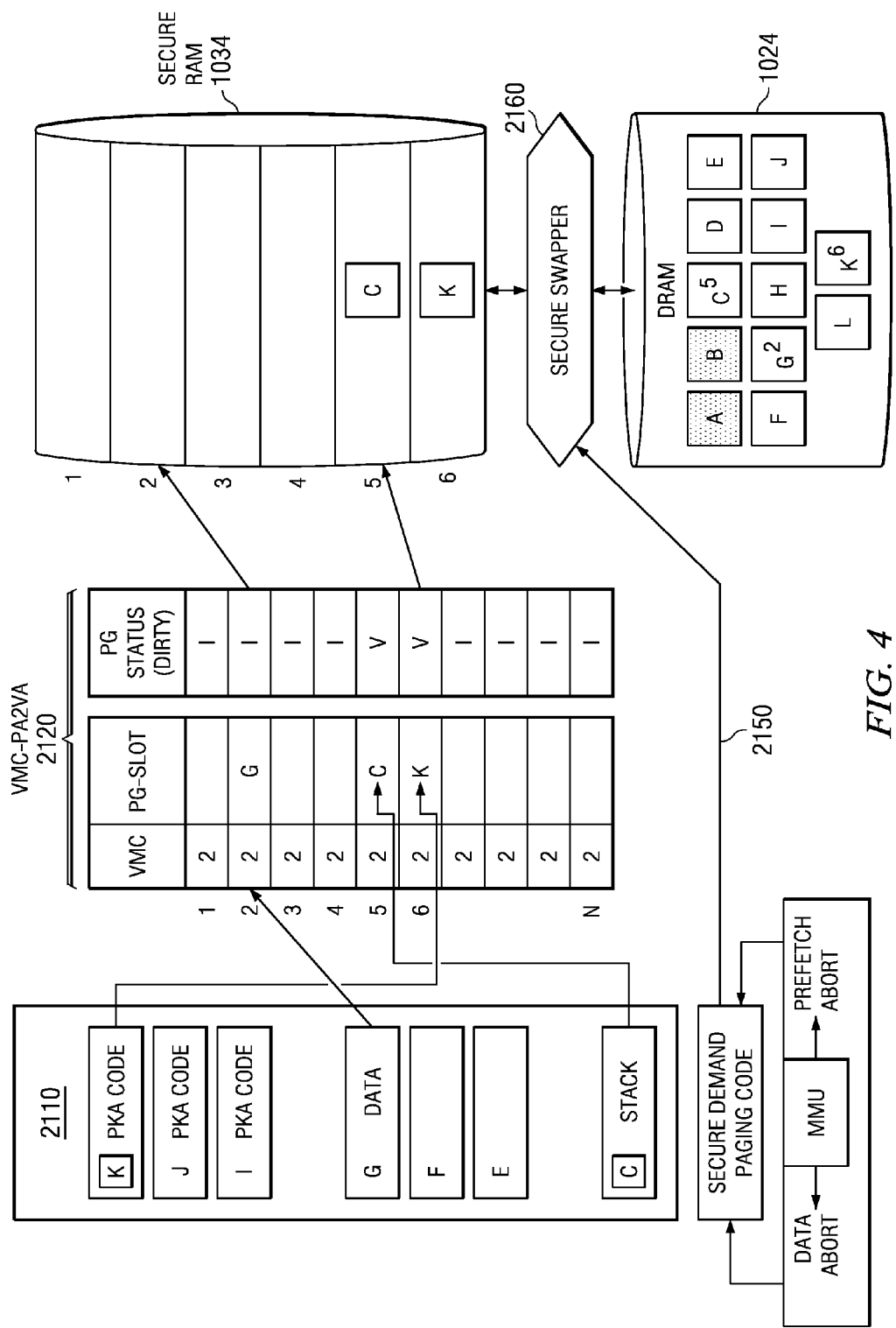
FIG. 4 is a partially-block, partially data structure diagram for illustrating an inventive process and circuit for secure demand paging (SDP).

Turning to FIG. 4, a Secure Demand Paging (SDP) 1040 secure hardware and software mechanism desirably has efficient page wiping for replacement in internal Secure RAM 1034 of physical pages not currently or often used by the software application, such as protected application 2090. Such pages include pages that may or may not need to be written back to external or other memory.

An SDP 1040 hardware and software process efficiently governs the finding of appropriate pages to wipe and various embodiments confer different mixes of low complexity, low memory space and chip real-estate space occupancy, and low time consumption, low power consumption and low processing burden. The quality of the choice of the page to wipe out for replacement is advantageously high. "Wipe" includes various alternatives to overwrite, erase, simply change the state of a page-bit that tags or earmarks a page, and other methods to free or make available a page space or slot for a new page.

A hardware-based embodiment efficiently identifies the appropriate page to wipe and applies further efficient SDP swap and other structures and operations. In this embodiment, a hardware mechanism monitors different internal RAM pages used by the SDP software mechanism. The hardware mechanism also detects and flags via registers accessible by software, which page is Dirty (modified) or Clean (unmodified). (A Write access to a page makes it become Dirty.)

This embodiment also computes according to the ordered Read and Write accesses that occurred on the different pages, statistical information about the internal RAM page Usage Level. Usage Level is divided into Very Low usage, Low usage, Medium Usage, and High Usage, for instance.

SDP 1040 then computes from all the information, according to an embedded sorting process, which pages are the more suitable pages to be wiped. SDP 1040 variously considers, for example, impact of each page on the current application and the time required for a page to be wiped out. Wiping a low usage page impacts the application slightly, but a higher usage page is needed by the application more. A Dirty page consumes writeback time to external memory and a Clean page does not need to be written back. SDP 1040, in one example, prioritizes the pages that are more suitable to be wiped out for less time consumption and application impact in the following priority order:

CODE page tagged as VERY LOW usage
CODE page tagged as LOW usage
DATA READ page tagged as VERY LOW usage
DATA READ page tagged as LOW usage
DATA WRITE page tagged as VERY LOW usage
DATA WRITE page tagged as LOW usage
CODE page tagged as MEDIUM usage
DATA READ page tagged as MEDIUM usage
DATA WRITE page tagged as MEDIUM usage Then the process logs the results to prognostic registers such as page counters described hereinbelow. Subsequently, the SDP software mechanism just reads the prognostic registers to find the best pages to wipe. See coassigned, co-filed application U.S. non-provisional patent application TI-39617 "Page Processing Circuits, Devices, Methods And Systems For Secure Demand Paging And Other Operations" U.S. Ser. No. 11/426,598, which is incorporated herein by reference.

In the case of a strong security embodiment, the SDP 1040 hardware and/or software just described herein is configured and accessed by the main processing unit in Secure Mode, or highly privileged modes without impact on the main processing unit functionality. Restrictions on Secure Mode and privilege are removed in whole or in part for less secure embodiments. Some embodiments make demand paging itself more efficient without an SSM 2060. Other embodiments provide security features that together with the improved demand paging provide a Secure Demand Pager or SDP.

Some embodiments improve very significantly the page selection mechanism with regard to competing demands of time and power consumption, and the quality of the choice of the page to wipe out for replacement.

Some embodiments generate automatically and with little or no time overhead the dirty page status and the best page to wipe.

Hardware-based embodiments are often more resistant to tampering by software running in other processor modes besides Secure or Privileged Modes. That is, such embodiments are less sensitive to Denial of Service (DoS) attack on an internal mechanism which might force a software application not to run properly.

Some embodiments having Dirty page status generating circuits further detect whether Code pages used in internal RAM have been modified by an attacker. This capability contributes to the security robustness of SDP paging methods.

Any demand paging system, whether secure or not, can be improved according to the teachings herein, with benefits depending on relative system Swap Out times and Swap In times, and also systems wherein the access time mix of various types of external storage devices from which even the Swap In times to on-chip RAM vary, and other factors. The improvements taught herein are of benefit in a Secure Demand Paging system with Swaps between on-chip RAM and off-chip DRAM, for instance, because Swap Out is used for modified pages and not used for unmodified pages and in some systems the Swap Out time with encryption and/or hashing adds relative to the Swap In time is greater than the Swap Out time would be in a less-secure system lacking the encryption and/or hashing.

Various embodiments are implemented in any integrated circuit manufacturing process such as different types of CMOS (complementary metal oxide semiconductor), SOI (silicon on insulator), SiGe (silicon germanium), and with various types of transistors such as single-gate and multiple-gate (MUGFET) field effect transistors, and with single-electron transistors and other structures. Embodiments are easily adapted to any targeted computing hardware platform supporting or not supporting a secure execution mode, such as UNIX workstations and PC-desktop platforms.

Figure 8:
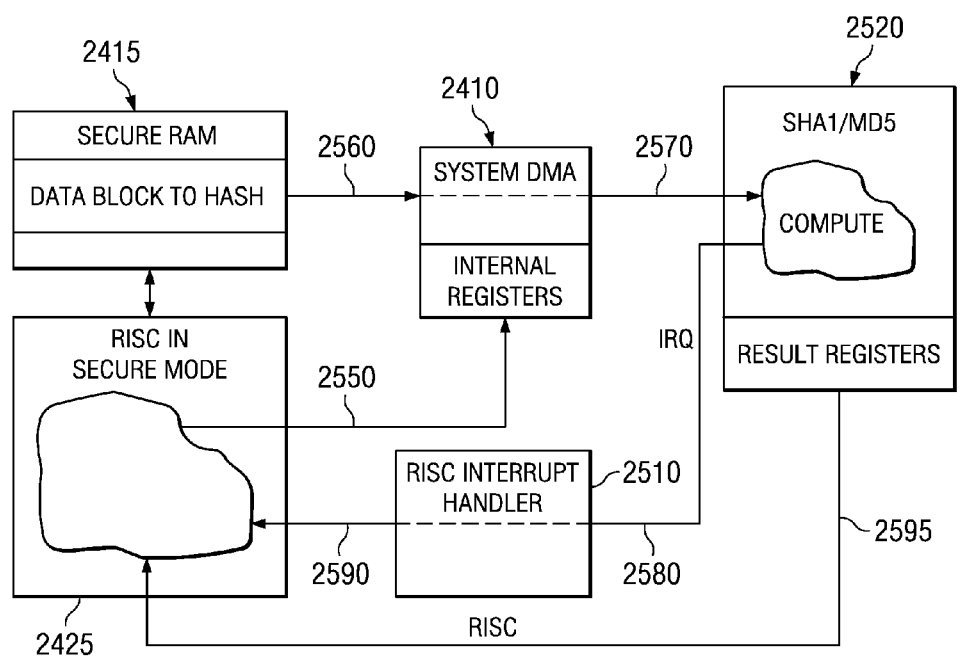
FIG. 8 is a block diagram further illustrating an inventive process and circuit for secure demand paging with a hash and DMA.

FIGS. 4 and 8 depict external storage SDRAM 1024 and secure Swapper 2160 of 4K pages being Swapped In and Swapped Out of the secure environment. A process of the structure and flow diagram of FIG. 4 suitably executes inside the secure environment as an integral part of the SDP manager code. Note that many pages illustrated in the SDP 1040 are held or stored in the external SDRAM 1024 and greatly increase the effective size of on-chip secure memory 1034.

A multi-tier hashing data structure and process at the top level results in a hash which represents all the external SDP pages and book-keeping. This process, also herein called a pyramid-hash process, consumes a little more acceptable overhead on Swap Out operations, because the bottom of the pyramid (all pages) does not need to be re-hashed, and the second-level tiers and higher tiers of the pyramid are recomputed. Swap In operations consume less overhead for hashing than Swap Out operations.

The SDP 1040 has a pool of pages that are physically loaded with data and instructions taken from a storage memory that is suitably encrypted (or not) external to the secure mode. SDP 1040 creates virtual memory in secure mode and thus confers the advantages of execution of software that far exceeds (e.g., up to 4 Megabytes or more in one example) the storage space in on-chip Secure RAM.

In FIG. 4, Secure RAM 1034 stores a pool of 4K pages, shown as a circular data structure in the illustration. The pool of pages in Secure RAM 1034 is updated by the SDP according to Memory Management Unit (MMU) page faults resulting from execution of secure software currently running on the system.

In FIG. 4, a processor such as an RISC processor, has a Memory Management Unit MMU with Data Abort and Prefetch Abort outputs. The processor runs SDP Manager code designated Secure Demand Paging Code in FIG. 4. The SDP Manager is suitably fixed in a secure storage of the processor and need not be swapped out to an insecure area.

At left, Protected Applications (PAs) occupy a Secure Virtual Address Space 2110 having Virtual Page Slots of illustratively 4K each. In this way, a Secure Virtual Memory (SVM) is established. Secure Virtual Address Space 2110 has Code pages I, J, K; Data pages E, F, G; and a Stack C. The Secure Virtual Address Space as illustrated has a Code page K and a Data page G which are respectively mapped to physical page numbers 6 and 2 in structure 2120, also designated PA2VA (physical address to virtual address). In some embodiments, the PA has its code secured by PKA (public key acceleration).

Some embodiments have PA2VA 2120 in FIG. 4 having Page Table Entries (PTEs) of 32 bits each, for instance. In operation, Swapped In pages from the PA (Protected Application) and the PA2VA 2120 are maintained secure on-chip. The PTEs identify which pages are stored in Secure RAM as illustrated in FIG. 4.

One of the bits in a PTE is a Valid/Invalid bit (also called an Active bit ACT[N] herein) illustrated with zero or one for Invalid (I) or Valid (V) entries respectively. An Invalid (I) bit state in ACT[N] or in the PA2VA for a given page causes an MMU page fault or interrupt when a virtual address is accessed corresponding to a physical address in that page which is absent from Secure RAM. Additional page-specific status information, such as bits for Locked page, Empty page, Dirty page, and other information are suitably stored for each page entry in the PA2VA.

Further in FIG. 4, a hardware arrangement is located in, associated with, or under control of a RISC processor. The RISC processor has an MMU (memory management unit) that has data abort and/or prefetch abort operations. The hardware supports the secure VAS (virtual address space) and includes a Secure static RAM. The Secure RAM is illustrated as a circular data structure, or revolving scavengeable store, with physical pages 1, 2, 3, 4, 5, 6. Stack C is swapped into physical page 5 of Secure SRAM, corresponding with the previously-mentioned Page Table Entry 5 for Stack C in the PA2VA. Similarly, Code K is swapped into physical page 6 of Secure SRAM, corresponding with the previously-mentioned Page Table Entry 6 for Code K in the PA2VA.

Associated with the Secure RAM is a Secure Swapper 2160. Secure Swapper 2160 is illustrated in FIGS. 5-8 and has secure Direct Memory Access (DMA) that feeds AES (encryption) and SHA (hashing) hardware accelerators. The secure swapping process and hardware protect the PA information at all times.

In FIG. 4, coupled to the Secure Swapper DMA 2160 is a non-secure DRAM 1024 holding encrypted and authenticated pages provided by SDP secure swapper 2160. The DRAM pages are labeled pages A, B, C (mapped to physical page 5), D, E, F, G (mapped to physical page 2), H, I, J, K (mapped to physical page 6), and L.

SDP hardware provides secure page swapping, and the virtual address mapping process is securely provided under Secure Mode. Code and Data for SDP Manager software are situated in Secure RAM in a fixed PPA (primary protected application) memory address space from which swapping is not performed. Execution of code sequences 2150 of the SDP Code control Secure Swapper 2160. For example, a High Level Operating System (HLOS) calls code to operate Public Key Acceleration (PKA) or secure applet. The PKA is a secure-state application (PA) that is swapped into Secure RAM as several pages of PKA Code, Data and Stack.

In FIG. 4, a number N−1 Valid Bits exist in the page entries of the PA2VA 2120 at any one time because of a number N (e.g. six in the illustration) of available Secure RAM 1034 pages. In some embodiments, one spare page is suitably kept or maintained for performance reasons. Page Data is copied, swapped, or ciphered securely to and from the DRAM 1024 to allow the most efficient utilization of expensive Secure RAM space. In Secure RAM 1034, pages are positioned exactly at the virtual address positions where they are needed, dynamically and transparently in the background to PAs.

In FIG. 4, SDP software coherency with the hardware is maintained by the MMU so that part of the software application is virtually mapped in a Secure OS (Operating System) virtual machine context VMC according to Virtual Mapping 2120. In this example, the VMC is designated by entries "2" in a column of PA2VA. A locked asynchronous messaging destination page for a VMC designated "5," for instance, is set up by establishing an entry "5" (not shown) in the VMC column of PA2VA at a row pertaining to the physical address in Secure RAM at which the virtual address of that destination page is mapped. Setting up and using such pages are discussed in connection with FIGS. 25 and 27 and elsewhere herein.

If a context switch is performed, then the VMC entries in PA2VA are changed to a new VMC identification number. The part of the software application is that part physically located in the Secure RAM and has a Physical Mapping 2120 according to a correspondence of Virtual Pages of Virtual Mapping 2110 to respective physical pages of the Physical Mapping 2120.

The information representing this correspondence of Virtual Mapping to Physical Mapping is generated by the MMU and stored in internal buffers of the MMU.

The virtual space is configured by the MMU, and the DRAM 1024 is physically addressed. Some embodiments use a single translation vector or mapping PA2VA from the virtual address space to physical address space according to a specific mapping function, such as by addition (+) by itself or concatenated with more significant bits (MSB), given as $$\text{Virtual\_address\_space} = \text{phy\_address\_space} + x,$$

where x is an MSB offset in an example 4 GBytes memory range [0:4 GB]+y, and where y is an LSB offset between the virtual address and the physical address in Secure RAM.

In FIG. 4 the scavenging process puts a new page in a location in physical Secure RAM 1034 space depending on where a previous page is swapped out. Accordingly, in Secure RAM space, the additional translation table PA2VA 2120 is provided to provide an LSB address offset value to map between the virtual address and the physical address in Secure RAM. MSB offsets x are stored in a VMC_MMU_TABLE in Secure RAM.

In some mixed-memory embodiments DRAM 1024 has enough shorter access time or lower power usage than Flash memory to justify loading and using DRAM 1024 with pages that originally reside in Flash memory. In other embodiments, SDP swaps in PA from Flash memory for read-only pages like PA code pages and the PA is not copied to DRAM. In still other embodiments, parts of the PA are in Flash memory and other parts of the PA are copied into DRAM 1024 and accessed from DRAM 1024. Accordingly, a number of embodiments accommodate various tradeoffs that depend on, among other things, the relative economics and technology features of various types of storage.

In establishing Mappings 2110 and 2120 and the correspondence therebetween, the following coherency matters are handled by SDP.

Figure 5:
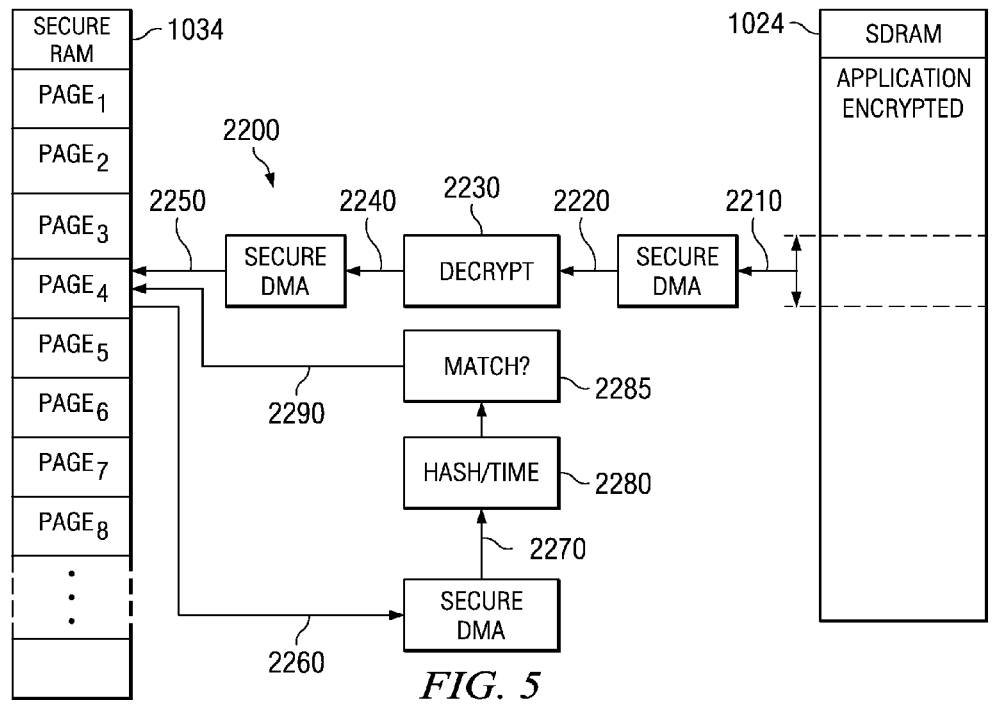

When loading a new page into Page Slot N in Secure RAM as described in FIG. 5, the previous Virtual to Physical mapping is no longer coherent. The new page corresponds to another part of the source application. The Virtual Mapping 2110 regarding the Swapped Out previous page N is obsolete regarding Page N. Entries in the MMU internal buffers representing the previous Virtual to Physical Mapping correspondence are now invalidated such as in a Privileged mode. The SSM 2060 is used to enforce the security. An access to that Swapped Out page generates a Page Fault signal.

Analogously, entries in an instruction cache hierarchy at all levels (e.g. L1 and L2) and in a data cache hierarchy at all levels are invalidated to the extent they pertain to the previous Virtual to Physical Mapping correspondence. Accordingly, a Swapped Out code page is handled for coherency purposes by an instruction cache range invalidation relative to the address range of the Code page. A Data page is also analogously handled by a data cache range invalidation operation relative to the address range of the Data page. Additionally, for loading Code pages, a BTAC (Branch Target Address Cache or Branch Target Buffer BTB) flush is executed at least in respect of the address tags in the page range of a wiped Code page, in order to avoid taking a predicted branch to an invalidated address.

When wiping out a page from Secure RAM 1034, some embodiments include in RAM 1034 Code pages that are always read-only. Various of these embodiments distinguish between Data (Read/Write) pages and Code (Read Only) pages. If the page to wipe out is a Data page, then to maintain coherency, two precautions are executed. First, the Data cache range is made clean (dirty bit reset) in the range of addresses of the Data Page. Second, the Write Buffer is drained so that any data retained in the data caches (L1/L2) are written and posted writes are completed. If the page to wipe out is a Code page, the wiping process does not need to execute the just-named precautions because read-only Code pages were assumed in this example. If Code pages are not read-only, then the precautions suitably are followed.

The SDP paging process desirably executes as fast as possible when wiping pages. Intelligent page choice reduces or minimizes the frequency of unnecessary page wipes or Swaps since an intelligent page choice procedure as disclosed herein leaves pages in Secure RAM that are likely to be soon used again. Put another way, if a page were wiped from Secure RAM that software is soon going to use again, then SDP would consume valuable time and power to import the same page again.

An additional consideration in the SDP paging process is that the time consumption for wiping pages varies with Type of page. For example, suppose a Code Page is not required to be written back to the external memory because the Code Page is read-only and thus has not been modified. Also, a Data Page that has not been modified does not need to be written back to the external memory. By contrast, a Data Page that has been modified is encrypted and hashed and written back to the external memory as described in connection with FIG. 6.

FIG. 5 depicts SDP hardware and an SDP process 2200 when importing a new page from SDRAM 1024. Consider an encrypted application in the SDRAM 1024. The description here equally applies to Code pages and Data pages. A step 2210 operates so that when a new page is needed by a processor and that page is missing from Secure RAM 1034, then that page is read from an application source location in the SDRAM 1024. Next a step 2220 performs a Secure DMA (Direct Memory Access) operation to take the new page and transfer the new page to a decryption block 2230. In a step and structure 2240, the decryption block 2230 executes decryption of the page by AES (Advanced Encryption Standard) or 3DES (Triple Data Encryption Standard) or other suitable decryption process. As the AES/3DES accelerator 2230 is decrypting the content, the output of the AES/3DES accelerator 2230 is taken by another Secure DMA operation in a step 2250.

Then, in FIG. 5, Secure DMA overwrites a wiped Secure RAM page with the new page, e.g., at page position Page4 in the Secure RAM 1034. Further, Secure DMA in a step 2260 takes the new page from Secure RAM 1034 and transfers the new page in a step 2270 to a hashing accelerator 2280 in process embodiments that authenticate pages. The hashing accelerator 2280 calculates the hash of the new page by SHA1 hashing or other suitable hashing process to authenticate the page. Block 2280 also detects any time stamp accompanying the page. A comparison structure and step 2285 compares the page hash with a predetermined hash value. Time stamp values are suitably compared along with, or instead of, the hashes. If the page hash fails to match the predetermined hash value, or the time stamp comparison fails, the page is wiped from Secure RAM in a step 2290, or alternatively not written to Secure RAM 1034 in step 2250 until the hash authentication is successful. If the page hash matches the predetermined hash value for that page, the page remains in Secure RAM, or alternatively is written to Secure RAM by step 2250, and the page is regarded as successfully authenticated. A suitable authentication process is used with a degree of sophistication commensurate with the importance of the application.

Figure 6:
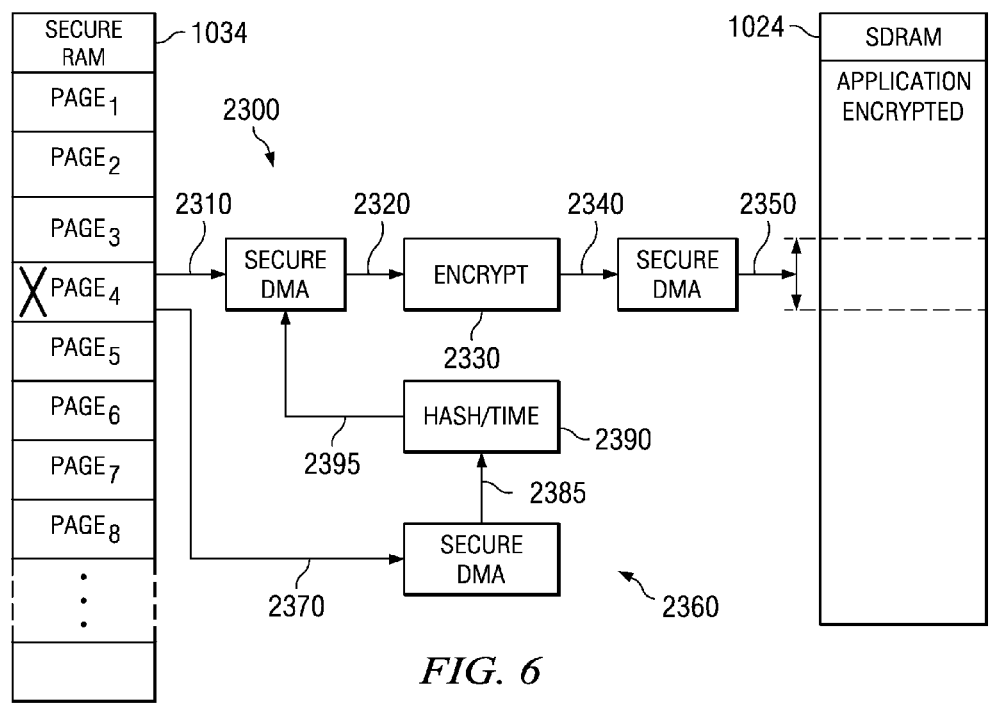
FIG. 6 is a block diagram further illustrating an inventive process and circuit for secure demand paging performing a Swap Out.

FIG. 6 depicts an SDP process 2300 of wiping out and Swapping Out a page. The SDRAM, Secure RAM, Secure DMA, encryption/decryption accelerator 2330, and hashing accelerator 2390 are the same as in FIG. 5, or provided as additional structures analogous to those in FIG. 5. The process steps are specific to the distinct SDP process of wiping out a page such as Page4. In a version of the wiping out process 2300, a step 2310 operates Secure DMA to take a page to wipe and Swap Out, e.g., Page 4 from Secure RAM 1034. A step 2320 transfers the page by Secure DMA to the AES/3DES encryption accelerator 2330. Then in a step 2340 the AES/3DES encryption accelerator encrypts the content of the page. Secure DMA takes the encrypted page from AES/3DES encryption accelerator in a succeeding step 2350 and transfers and writes the page into the external SDRAM memory and overwrites the previous page therein. In the process, the wiped out Page4 information may be destroyed in the internal Secure RAM 1034, such as by erasing or by replacement by a replacement page according to the process of FIG. 5. Alternatively, the Page4 may be wiped out by setting a page-specific bit indicating that Page4 is wiped.

In FIG. 6 a further SDP process portion 2360 substitutes for step 2310 the following steps. Secure DMA in a step 2370 takes the page from Secure RAM 1034 and transfers the page in a step 2385 to the hashing accelerator 2390 in process embodiments involving authenticated pages. The hashing accelerator 2390 calculates and determines the hash value of the new page by SHA1 hashing or other suitable hashing process. In this way, accelerator 2390 thus provides the hash value that constitutes the predetermined hash value for use by step 2285 of FIG. 5 in looking for a match (or not) to authenticate a page hash of a received Swapped In page. Block 2390 also suitably time stamps the page header along with hashing, or in lieu of hashing. The page content of Page4 and the thus-calculated hash value are then obtained by Secure DMA in a step 2395 whereupon the process continues through previously-described steps 2320, 2330, 2340, 2350 to write the page and hash value to the external memory SDRAM 1024.

Figure 7:
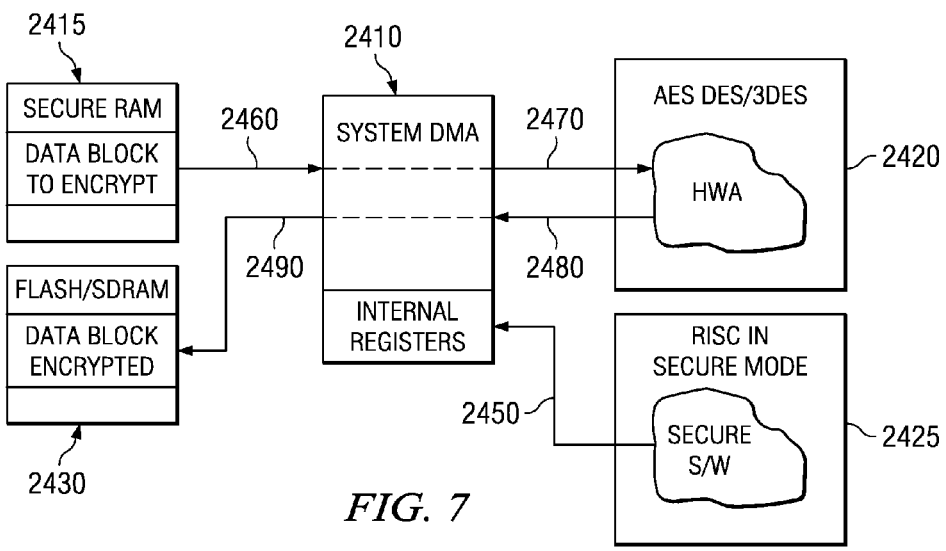
FIG. 7 is a block diagram further illustrating an inventive process and circuit for secure demand paging with encryption and DMA (direct memory access).

In FIG. 7, AES/xDES block encryption/decryption functional architecture includes a System DMA block 2410 coupling Secure RAM 2415 to encryption HWA 2420. A RISC processor 2425 operates Secure Software (S/W) in Secure Mode. On Swap Out, an encrypted data block is supplied to Memory 2430 such as a DRAM, Flash memory or GPIOs (General Purpose Input/Outputs). The decryption process on Swap In is the same as the one described in FIG. 7 but with memory 2430 as data block source and Secure RAM 2415 as data block destination.

Now consider the flow of an encrypted Swap Out process executed in FIG. 7. In a step 2450, RISC processor 2425 in Secure Mode configures the DMA channels defined by Internal registers of System DMA 2410 for data transfer to cryptographic block 2420. Upon completion of the configuration, RISC processor 2425 can go out of secure mode and execute normal tasks. Next, in a step 2460 Data blocks are automatically transferred from Secure RAM via System DMA 2410 and transferred in step 2470 to encryption block 2420 for execution of AES or xDES encryption of each data block. Then in a step 2480, Data blocks are computed by the chosen HWA (hardware accelerator) crypto-processor 2420 and transmitted as encrypted data to System DMA 2410. The process is completed in a step 2490 wherein encrypted Data blocks are transferred by DMA 2410 to memory 2430.

In FIG. 8, SHA1/MD5 Hashing architecture includes the System DMA block 2410 coupling Secure RAM 2415 to Hash HWA 2520. RISC processor 2425 operates Secure Software (S/W) in Secure Mode. System DMA 2410 has Internal Registers fed from the RISC processor. Hash block 2520 has Result registers coupled to the RISC processor. An Interrupt Handler 2510 couples Hash block 2520 interrupt request IRQ to the RISC processor 2425.

The flow of a Hash process executed in FIG. 8 is described next. In a step 2550, RISC processor 2425 in Secure Mode configures the DMA channels defined by Internal registers of System DMA 2410 for data transfer to Hash block 2520. Upon completion of the configuration, RISC processor 2425 can go out of secure mode and execute normal tasks. Next, in a step 2560 a Data block is automatically transferred from Secure RAM 2415 via System DMA 2410 and transmitted in step 2570 to Hash block 2420. A hash of the data block is generated by the chosen HWA crypto-processor 2520 by SHA-1 or MD5 or other suitable Hash. In a succeeding step 2580, HWA 2520 signals completion of the Hash by generating and supplying interrupt IRQ to Interrupt Handler 2510. Interrupt Handler 2510 suitably handles and supplies the hash interrupt in a step 2590 to RISC processor 2425. When the interrupt is received, if RISC processor 2425 is not in Secure Mode, then RISC processor 2425 re-enters Secure Mode. The process is completed in a step 2595 wherein RISC processor 2425 operating in Secure Mode gets Hash bytes from Result registers of HWA 2520 and delivers them to Secure RAM 2415.

FIGS. 9A-9E show structures and operations thereon progressing in sequence in the order of the FIGS. 9A-9E in the manner of an animation visual. Structures are diagrammatically emphasized and de-emphasized variously in FIGS. 9A-9E to more effectively depict the operations. Each of FIGS. 9A-9E is divided approximately in half with a Non-Secure Execution State at left and a Secure Execution State or environment at right. The Secure Execution environment (S.E.) at right is protected by a hardware Secure State Machine 2060 of FIG. 3. The Non-Secure Execution State has a Non-Secure Virtual Address Space (VAS) 2830 with virtual page slots holding a Non-Secure Client Application and Parameters and Data for that Client Application.

HLOS (High Level Operating System) Page Tables 2840 refer to virtual page slots of VAS 2830 in the Non-Secure Execution State. The Secure Environment (S.E.) has S.E. Page Tables 2850 which refer to virtual page slots in a Secure Virtual Address Space (VAS) 2860. The page slots of VAS 2860 hold a Protected Application (PA) and Parameters and Data for that PA. A CPU (Central Processing Unit) 1030 of FIG. 1, such as of a RISC processor, has an associated Memory Management Unit (MMU) which is able to access the HLOS Page Tables 2840 when the system is in either Secure Mode or not, and is able to access the S.E. Page Tables 2850 when the system is in Secure Mode. In the non-secure world of the processor, the HLOS controls the page tables, flushes cache and TLB (translation lookaside buffer), turns off MMU, and executes instructions to do a signature check by SSM for no cache hits. Then operations inside the MMU does back and load pointer to point to the Secure Page Table. This procedure, in effect, confers the functionality of two MMUs for the price of one MMU. The MMU is time-shared for both secure operations and non-secure operations.

In FIGS. 9A-9E, a PA larger than secure static RAM (Secure RAM 1034 of FIGS. 9C-9E, omitted for clarity in FIGS. 9A-9B) is loaded with no changes to the Load Manager. Load Manager loads the PA without even realizing that the PA is larger than the actual physical secure Static-RAM. In fact, the Load Manager needs no modifications or special code to handle or manage SDP (Secure Demand Paging) and thus Load Manager is and can be unaware of SDP. In some embodiments SDP transparently or invisibly executes beneath the Load Manager, and conveniently loads PAs larger than real Secure RAM 1034.

For example, a cryptographic server library 2861 and cryptographic text parameters are mapped in the S.E. VAS 2860 and are together larger than Secure RAM 1034. The cryptographic server library includes a Triple-DES (TDES) PA 2861, for instance. The TDES PA 2861 in part or in whole is held in the Secure RAM 1034 when the TDES PA 2861 is executed. The rest of the cryptographic server library is held in a secure manner in DRAM 1024 but is not physically situated in the Secure RAM 1034.

Figure 9A:
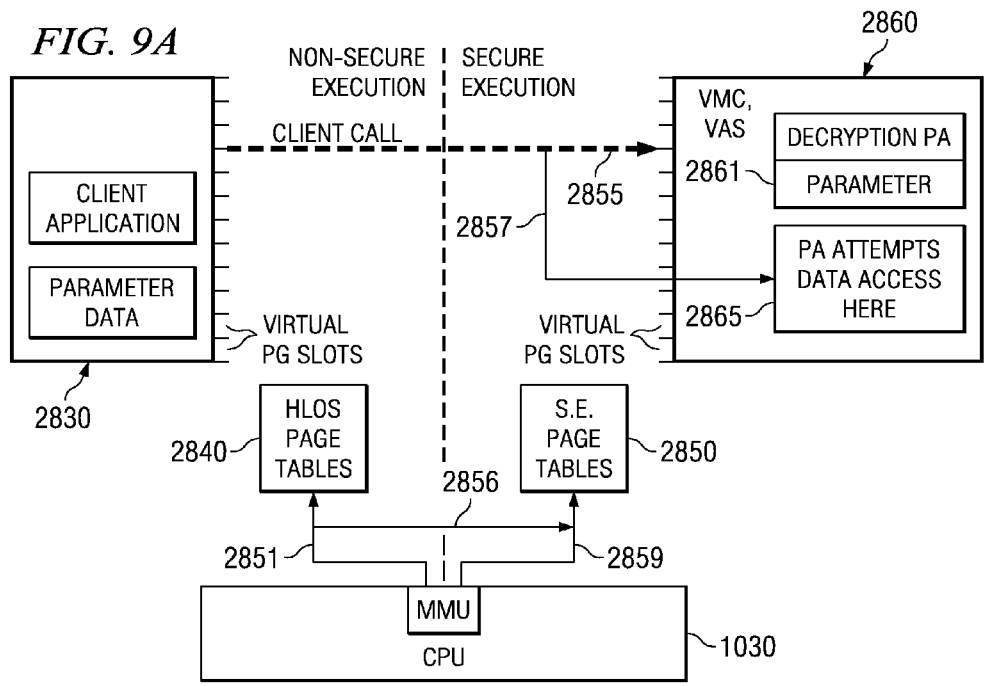

In FIG. 9A, Client executes a Call 2855 to TDES Decryption PA 2861 and also provides a cryptographic text virtual address pointer 2857. To perform this Call, the MMU consults HLOS Page Tables 2840 by a non-secure HLOS Page Table access 2851. If the called program were not a PA (Protected Application), then the non-secure HLOS Page Table access 2851 would ordinarily succeed in properly configured non-secure space.

In the case wherein the called program is a PA, the non-secure HLOS Page Table access 2851 fails. An operation 2856 switches the access mode to make a secure access 2859 to S.E. Page Tables 2850. The Decryption PA 2861 is available in Secure Mode. Access 2859 successfully advances the Client Call 2855 to Decryption PA 2861. Next, PA 2861 attempts a secure data access 2871 to a virtual page slot 2865 based on the pointer 2857.

Figure 9B:
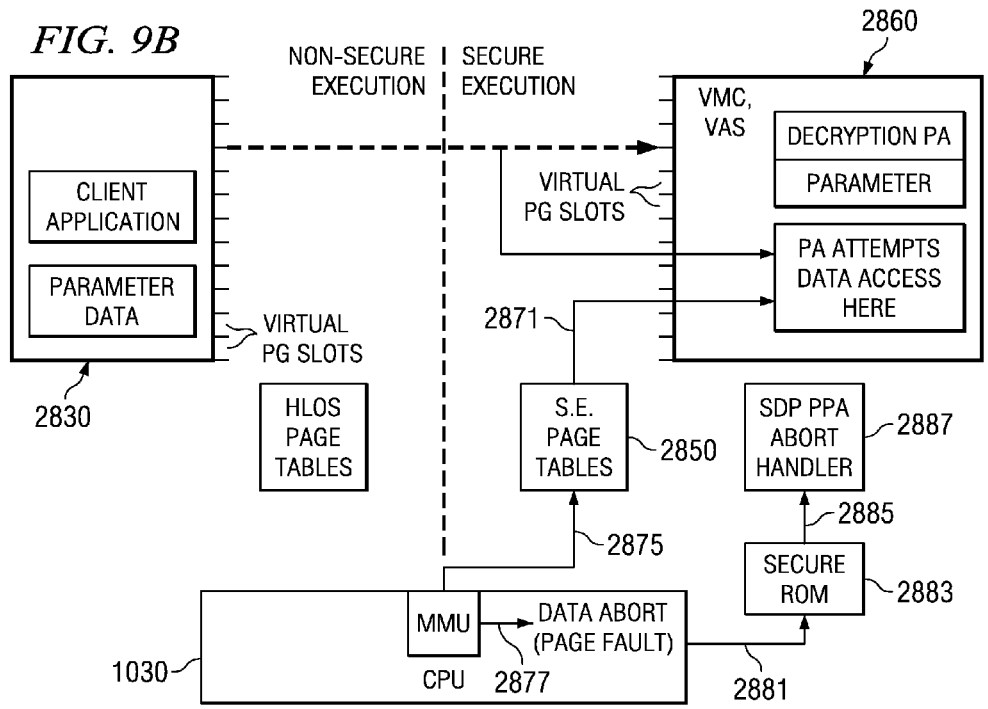

In FIG. 9B, if the physical page of Secure RAM 1034 holds the data corresponding to virtual page slot 2865, then the attempted secure data access 2871 succeeds and operations proceed with execution of the TDES Decryption PA 2861.

FIG. 9B also shows the case wherein the attempted secure data access fails because the data corresponding to virtual page slot 2865 is not present in Secure RAM 1034. Operations in FIGS. 9B-9E effectively expand Secure RAM 1034 by successfully bringing the secure data access to completion in a secure manner when the attempted secure data access 2871 fails. In FIG. 9B, an operation 2871 executes an MMU Page Table walk for the virtual access to which access is attempted based on the S.E. Page Tables. MMU performs plural accesses and lookups in the S.E. Page Tables in an operation 2875. When the attempted secure data access fails under operations 2871 and 2875, MMU reaches a Data Abort state 2877. This Data Abort state 2877 is used as a Page Fault for SDP operations. Based on the Data Abort state 2877, CPU makes an access 2881 to Secure ROM 2883. Secure ROM 2883 responds with an entry point address 2885 to vector operations to a Data Abort Handler 2887 of the SDP PPA (Secure Demand Paging Primary Protected Application).

FIG. 9C shows further aspects of operations at this point. SDP Data Abort Handler 2887 responds with one or more signals 2891 so that MMU ceases access activity to the S.E. Page Tables and this cessation is indicated by "X" 2893 and "X" 2895. Data Abort Handler 2887 by signal(s) 2891 activates a search 2897 in VMC VAS (Virtual Machine Context Virtual Address Space) reserved in DRAM 1024 for SDP code, data and stack (see FIG. 10). The search 2897 finds the page that is missing from Secure RAM at virtual page slot 2899. The missing page is retrieved in an operation 2905 Page Found and provided to Secure RAM 1034 as a Physical Page 2910 emphasized by an outline rectangle in FIG. 9C.

In FIG. 9D, SDP operations proceed in an operation 2911 to map the Physical Page 2910 into a virtual page slot in the Secure VAS 2860 by updating the S.E. Page Tables 2850, analogous to PA2VA 2120 of FIG. 4. Also SDP operations Swap In the page as shown in FIGS. 5 and 7. An operation 2915 of FIG. 9D activates hardware accelerators to decrypt and authenticate the Physical Page 2910 retrieved in step 2905. If decryption and authentication procedure on the Physical Page 2910 are unsuccessful, an SDP error is issued and protective measures are activated. Upon successful decryption and authentication of the Physical Page 2910, the Physical Page 2910 is now valid and mapped by the S.E. Page Tables 2850 as depicted by an arrow 2913 into a virtual page slot 2917 in Secure VAS 2860.

Figure 9E:
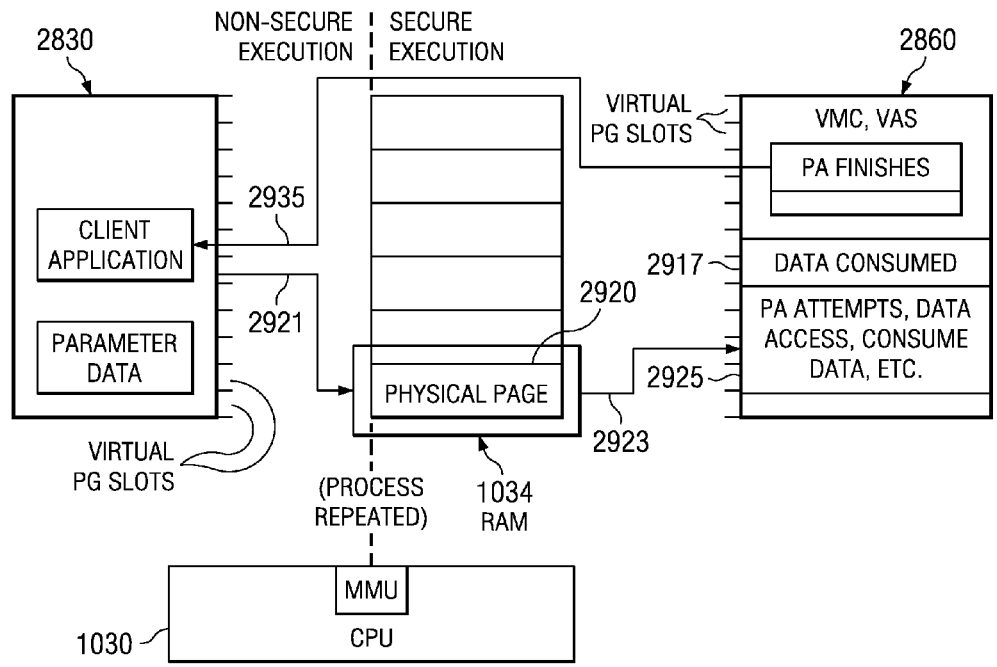

In FIG. 9E, the PA proceeds with the TDES decrypt called by Client in FIG. 9A and consumes the data of the Physical Page in virtual page slot 2917 of FIG. 9D. If and as the PA requires further data, the process of FIGS. 9B, 9C, 9D (an example of Swap In of SDP) is repeated as illustrated by search and access 2921 to obtain a further Physical Page 2920. SDP decrypts and authenticates the page from DRAM to obtain the further Physical Page 2920 and maps the further Physical Page 2920 as shown by arrow 2923 to another virtual page slot 2925 in the Secure Environment. The TDES PA consumes data in virtual page slots such as 2925 and finishes the TDES decrypt that was called for by Client in FIG. 9A. Upon completion of operations of the PA, the PA signals completion 2935 back to the Client Application whereupon this example of secure operations are completed using SDP.

TABLE 1

| ACRONYMS AND ABBREVIATIONS | |
|---|---|
| AES | Advanced Encryption Standard |
| B | Byte (8 bits). |
| CS | Chip Select. |
| DES/3DES | Data Encryption Standard/Triple-DES |
| DMA | Direct Memory Access |
| DRM | Digital Rights Management |
| HW | Hardware |
| HLOS | High Level Operating System |
| HMAC | Hashed Message Authentication Code |
| IRQ | Interrupt. |
| ISR | Interrupt Service Routine. |
| KB | Kilobyte, 1024 B. |
| MB | Megabyte, 1024 KB. |
| MPU | Microprocessor Unit. |
| OS | Operating System. |
| PPA | Primary Protected Application. |
| POR | Power On Reset. |
| RAM | Random Access Memory. Internal static RAM, e.g., for apps chip. |
| ROM | Read Only Memory. |
| PA | Protected Application (signed, for execution in SE) |
| PG | Page |
| RSA | Public Key Algorithm |
| SDP | Secure Demand Paging |
| SDRAM | Synchronous Dynamic Random Access Memory. |
| SE | Secure Environment, protected against tampering by SSM. Sensitive code can be executed securely while having access to rest of SE. |
| SHA-1 | Secure Hash Algorithm, version 1 |
| SSM | Secure State Machine |
| SVM | Secure Virtual Machine |
| SW | Software |
| VAS | Virtual Address Space that SDP controls |
| VMM | Virtual Machine Manager. See also VMC-Switch description. |

TABLE 2

Figure 11:
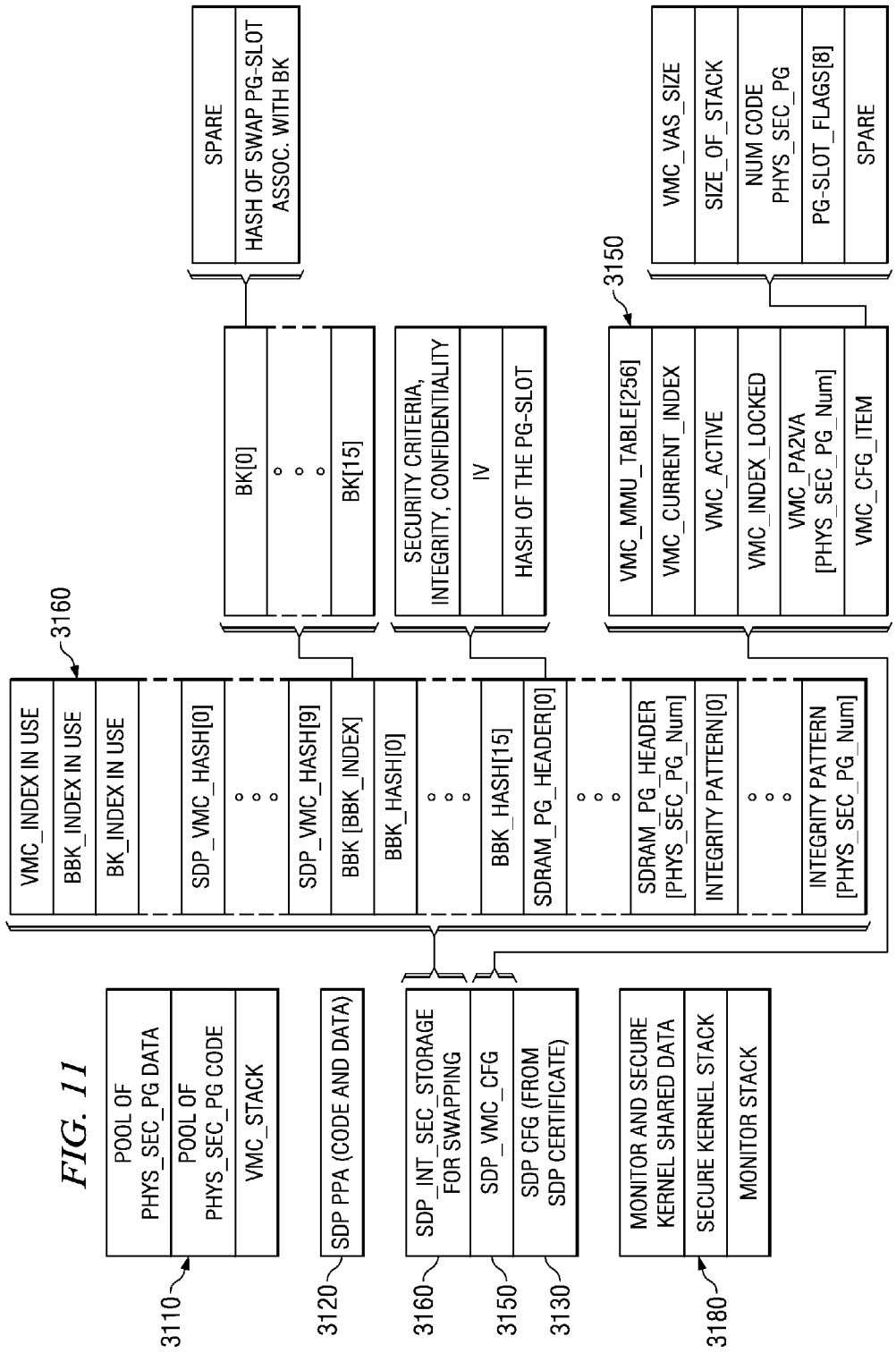
FIG. 11 is a diagram of successively exploded views depicting physical address space in internal Secure RAM for use in embodiments of inventive structures and processes including inventive Secure Demand Paging.
Figure 12:
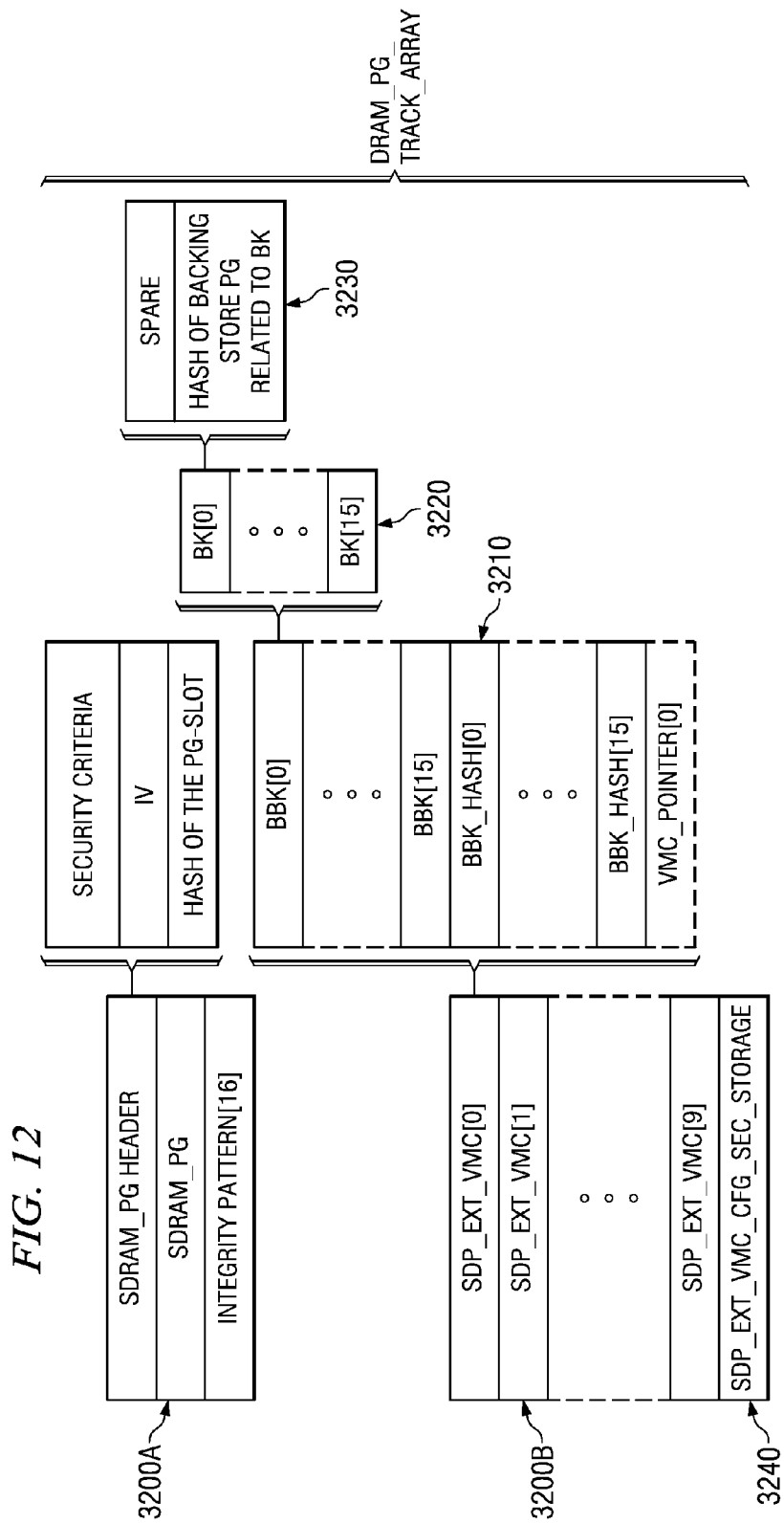
FIG. 12 is a diagram of successively exploded views depicting physical address space in external non-secure DRAM for use in embodiments of inventive structures and processes including inventive Secure Demand Paging.

| DEFINITIONS FOR SOME EMBODIMENTS | |
|---|---|
| PG | Page. 4K size memory block aligned on 4K. |
| PHYS_SEC_PG | A physical Secure RAM PG which is dynamically mapped into different PG_SLOT positions in the VAS for creating, in effect or in operation as if there were, a much larger secure virtual memory. |
| Backing Store | Memory (e.g., SDRAM) to store dormant PGs while not slotted in VAS. Backing refers to the backup of Secure RAM by DRAM storage. |
| Backing Store PG | Memory area that contains one SDRAM_PG and its associated Header. |
| Backing Page | A particular 4K page that is backing up a swapped 4K slot in the VAS. Pages are swapped in and out of DRAM much faster than conventional hard disk swap, and encrypted, decrypted, and hashed in SDP swapping. |
| Certificate | Data block that is digitally signed with a private key. |
| SDRAM_PG | PG unit element of the Backing Store. This PG can be encrypted for security purposes. |
| SDRAM_PG Header | Header associated with a SDRAM_PG. |
| Dirty | This attribute applies to a PHYS_SEC_PG and indicates that a datum has been modified in the PG. |
| Clean | This attribute applies to a PHYS_SEC_PG and indicates that no datum has been modified in the PG. |
| MMU | Memory Management Unit—a functional subsystem of a microprocessor which allows dynamic memory remapping and allows SDP and other advanced memory management capabilities to occur with the proper software subsystem to manage such activity. |
| VMC | Virtual Memory Context—Tracking Structure for a Secure Process that indicates the state of the private secure virtual address space (VAS). VMC allows VAS to be maximally utilized for secure processes. VMC context switch dynamically remaps VAS for each secure process that contains a NPPA. |
| Activate (VMC) | Activation creates a VMC by initializing the BK/BBK structure and internal SDP structure of FIGS. 11 and 12. |
| De-activate (VMC) | De-activation kills a VMC by clearing the SDP structure of FIGS. 11 and 12 pertaining to that VMC and cleans the page pool in SDP governed Secure RAM of any page pertaining to that VMC. |
| Switch (VMC) | Switching performs a context switch between two activated VMCs. The MMU tables are updated and the SDP structure of FIGS. 11 and 12 is updated to indicate the new VMC to which the switch is made. A switch can be made to the same VMC several times during code execution. |
| Multi-VMC | Multiple Virtual Memory Contexts—Supports re-use of the same virtual address space. Re-use of VAS protects and prevents one NPPA from accessing data of another NPPA data because Data and Code of the other NPPA are inaccessible because not mapped into VAS at that time. |
| Secure Mode | Execution mode protected by SSM. Secure RAM and Secure ROM, and Control and Status registers of HW secure resources are made accessible in Secure Mode. Interrupt handling protects security of secure code and secure resources in run, exit and resume. |
| NPPA | Non-Privileged Protected Application with memory page attributes set to non-privileged. |
| PPA | Privileged Protected Application. Memory page attributes set to privileged. |
| Supervisor PA | Protected Application with memory PG attributes set to supervisor privilege. This PA will have access to any resources of the entire platform. Also called Secure Supervisor. |
| User PA | NPPA with memory page attributes set to user privilege |
| PA2VA | Allocation table of physical pages PHYS_SEC_PG to virtual page slots PG_SLOT. |
| PG_TRACK ARRAY | This array holds PG_TRACK structures for all VMCs in Backing Store. |
| PG_TRACK_xxx | Data structure in Backing Store for one VMC. Includes Pages, Hashes, and Book Keeping structure. |
| PG_SLOT | PG_SLOT is a 4K addressable area of the VAS, with or without a PHYS_SEC_PG allocated to the slot. Page Slot is a 4K addressable area of the secure virtual memory, with or without a physical page actually allocated to the slot. Usage example: After a page fault, Scavenger finds a page candidate and de-slots and re-slots the page to resolve the fault. |
| PG_FAULT | Page Fault signal generated by RISC MMU when it detects invalid PG_SLOT in VAS as signified by second-level descriptor bits low. This signal is supplied by one example of MMU via two different exceptions, the Data Abort Exception and the Prefetch Abort Exception. |
| SCAV | SDP Scavenger. Frequently called to determine Secure RAM PG to be used, stolen or evicted next for resolving page fault. SCAV maintains a PA2VA array for each VMC. Each element has a PG_SLOT index into VMC VAS. SCAV process enhances SDP performance. |
| SDP_CFG | Secure Demand Paging Configuration Module—A structure configured and signed by OEM, supplied in binary form, and loaded into Secure RAM. Validated by SE prior to initializing SDP. SDP_CFG provides OEM configuration information for SDP. |
| SDP_VMC_CFG | Structure loaded in Secure RAM provides all required information at run time for a VMC. |

TABLE 2-continued

DEFINITIONS FOR SOME EMBODIMENTS

| | |
|---|---|
| Swap In | The PG retrieval operation from Backing Store, which occurs when PG-FAULT occurs, to load the appropriate code or data into a PHY_SEC_PG which is re-slotted or re-mapped into the faulting PG_SLOT. |
| Swap Out | The PG backup operation to the Backing Store performed when a modified PHY-SEC-PG is identified by the Scavenger to be wiped. |
| Virtual Memory | An architecture wherein memory or CPU address space is statically or dynamically re-mapped via some MMU address translation hardware. Control of that address translation hardware, via either software, hardware or both, can greatly differ from one implementation of virtual memory to the next. |
| Wiping advice (Page) | Identifying a PHYS_SEC_PG or PG_SLOT by Scavenger as being the Least Used PG or otherwise highest priority for wiping. Unmodified Data pages and unmodified Code pages are typically higher priority for wiping since no Swap Out is involved. In an environment lacking self- modifying code, Code PGs are unmodified by definition. |
| Wipe (Page) | Wiping clears a page bit or other entry pertaining to a physical page in internal RAM such as Secure RAM so that the physical page is available to be cleared by a Page Clear mode or replaced by Swapping. Wiping is different from Swapping. |
| Flush (Page) | Outside a wiping advice process or based on different considerations than wiping advice, page flush identifies a specific page to be wiped, such as prior to Swapping in a locked page having same virtual address offset value but in another VMC than the flushed page. |
| DRAM-SWAP | Another name for Backing Store. A physically contiguous area of non-secure DRAM which is utilized for the backing of SDP-created VAS. Pages are swapped in and out of DRAM much faster than conventional hard disk swap, and encrypted, decrypted, and hashed in SDP Swapping. |

SDP provides security with much greater extensibility and flexibility that increases performance and security using a limited resource, the internal Secure SRAM 1034.

The Secure Demand Paging (SDP) herein is provided between internal, on-chip Secure RAM 1034 and external, off-chip DRAM and endowed with secure cryptography extensions added to Swap operations for purposes of insuring that data which is swapped out to SDRAM will remain secure and be integrity-checked for unauthorized modification. The Secure RAM 1034 is internal on-chip. Hardware security, such as SSM 2060, isolates and prevents external chip pins from being used to electronically monitor, snoop, or eavesdrop on secure applications execution on-chip. SDP securely bridges the internal-external divide between Secure RAM and off-chip DRAM and solves security, memory space, processing burden and real estate issues.

SDP benefits secure application processors by running programs much larger in size than the integrated on-chip secure memory would allow without SDP. The underlying SDP memory management hardware and software transparently operate, such as on an interrupt (or exception vector) basis. The secure applications developer can write such applications as flat and large as desired and need not consider secure code memory space issues because constraints on secure memory space are obviated or greatly reduced. The secure applications software need not be aware that PG data may be initially absent from Secure RAM 1034. The Swap operations are transparently done in a just-in-time manner such that the running application program has no awareness of the swapping operations which are dynamically occurring to underlying pages of its program Code and/or Data.

A Protected Application (PA) software program instead merely is limited to the size of virtual memory (e.g. high capacity DRAM) used for SDP herein, as opposed to a much smaller (e.g., less by an order of magnitude or more) on-chip secure SRAM physical memory constraint which would be imposed without SDP. Without SDP, the on-chip secure SRAM constraint for secure applications code is believed to force partitioning of any larger application into multiple overlay modules. Overlay module systems introduce even further design constraints which restrict simple function calling between partitioned modules as well as induce other undesirable constraints, for fitting larger amounts of software functionally into a limited memory resource. SDP as taught herein obviates these constraints and unnecessary complications, and instead facilitates a much simpler secure application development.

The MMU provides a Page Fault signal 2877 of FIG. 9B to the system control code. The Page Fault (PG Fault) signal 2877 notifies control code in real time to Swap memory blocks at an appropriate time and memory location for application program access. The system control code responds to the PG fault to swap fixed size chunks of memory (e.g., 4 KB in size) in and out of a limited primary CPU storage to a much larger external storage and makes the much smaller, faster and more expensive physical memory resource such as Secure RAM 1034 virtually look much larger. SDP as described herein removes size constraints hitherto imposed on large secure applications such as DRM (Digital Rights Management) applications which might otherwise be partitioned or divided into overlay segments and impose constraints on permitted code operations.

SDP creates, locates, re-uses and partitions a reserved virtual memory address space for SDP and herein called Virtual Address Space (VAS). VAS is created at any suitable location in virtual address space accessible by a given processor. Other storage such as Secure ROM and I/O devices also use virtual addresses, and do not need to be controlled by SDP depending on embodiment.

SDP is also applicable in a multi-process, multi-threading system. SDP re-uses the VAS by context switching the address space in time via dynamic changes to the MMU page tables. This time division multiplexing of VAS by SDP provides for multiple virtual address spaces, at points in time. In some embodiments, one particular context is active at any particular time. These contexts provide a basis of creating secure processes in SDP. Each secure process is assigned an associated Virtual Memory Context (VMC), thereby providing very secure attributes for NPPAs (non-privileged PAs).

SDP confers security wherein a PA running in a secure process is prevented from modifying or executing code in another secure process. Different PAs are thus isolated from one another. This secure attribute occurs when SDP permits one PA to be mapped into the address space at a time. A particular secure process is active with an executing PA, which implies that the secure process is currently mapped into the VAS. Accordingly, any Code or Data of another secure process or PA is prevented from being mapped into the VAS at the same time, due to the VAS context only mapping the private resources of a single secure process at any particular point in time. Code in one secure process has no way of modifying or accessing code in another secure process, thus isolating the secure processes.

Figure 10:
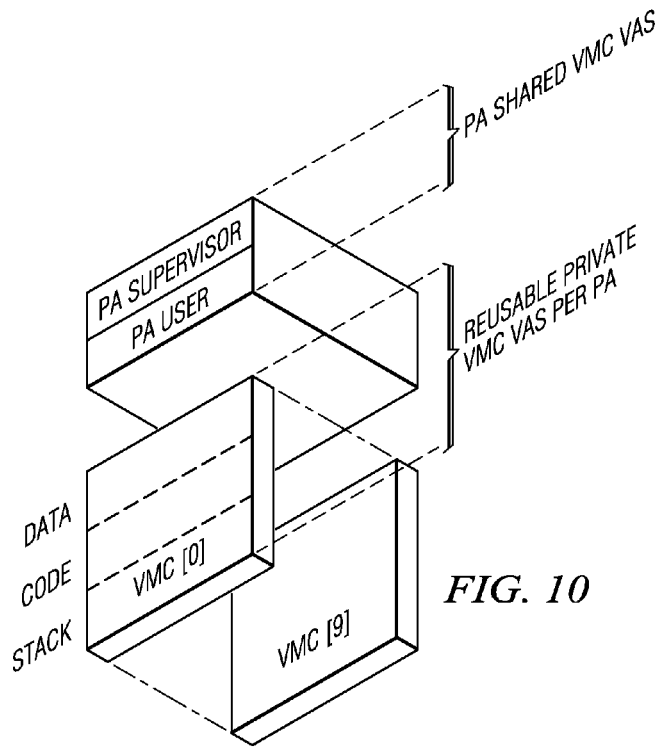
FIG. 10 is a diagram of virtual address space showing shared and private spaces including virtual memory contexts (VMCs) for use in embodiments of inventive structures and processes.

FIG. 10 illustrates an example of SDP VAS layout as a virtual mapping for PAs in respective VMCs. VAS has Shared and Private spaces. The shared space is called PA Shared VMC VAS. The private space is called Reusable Private VMC VAS Per PA.

In PA Shared VMC VAS, two areas called PA User Shared Memory and PA Supervisor Shared Memory are specifically reserved and visible to all PAs at the same time.

Reusable Private VMC VAS Per PA is occupied in turn by a selected one Virtual Memory Context (VMC) from a set of VMCs indexed in this example VMC[0], [1], [2], . . . [9]. A VMC includes PA private Data and certificates, PA private Code, and PA private Stack such as for register file and control register contents used in context switching. In multi-threading embodiments, enough space for two VMCs at once is provided so that two PAs can run at the same time. Additional space is provided for higher amounts of multi-threading as desired.

In TABLE 3, SDP Certificates and Structures include Hash Structure, Book Keeping Element (BK), Block of Book Keeping Elements (BBK), SDRAM Page, SDRAM Page Header, and VMC Configuration SDP_VMC_CFG (TABLES 5 and 6). Book Keeping Element (BK) represents the fingerprint of a specific Backing Store PG.

TABLE 3

SDP CERTIFICATES AND STRUCTURES

| SDP Feature | Parameters | Description |
| --- | --- | --- |
| Hash Structure | Hash | Hash value results of a hashing operation (SHA1 or SHA2, e.g.) |
| Book Keeping Element (BK) | Offset | Offset address |
| BK Hash | Hash | Hash of the Backing Store PG associated with this BK |
| Block of Book Keeping Elements (BBK) | BBK | Array of 16 BK |
| SDRAM_PG | Data | 4K page. An Initialization Vector is randomly generated for this PG |
| SDRAM_PG Header | Security_criteria | Bit 0: Integrity<br>Bit 1: Confidentiality Status<br>Bit 2: Confidentiality Requirement<br>Bit 3: Code (0)/Data(1) |
| | IV | Initialization Vector randomly generated for this PG |
| | Hash | Hash of the PG |

In FIG. 10 the virtual mapping example for a PA has the VAS split or partitioned so that the Stack is located at the bottom of the VAS to impede or prevent Buffer Overflow Attack. Code is just located above the Stack. Data and Heap are next higher in the VAS. At top of the VAS, the PA Shared VMC VAS is reserved in common for all the PAs, and can be utilized for interprocess communications. Each PA suitably uses this VAS layout, and allocation of the memory spaces is flexible.

Buffer overflow attacks occur in a variety of forms. Assume the stack is designed to be used for all kinds of data. High level code calling down several levels, local or automatic variables, and function passing operation may thread return addresses, pointers and parameters onto the stack. Using the stack in Secure RAM to point to unauthorized software code is impeded or prevented.

Security in FIGS. 9 and 10 offers various levels of difficulty or barriers to certain classes of attacks, such as not only protecting regions of code and data but also protecting the stack contents and stack size from including a return address outside an authorized protected range. A Security State Machine (SSM) based approach of preventing buffer overflows creates and isolates hardware based isolated regions inside secure mode. These isolated regions are used to execute PAs.

For instance, in FIG. 10, if a buffer overflow attack pushes the stack down excessively, the stack expands down to an address that SSM detects as a security violation. SSM is arranged to act as a monitoring circuit coupled to check for containment of the stack and detect expansion of the stack beyond a predetermined address boundary. Data structures in FIG. 11 also suitably are provided with unused addresses, unused page slots or other guard band areas respectively situated in, on, or outside either or both of the high address side and low address side of the data structure to impede buffer overflow attack as well. The combination of the various structures and processes described herein provides further aspects of security as well. A buffer overflow protection (BOP) example further includes a filter to abrogate or prevent non-secure code being placed into secure buffers. The filter includes an address decoder that monitors accesses to the stack and any other security-sensitive buffer or storage elements. The address decoder distinguishes address offsets, literals and similar authorized data in compiled code.

An additional aspect protects physical addresses from unauthorized modification of a page table that would map another physical page into a given virtual address. The page tables 2840 of FIG. 9A are modified legitimately by the HLOS in non-secure environment. For secure accesses, S.E. Page Tables 2850 including PA2VA are held in Secure space in FIG. 11 and thus protected. Kernel ROM code swap out with a RAM page to insert a breakpoint when the kernel runs from flash memory is protected. Thus, to protect the kernel, the SSM is suitably made to respectively monitor SDP and Flash (EMIF/CF) regarding any attempt to unauthorizedly modify PA2VA or to rewrite the Flash memory.

FIG. 11 depicts organization or partitioning into physical memory layout for Secure RAM 1034. Memory space 3110 is allocated to a VMC for a PA execution and includes a Pool of PHYS_SEC_PG Data, a Pool of PHYS_SEC_PG Code, and a VMC Stack.

Further in FIG. 11, Secure RAM space allocated to Primary Protected Application (PPA) execution includes space 3120 for Code, Data and Heap. In other words, code and data space 3120 in Secure RAM is provided for the SDP PPA software itself, as depicted in FIG. 11.

Secure RAM spaces allocated to Global Variables that are global to the Secure ROM Code for SDP includes 1) SDP Internal Secure Storage SDP_INT_SEC_STORAGE 3160 used by the SDP External Secure Storage Manager (4250 of FIG. 17), 2) space SDP_VMC_CFG 3150 allocated for the current VMC, and 3) the initialization information SDP_CFG 3130 from the SDP Certificate.

SDP PPA Code and Data 3120, for instance, are suitably and flexibly located in an address space above or below the SDP_INT_SEC_STORAGE 3160 and SDP_VMC_CFG 3150 spaces that act as PA-specific private secure storage. Different embodiments trade off allocation of SDP code between Secure RAM and Secure ROM space. In some cases, part of the SDP code may reside in a space 3120 and at least part of the SDP code is suitably stored in Secure ROM to preserve a larger Secure RAM page space for actual SDP swapping operations and enhanced performance. In other cases Secure ROM may be reserved to legacy ROM code and SDP PPA resides a space 3120 in sufficient-sized Secure RAM. SDP PPA is protected by any suitable method from modification such as from tampering by an unauthorized alteration or write into SDP PPA or swapping out. The protection is facilitated such as by hardware protection of SDP PPA by SSM from impermissible accesses to SDP PPA, and protection bit(s) and lock bit(s) in secure register(s) to identify SDP PPA as protected at a level appropriate to its functions.

A Secure RAM space 3180 allocated to Stack and Data of the Monitor and Secure Kernel includes 1) Monitor and Secure Kernel Shared Data, 2) Secure Kernel Stack, and 3) Monitor Stack.

TABLE 4 describes the information structure SDP_CFG 3130. Structure SDP_CFG 3130 is a global variable to the SDP and is imported from the SDP_Certificate and stored into the Secure RAM 1034.

modes. For example, in a case where the Data is largely keys, Code may occupy a high proportion of pages compared to Data, and so CODE_DATA from TABLE 4 is set to "01" (Code only is demand paged) in SDP_CFG 3130. This mode puts the Data in secure RAM and exempts the Data from the SDP page wiping advisor process. Instead, the secure demand paging is directed to paging of the software Code pages, so that this mode provides a Code-paging-only type process embodiment. In a second mode "11" both the code and data are subject to SDP page wiping advisor process to provide a dual-function process. Thus, configuration field SDP_CFG 3130 has one or more bits that control the scope of the secure demand paging.

In FIG. 11 and TABLE 5, the SDP_VMC_CFG structure 3150 in Secure RAM 1034 is a global variable to the full SDP module. This structure 3150 is built for a maximum VAS of 1 MB, in this example, which matches 256 PG_SLOTs. Structure 3150 is stored inside the Secure RAM 1034 at a fixed address aligned on a 4 KB boundary. Structure 3150 contains 2nd level MMU descriptors that are mapped by ROM Coded 1st Level Descriptors. In an example, the byte space for this structure SDP_VMC_CFG 3150 is on the order of several hundred bytes for parameters plus a PA2VA having a byte space equal to byte space for

TABLE 4

(SECURE RAM) SDP-CFG STRUCTURE 3130

| Parameters | Description |
|---|---|
| NUM_VMC | If NUM_VMC >1, multiple VMCs are activated, e.g., for multi-threading and/or security compartmentalization. |
| SDRAM_SDP_SIZE | This size is linked to the number of VMCs, given that each VMC has a maximum VAS (e.g., 1 MB). It is possible to restrict this size globally to satisfy some memory constraints. |
| PHYS_SEC_PG_NUM | This parameter indicates the number of PHYS_SEC_PG in Secure RAM reserved for the SDP and of page type permitted by CODE_DATA. |
| CODE_DATA | 11—Both Code and Data are demand paged.<br>10—Data only is demand paged.<br>01—Code only is demand paged<br>00—Neither Code nor Data is demand paged. SDP off. |
| SDRAM_BACKING_STORE_ADDR | Represents the start address of Backing Store memory area 3200A.<br>Variable is set in the SDP Certificate.<br>Value is initialized at Boot Time by the SDP_BOOT_INIT. |
| SDRAM_BK_EXT_STORAGE_ADDR | Represents the start address of the memory area reserved in SDRAM for the SDP_EXTERNAL_SEC_STORAGE Structure 3200B.<br>Variable is set in the SDP Certificate.<br>Value is initialized at Boot Time by the SDP_BOOT_INIT. |
| SEC_RAM_SDP_PHYS_START_ADDR | This address is 4K aligned and represents the physical address of the Secure RAM area reserved for the SDP.<br>Variable is set in the SDP Certificate.<br>Value is initialized at Boot Time by the SDP_BOOT_INIT. |
| PG_HASH_KEY | Key for page hash calculation |
| PG_CRYPTO_KEY | Key for page encryption |

Different PAs use software and hardware more efficiently by providing system-specific or PA-specific SDP operating each PA2VA row multiplied times a number of such rows equal to number of physical pages PHYS_SEC_PG_NUM.

TABLE 5

SDP_VMC_CFG STRUCTURE 3150

| Parameters | Description |
| --- | --- |
| VMC_MMU_TABLE[256] | This parameter points to the MMU $2^{nd}$ level descriptors PG tables that are saved for the current VMC. The size of this table is 1 KB (256*4bytes). DRAM addresses for each page for each VMC are stored here. |
| VMC_CURRENT_INDEX | Indicates that the index of the VMC that is currently used |
| VMC_ACTIVATED | Indicates if the VMC has already been activated |
| VMC_INDEX_LOCKED | Indicates which VMC indexes are already initialized. Lock a VMC_index is performed when calling SDP_VMC_GET_NEW( ). Each VMC index is bit mapped in this 32 bits pattern. |
| VMC_PA2VA[PHYS_SEC_PG_NUM] | This array is indexed by the PHYS_SEC_PG number and gives the associated PG_SLOT number in the VAS with information on the Status of the PHYS_SEC_PG. Structure has three entries for each physical page. Entries are: PG-VMC: Indicates which VMC_index the PHYS_SEC_PG belongs to. (e.g., 8 bits) PG-STATUS: Indicates, for each PHYS_SEC_PG, if the PG is used (1) or not (Empty, 0); Locked (1) or not (0); Dirty (1) or not (0), and any other suitable page status information, e.g., 8 bits. Page Activity register ACT is used when loading an application into the Secure Environment to indicate if a PHYS_SEC_PG can be considered as a wipeable PHYS_SEC_PG by the Scavenger page wiping advisor. PG_SLOT Number A: Defines which PG SLOT in virtual space this PHY_SEC_PG is slotted to. (e.g., 16 bits). |
| VMC_CFG_ITEM[VMC_Number] | Indicate for each VMC, specific characteristics like VMC VAS Size, VMC Base Address, Size of Stack, Number of Code PG, PA User or Supervisor flag, minimum number of wipeable pages MINSLOT, and PG Slot Flags. |

A block VMC_CFG_ITEM in the structure SDP_VMC_CFG 3150 and tabulated in TABLE 5 and TABLE 6 has entries for VAS Size of the VMC: VMC_VAS_SIZE, and the VMC_BASE_ADDRESS, and stack size SIZE_OF_STACK, number of code pages NUM_CODE_PHYS_SEC_PG, PA User/Supervisor flag, minimum number of wipeable pages MINSLOT, and slot flags PG_SLOT_FLAGS.

TABLE 6

DATA STRUCTURE VMC_CFG_ITEM

| Parameters | Description |
| --- | --- |
| VMC_VAS_SIZE | Actual size of VMC VAS versus maximum size (e.g., 1M). |
| VMC_BASE_ADDRESS | Base address of VMC VAS relative to which virtual address offsets are applied. |
| VMC_STACK_SIZE | Actual size of VMC Stack. |
| NUMBER_OF_CODE_PHYS_SEC_PG | Number of CODE PGs in the Secure RAM for this VMC. Remaining PGs are considered as DATA PGs. |
| PG_SLOT_FLAGS[8] | Eight patterns are bit mapping a flag for each PG_SLOT to indicate whether or not the PG_SLOT is currently Swapped In or not. A maximum number of PG_SLOTs (e.g., 256) can be mapped in those flags. |
| USER_NOT_SUPERVISOR | 0: VMC contains a Supervisor PA<br>1: VMC contains a User PA |
| MINSLOT | Minimum number of wipeable pages in Secure RAM available to Scavenger page wiping advisor process for this VMC. |

FIG. 11 also shows an exploded view of structure 3160 SDP_INT_SEC_STORAGE in Secure RAM. SDP_INT_SEC_STORAGE area 3160 is a Global Variable to the SDP and tabulated in TABLE 7. Structure 3160 is a hierarchic form of tuple table wherein the VMC index is a proxy for the application (PA) identification and each hash is a result of integrity verification. This structure 3160 is stored in Secure RAM in a space allocated for PA-specific private secure storage, and used on each Swap In and Swap Out of PG_SLOT. Structure 3160 is a temporary structure of the External Secure Storage in SDRAM. Structure 3160 is initialized during the SDP_RUNTIME_INIT( ) call of FIG. 24 described later hereinbelow.

TABLE 7

SDP_INT_SEC_STORAGE STRUCTURE 3160

| Parameters Index | Description |
| --- | --- |
| VMC_INDEX | Index of the VMC currently in use in Secure RAM |
| BBK_INDEX | Index of the BBK currently in use in Secure RAM |
| BK_INDEX | Index of the BK currently in use in Secure RAM |
| SDP_VMC_HASH[11] | Stores the VMC-specific hash of the BBK hashes for each VMC and one hash of those VMC hashes |
| BBK[BBK_INDEX] | Stores the 16 BK Hashes for 16 pages of a BBK index |
| BBK_HASH[16] | Stores the 16 BBK Hashes for the current VMC in use |
| SDRAM_PG HEADER | PG_HEADER[PHYS_SEC_PG_NUM] Keep here the SDRAM_PG Header of all the PG_SLOTs active in the VMC |
| INT_PATTERN | Integrity Pattern [PHYS_SEC_PG _NUM] Keep here the Integrity Pattern of all the SDRAM_PG Headers used in the Secure RAM for SDP |

In FIG. 11, an example of structure SDP_INT_SEC_STORAGE 3160 has 916 B plus the product of 56 times PAGE_NUM in Bytes. Each BBK[i] has 384 B and each BK[j] has 24 Bytes. A corresponding structure is also provided for each VMC in DRAM 1024 of FIG. 12 and there corresponds in organization to the structure SDP_INT_SEC_STORAGE 3160 of FIG. 11 in Secure RAM 1034. The SDRAM_PG_HEADER has 40 Bytes. In other examples and embodiments other numbers of bytes are used.

FIG. 12 details an external memory organization 3200. SDP interfaces with external memory 1024 (such as SDRAM) to store run time structures collectively designated DRAM_PG_TRACK_ARRAY that are used to load and store data related to SDP. The SDRAM partitioning or layout has two sections 3200A and 3200B. The location addresses of the two sections are defined in the SDP Certificate that is imported into structure SDP_CFG 3130 in Secure RAM at Boot time (see FIGS. 11 and 23). These two addresses are SDRAM_BACKING_STORE_ADDR and SDRAM_EXT_BK_STORAGE_ADDR as tabulated in TABLE 4.

In FIG. 12, the two sections are correspondingly designated SDRAM Backing Store SDRAM_BACKING_STORE 3200A and SDP External Book Keeping Secure Storage SDP_EXT_BK_SEC_STORAGE 3200B. The two sections 3200A and 3200B are suitably contiguous or located separately as desired. In one SDP example, the SDRAM Backing Store 3200A has a Page Header SDRAM_PG Header plus a Page area SDRAM_PG, together occupying up to 10 VMCs×256 page slots×4138 Bytes per page. The SDRAM External Book Keeping Secure Storage 3200B suitably has a relatively smaller but sufficient space, e.g., 61,640 Bytes.

In FIG. 12, the SDRAM Backing Store 3200A contains the entire SDRAM_PG contiguously associated with its header. This structure 3200A is addressed by an SDP External Secure Storage Manager (FIG. 17) after some authentication and integrity checking of the SDP External Book Keeping Secure Storage structure 3200B. The areas SDRAM_PG and SDRAM_PG Header are alternatively and conveniently situated in two different, non-contiguous memory areas to facilitate the access to those items by appropriately specifying and processing the SDRAM_BACKING_STORE_ADDR field of TABLE 4.

As shown in FIG. 12 (and FIG. 11), the SDRAM_PG Header suitably has a few dozen bytes per page including Security Criteria, such as an Integrity (Hash) Flag INTEG, Confidentiality (encryption) Flag CONFID, other security flags and criteria, and spare space. An Initialization Vector IV, and a Hash of PG_SLOT are included among the DRAM_PG_HEADER fields. Next-down in the Backing Store 3200A is the page space called SDRAM_PG, followed by a several bytes of Integrity Pattern.

Figure 17:
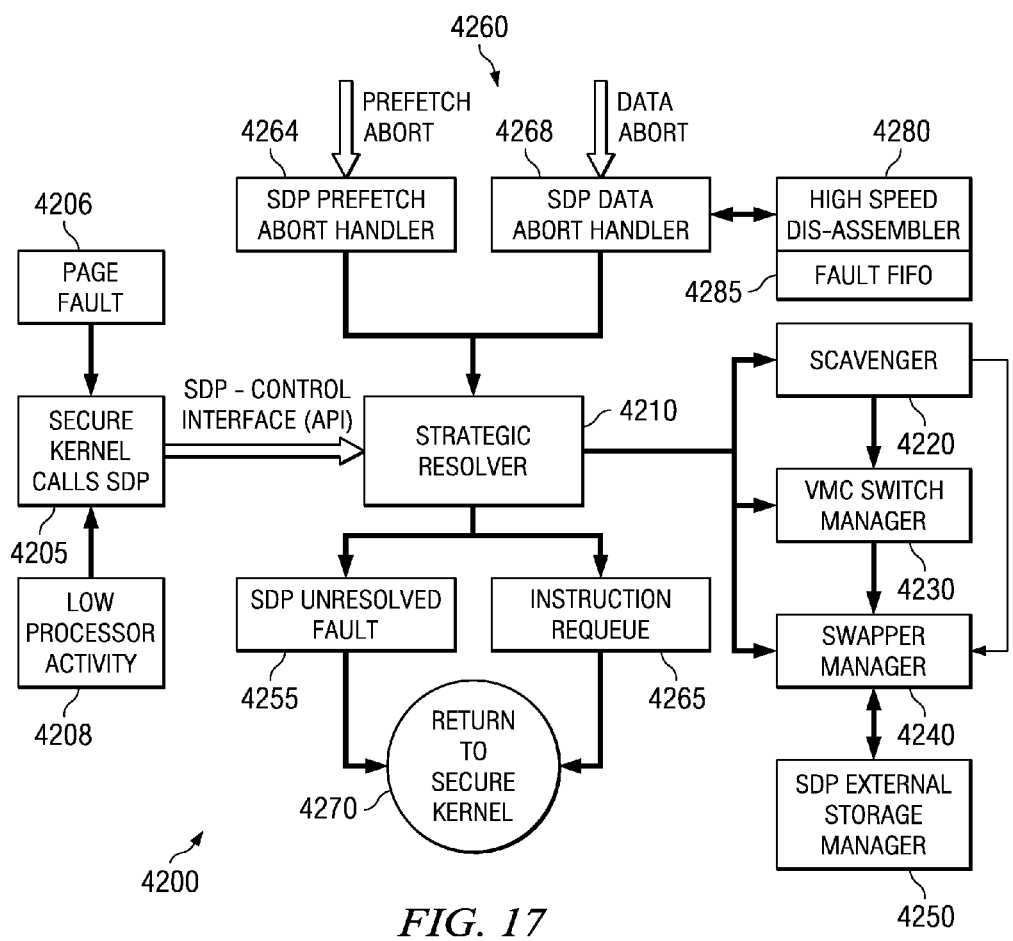
FIG. 17 is an inventive process block diagram for Secure Demand Paging, including a Strategic Resolver for calling other process blocks.

In FIG. 12, the SDP External Book Keeping Secure Storage structure 3200B, designated SDP_EXT_BK_SEC_STORAGE, is used to store secure information related to each VMC storage area in SDRAM. Some of those secure information items in SDRAM are preloaded as global variables into Secure RAM 1034 for the Book Keeping (BK) element in use. Compare the FIG. 12 external structure in SDRAM with the related FIG. 11 internal structure in Secure RAM. This SDP External Book Keeping Secure Storage structure 3200B is managed by the SDP External Secure Storage Manager (FIG. 17).

The SDP External Book Keeping Secure Storage structure 3200B is accessed by the SDP running on the processor 1030 and generating a suitable address offset value. For example, this structure 3200B is built to identify or define VMC spaces each of 1 MB size in area 3200A. The VAS includes space for ten (10) VMCs and each VMC includes 256 page slots PG_SLOT of about, 4 KB each, for example.

In FIG. 12, the SDP External Book Keeping Secure Storage structure 3200B itself has ten portions for external VMC spaces in SDRAM: SDP_EXT_VMC[0], SDP_EXT_VMC[1], . . . SDP_EXT_VMC[9]. Altogether, the ten portions occupy 61640 B in this example. Each VMC-specific portion 3210, such as exploded VMC[0], is divided into sixteen (16) Block Book Keeping areas BBK[0], BBK[1], . . . BBK[15], and an associated sixteen (16) Block Book Keeping Hash areas BBK_HASH[0], BBK_HASH[1], . . . BBK_HASH[15]. Each Block Book Keeping Hash BBK_HASH[i] holds the hash of all sixteen of the Hashes of the respective Book Keeping spaces BK[i].

Further in the FIG. 12 exploded view, each Block Book Keeping area BBK[i] is subdivided. For instance, area BBK[0] 3220 is divided into sixteen (16) Book Keeping spaces BK[0], BK[1], . . . BK[15] of 24 bytes each. Each Book Keeping space BK[i] is still further divided. For instance, space BK[0] 3230 is exploded to show one Hash of the Backing Store page to which this Book Keeping space BK[0] pertains, plus some spare bytes.

Appended to the SDP External Book Keeping Secure storage 3200B in SDRAM is a VMC Configuration Secure storage 3240 designated SDP_EXT_VMC_CFG_SEC_STORAGE. This storage holds configuration information for SDRAM as well as a hash VMC_HASH[i] of the sixteen Block Book Keeping hashes BBK_HASH[j] taken together for each VMC respectively, as well as a hash SDP_HASH of all of the VMC_HASH[i] hash values (e.g., ten of them).

Other embodiments have fewer or more information fields for the SDP purposes. Secure RAM of FIG. 11 holds fewer BK hashes than DRAM of FIG. 12 in some embodiments.

In another embodiment, each space SDP_EXT_VMC[i] of FIG. 12 provides a further pointer field VMC_POINTER [i] pointing to the starting address of the next space SDP_EXT_VMC[i+1]. In this way, a linked-list data structure is established. Such linked-list structure occupies DRAM space efficiently to form either a contiguous or non-contiguous set of VMC spaces in the DRAM. The pointer field VMC_POINTER[i] is also included as an additional corresponding field in Secure RAM space SDP_VMC_CFG 3150 of FIG. 11.

That space SDP_VMC_CFG 3150 acts as a temporary internal (on-chip) store for information about the VMC[i] currently occupying Secure RAM 1034. The Secure RAM is organized to store information pertaining to plural VMCs such as BBK hashes and VMC hashes to confirm integrity upon VMC switching, for instance. Operations select one at a time of the VMCs as a current VMC and store selected pages from DRAM 1024 into Secure RAM primarily from the selected current VMC out of all the activated VMCs organized in the SDP space of DRAM 1024.

In some embodiments, the SDP_VMC_CFG space 3150 has space for only the current VMC, and all other activated VMCs have their analogous information stored in FIG. 12 area 3240 SDP_EXT_VMC_CFG_SEC_STORAGE. Other embodiments use SDP_VMC_CFG 3150 to hold an array called herein SDP_VMC_ARRAY for the current VMC and all other activated VMCs in Secure RAM and back it up or not, depending on embodiment, in the FIG. 12 area 3240 SDP_EXT_VMC_CFG_SEC_STORAGE.

In FIG. 12, SDP utilizes backing pages SDRAM_PG in area 3200A to back up or store pages from a VMC[i] while such pages are not active in Secure RAM from an activated VMC or are part of a VMC which is not activated at the moment for use in Secure RAM.

A pyramid hash data structure and process embodiment as described herein provides equivalent security as page hash, with a tradeoff between processing speed or burden and Secure RAM space used. For example, at one end of a spectrum, a page-level hash embodiment stores hashes of all pages in Secure RAM and uses the most hash space. The page-level processing performs one hash operation to hash-check the latest page, which offers a relatively fast, low amount of processing. This page-level hash trades off Secure RAM space for higher speed. At the other end of the spectrum, an SDP-level (all-VMC) hash check would store one SDP hash and thus use little hash space in Secure RAM, but hash all pages of all VMCs on each Swap In or Swap Out and thereby present a high amount of processing.

An intermediate embodiment hashes a latest page being swapped to update a set of page hashes and update the BBK hash pertaining to the BBK containing that latest page. The BBK hash and page hashes for that BBK are currently in the Secure RAM. All the BBK hashes for all the BBKs in the current VMC are also stored in the Secure RAM and page hashes are swapped in from DRAM as needed for each BBK that arises in the swapping process. In this way, not only is an intermediate amount of Secure RAM hash space used to hold the hashes, but also the amount of processing to generate the hashes is intermediate on the spectrum. This embodiment is useful where the economy of Secure RAM space and the amount of processing are both significant considerations. When bringing in a new BBK set of page hashes, the pre-stored BBK hash for that BBK is checked against an imported BBK hash for that BBK to maintain integrity.

Another intermediate embodiment holds the page hashes and VMC hash and hashes over a whole VMC. When bringing in a new VMC set of page hashes and VMC hash, the pre-stored VMC hash for that VMC is checked against the imported VMC hash. To maintain integrity, Secure RAM holds the VMC hash for every activated VMC. When a page is swapped in or out, the hash operation is executed over all page hashes in the VMC. The degree to which protected applications PA are split into several VMCs or a single VMC affects the assessment of the tradeoffs posed by the above-described intermediate embodiments.

Among the various embodiments of pyramid hash structure and process, the appropriate embodiment is selected by the skilled worker based on the relative importance of Secure RAM space economy and amount of processing posed.

Next, FIG. 12 is used to describe some further embodiments wherein each virtual memory page-slot in a particular VMC VAS has a reserved 4K DRAM page called a DRAM Swap Page. The DRAM Swap Pages are stored as array elements in an array called DRAM Swap Array or SDRAM_PG of FIG. 12. The DRAM Swap Array and each of the DRAM Swap Pages are aligned on 4K boundaries for fast addressing. A DRAM Swap Page index is shifted left by 12 bits for quick and efficient conversion of the index into an address for direct access to the particular DRAM Swap Page.

Bookkeeping or tracking structure keeps track of the DRAM Swap Page(s) in the DRAM Swap Array. Each DRAM Swap Page stored in the DRAM Swap Array is associated with a DRAM Page Tracking element in a second externally-stored DRAM array 3200B called DRAM Page Tracking Array. Each DRAM Page Tracking element maintains information unique to a single, corresponding, specific DRAM Swap Page in the DRAM Swap Array. The total number of DRAM Page Tracking elements is also stored into the DRAM Page Tracking Array.

Suppose the DRAM Page Tracking Array 3200B were too large to store in available Secure RAM and would reduce the remaining available memory for Secure RAM pages on which SDP functionality can depend. Accordingly, in some embodiments, DRAM Swap Pages in the DRAM Swap Array and their addresses (or offsets) in the DRAM Page Tracking Array 3200B are suitably stored in DRAM 1024 and accessed in pertinent part by Swap In to Secure RAM. Special security procedures such as encryption and hierarchically-maintained hashes ensure the integrity of the DRAM Page Tracking Array 3200B as described herein.

DRAM Page Tracking Array 3200B contains the associated Book Keeping BK elements for each page. The indexing of the DRAM Swap Pages in the DRAM Swap Array is arranged in some embodiments to correspond one-to-one with the indexing of DRAM Page Tracking elements in the DRAM Page Tracking Array. This indexing correspondence as between both the DRAM Swap Array and the DRAM Page Tracking Array is provided for 1) robustness in security against replay attacks on pages, and 2) performance reasons to simplify index-to-address conversion (one or few instructions to convert an index to an address).

DRAM Page Tracking Array 3200B size in some embodiments is made equal to a power-of-2 (two-to-Nth-power) to simplify and speed up addressing of and access to the DRAM Page Tracking elements. 32 bytes or 64 Kbytes is often large enough, and padding of a non-power-of-two minimum size is suitably provided to insure that a power-of-two is maintained for the actual size. A few padding bytes in DRAM are small compared to the 4 KB page size of a DRAM Swap Page. Moreover, padding bytes in DRAM are inexpensive compared to padding in Secure RAM on-chip.

Figure 13:
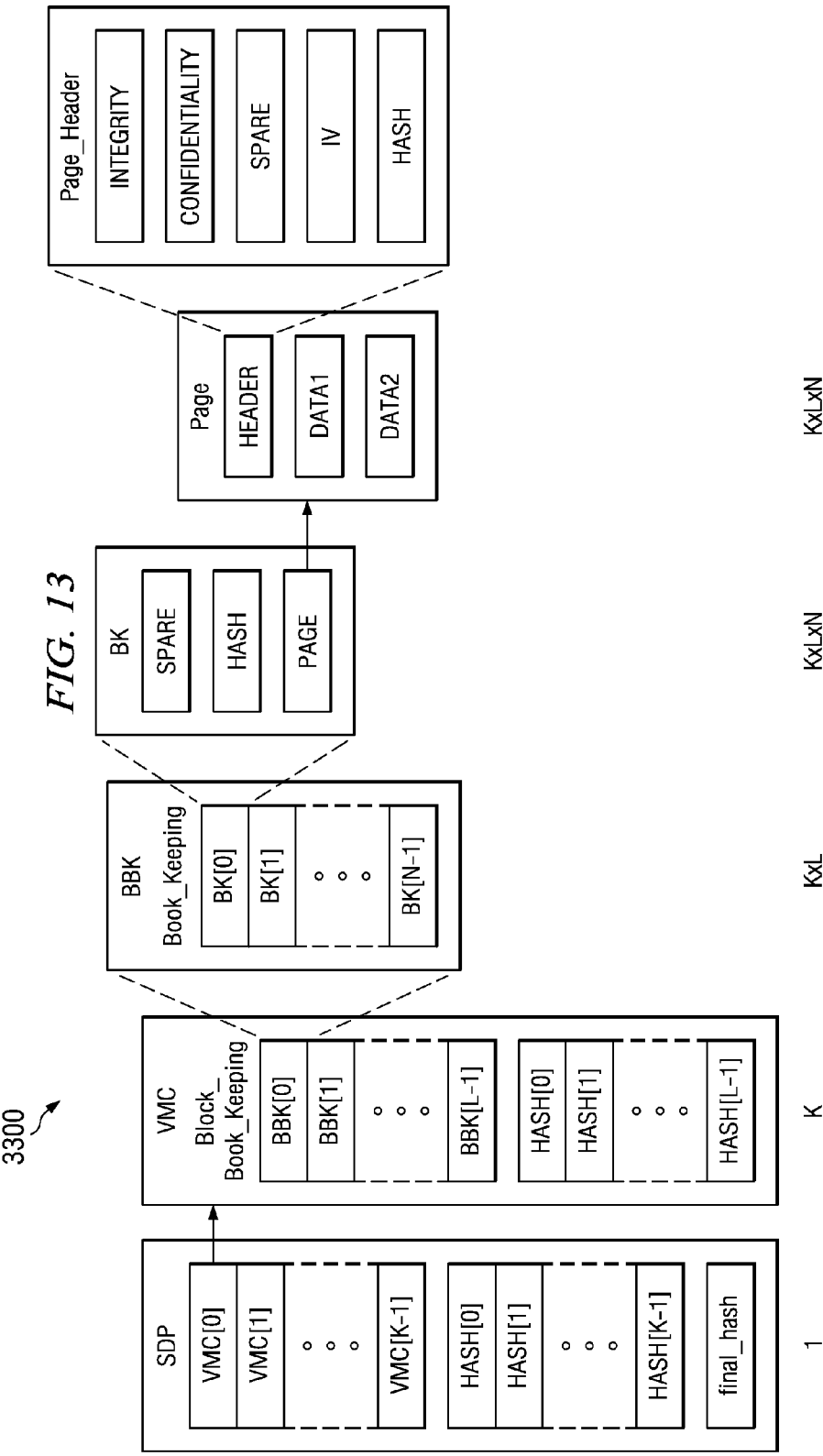
FIG. 13 is another diagram of successively exploded views depicting physical address space in external non-secure DRAM for use in embodiments of inventive structures and processes including inventive Secure Demand Paging.

FIG. 13 shows another data structure and process embodiment for organizing the SDP memory space in SDRAM and of establishing a hierarchic data structure analogous to that of FIG. 12. In FIG. 13 successively exploded views further depict a data structure 3300 in physical address space in external non-secure DRAM. Data structure 3300 is hierarchically organized from an SDP top level at left, and then rightward through successively lower levels of VMC, BBK, BK, Page, and Page_Header.

Thus, 4K pages in FIG. 13 are distributed low in the Hash book keeping hierarchy and depicted as integrated into that hierarchy of FIG. 13. By comparison, distinct high level spaces 3200A and 3200B are depicted FIG. 12 wherein in some embodiments space 3200A has a page pool and space 3200B has a book keeping hierarchy for hashing and administering the page pool of space 3200A.

The SDP level of FIG. 13 has VMCs indexed [0], [1], . . . [K−1] for a total number K of VMCs. Corresponding Hashes of each VMC at SDP level are Hash[0], Hash[1], . . . Hash[K−1]. Each Hash entry at SDP level is the hash of all the Block Book Keeping BBK hashes concatenated from the next level VMC. These Hash entries are followed by a Final_Hash entry Hashing all the just-listed VMC Hashes concatenated.

Each VMC entry at SDP level is detailed at VMC level second from left in FIG. 13. Each VMC has a set of Block Book Keeping blocks BBK[0], BBK[1], . . . BBK[L−1] for a total number L of the BBKs in each VMC. Corresponding hashes of each BBK at VMC level are hash[0], hash[1], . . . hash[L−1]. Each BBK hash entry at VMC level is the hash of all the Book Keeping BK hashes concatenated from the next level BBK.

Further in FIG. 13, the next level BBK is detailed to have a set of Book Keeping elements BK[0], BK[1], . . . BK[N−1] for a total number N of BKs in each BBK. A next further level BK has a spare space for additional information, a Hash space for the BK, and a 4K Page. The Hash space for the BK holds the Hash of the 4K Page.

The Page level details the Page at BK level. At Page level, each Page has a Header, a data1 area having a Page Size, and a data2 area having an EOP Size (End of Page Size). The Page_Header level details the Header at Page level. Page_Header level has an Integrity field, a Confidentiality field, a spare field, an Initial Value IV field, and a hash field for a hash value of the page data1 area.

Different embodiments manage the physical pages in Secure RAM in different ways. An example embodiment divides each Protected Application (PA) into 4K pages (called data-1), and then at the end a full 4K page (called data-2) is provided regardless of amount of occupancy therein. Another approach provides 4K pages (data-1) and further provides end-of-page (EOP_Size) information for management of additional code and data in less than a full 4K ending space (data-2).

As shown in FIG. 13 the hierarchy has increasing numbers of spaces so there are K VMCs per SDP, K×L BBKs (Block Book Keeping blocks), and K×L×N BKs (Book Keeping Elements) and their corresponding Pages.

Figure 14:
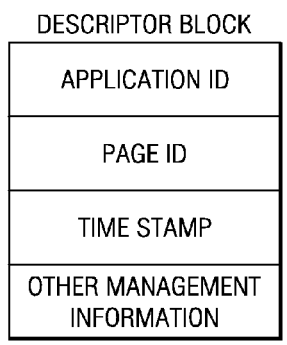
FIG. 14 is a data structure diagram of a Descriptor Block for use in either a Formatted Code page of FIG. 15 or a Formatted Data page of FIG. 16 for use in embodiments of inventive structures and processes including inventive Secure Demand Paging.
Figure 15:
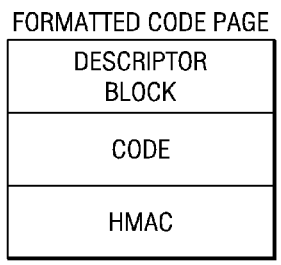
FIG. 15 is a data structure diagram of a Formatted Code page for use in embodiments of inventive structures and processes including inventive Secure Demand Paging.
Figure 16:
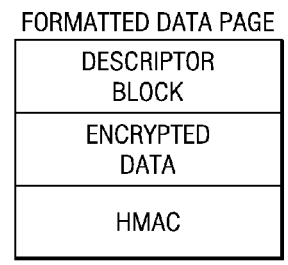
FIG. 16 is a data structure diagram of a Formatted Data page for use in embodiments of inventive structures and processes including inventive Secure Demand Paging.

FIGS. 14, 15, 16 show a different embodiment of data structure corresponding to the Page_Header level and Page Level of FIG. 13. In FIG. 14, a Descriptor Block is used in both a Formatted Code page of FIG. 15 or a Formatted Data page of FIG. 16, or either of them. The Descriptor Block has an Application ID field, a Page ID field, a Time Stamp field, and Other Management Information field. These fields suitably occupy the spare area identified in the Page_Header level of FIG. 13.

In FIG. 15 a Formatted Code page has a Descriptor Block of FIG. 14 followed by a page of Code (compare data1 field of FIG. 13), and by an HMAC (Hashed Message Authentication Code) field.

In FIG. 16, a Formatted Data page has a Descriptor Block of FIG. 14 followed by a page of Encrypted Data (compare data1 field of FIG. 13), and by an HMAC field.

FIG. 17 depicts top level components of a Secure Demand Pager SDP 4200, and high level architectural and process relationships in and between them. In turn, SDP 4200 is a modular component in a larger, modular Secure Environment kernel of FIG. 3. Secure Kernel (SK) calls SDP 4200 by a Call 4205 via an SDP Control Interface or SDP API. Call 4205 results from a page fault PG-FAULT, for example. SDP 4200 transparently provides Secure Virtual Memory (SVM) to run larger PAs than Secure RAM memory can physically accommodate, and thereby create the effect in the SE that a much larger amount of Secure RAM exists. PA code views SVM as if it were real dedicated Secure RAM.

Figure 18:
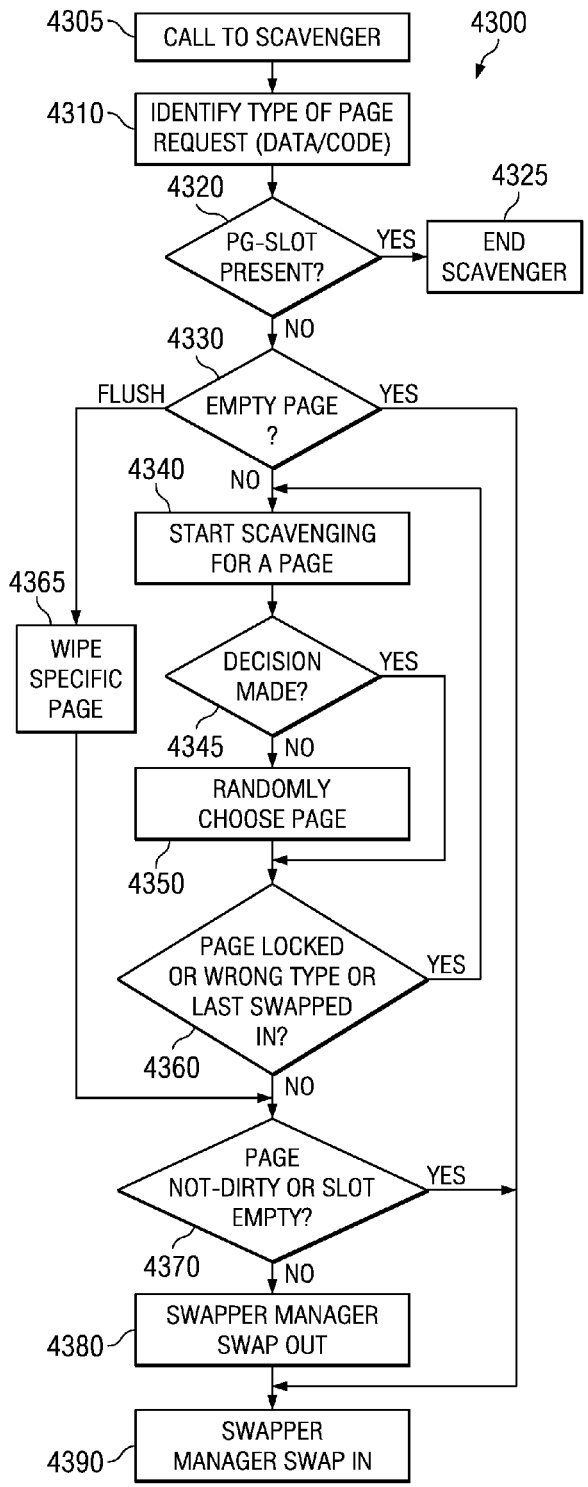
FIG. 18 is an inventive process block diagram for Secure Demand Paging, detailing portions of FIG. 17 wherein the Strategic Resolver calls a Scavenger and a Swapper Manager.
Figure 19:
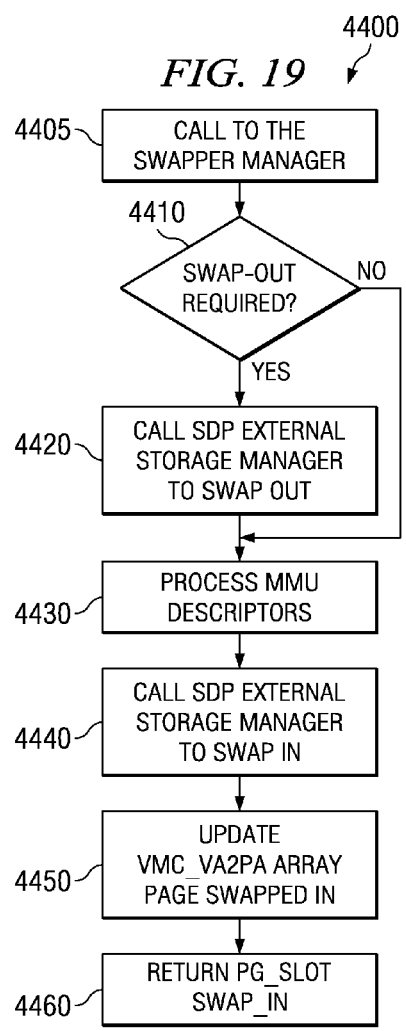
Figure 25:
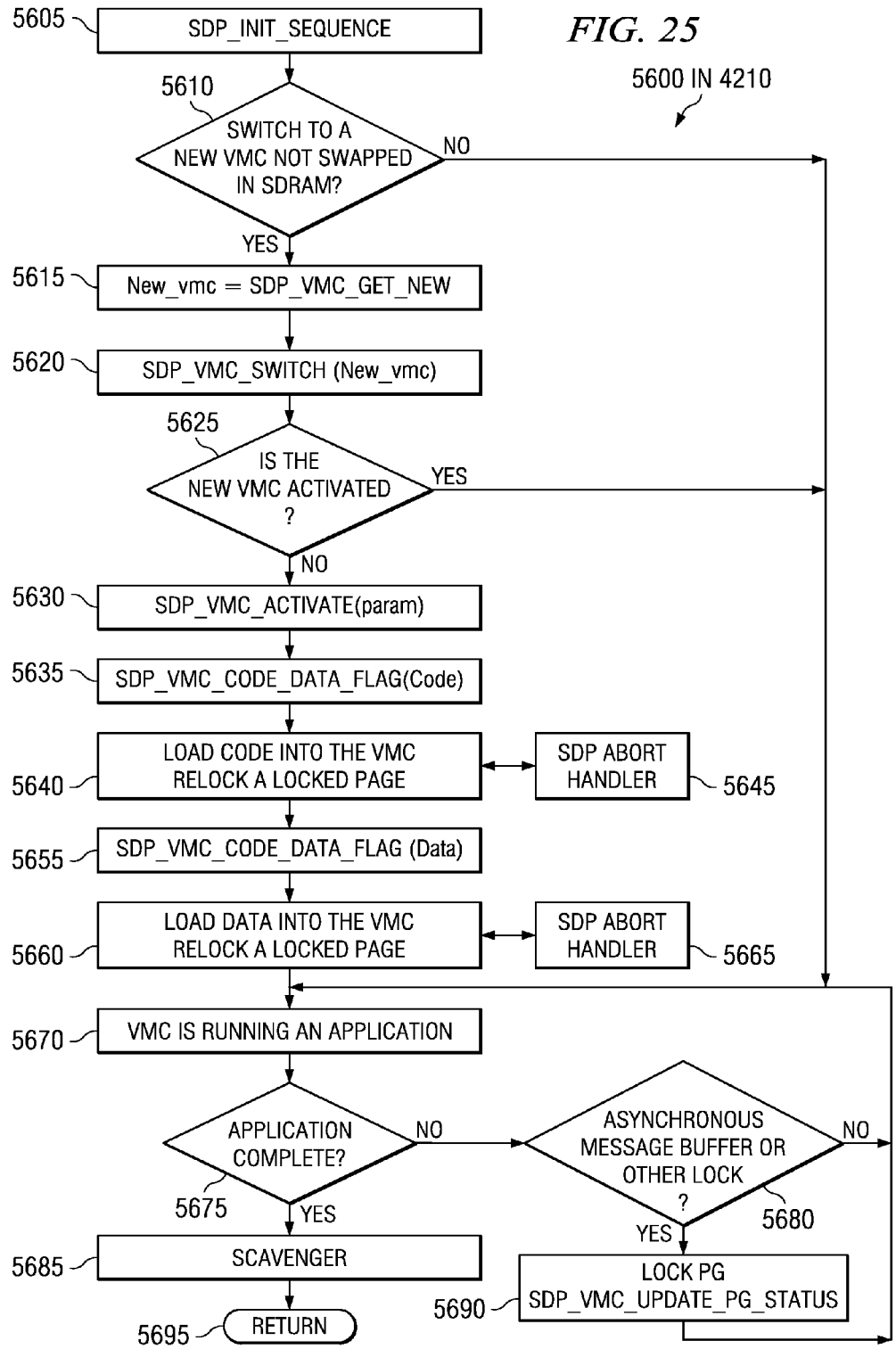
FIG. 25 is an inventive process block diagram for Secure Demand Paging, further detailing inventive portions of the Strategic Resolver of FIG. 17 wherein the Strategic Resolver performs an SDP initialization sequence for a new VMC or to switch to a new VMC, responds to Abort Handler process blocks and makes calls to various process blocks.
Figure 26:
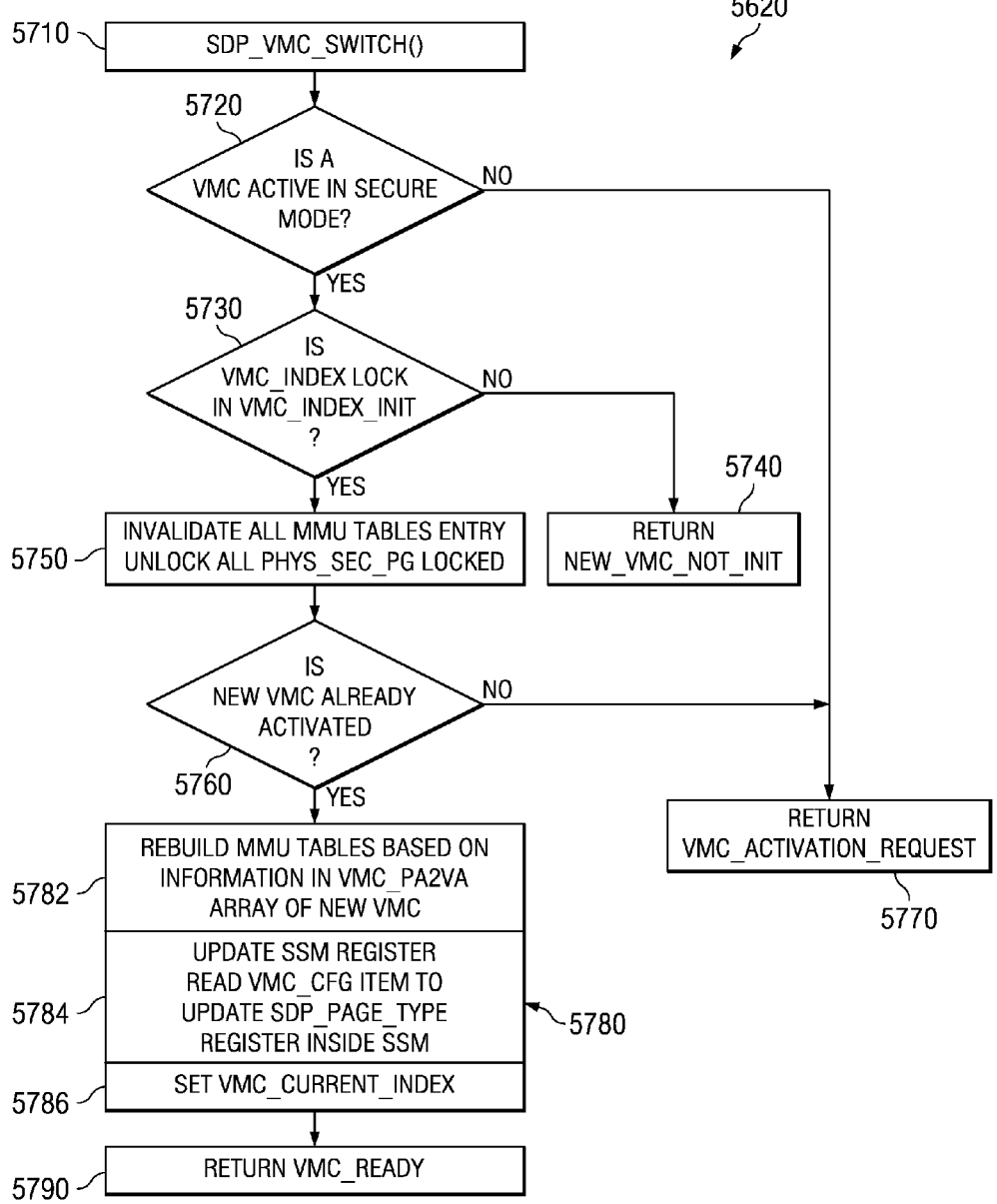
FIG. 26 is an inventive process block diagram for Secure Demand Paging, detailing an inventive process of a VMC Switch Manager block of FIG. 17.

In FIG. 17, the top level architectural and process components and some drawing Figures detailing them include the following list.

a Strategic Resolver 4210—FIG. 25
a Scavenger 4220—FIG. 18
a VMC Switch Manager 4230—FIG. 26
a Swapper Manager 4240—FIGS. 19, 20, 21
an SDP External Secure Storage Manager 4250—FIGS. 20, 21
and an SDP Abort Handler 4260.

These blocks or modules are implemented as coded physical representations on any system element or storage medium in FIGS. 1 and 2 or elsewhere herein, and such as external flash memory 1025, on-chip non-volatile memory such as RAM 1032 and internal flash or EEPROM 1036, and on web sites 1055 and 1065, PC 1070, and optical disk, CD ROM, hard drive, diskette or otherwise as needed to deliver SDP 4200. The coded physical representations are magnetically, electrically, optically, or otherwise-detectable physical variations or structures now known or hereafter devised that can represent the SDP 4200 and make SDP 4200 available for execution.

In FIG. 17, upon completion of a latest set of SDP operations by Strategic Resolver 4210, operations Return to Secure Kernel at a step 4270. SDP Strategic Resolver 4210 in FIG. 17 operates for example by 1) initializing the Backing Store of FIG. 12 by operations of FIG. 24, 2) storing securely in FIG. 21 the contents of a PHYS_SEC_PG from Secure RAM of FIG. 11 to External memory as a PG_SLOT to SDRAM_PG of FIG. 12, and 3) loading securely in FIG. 20 a PG_SLOT from External memory of FIG. 12 to a PHYS_SEC_PG in Secure RAM of FIG. 11.

In FIG. 17, Secure Kernel components utilize an API 4205 to Call SDP 4200 and initiate and/or request functions by Strategic Resolver 4210. SDP 4200 supplies an exported interface accessible to SDP_API 4205. Strategic Resolver 4210 acts as a central controller and includes Initialization Functions and Operational Functions. Initialization Functions manifest and instantiate configuration information such as SDP_CFG of FIG. 11. This configuration information is provided by an authorized provider such an OEM (Original Equipment Manufacturer) and retrieved securely during a secure boot sequence, such as in FIGS. 22-23.

Operational Functions are powerful and kept few in number to reduce the complexity presented to the rest of the system. The Operational Functions interface provides a service to create a secure process address space and activate or deactivate it. These Operational Functions allow the Strategic Resolver 4210 (and Secure Kernel as may be appropriate for its purposes) to easily switch between processes by unmapping a process, and mapping another process.

In FIG. 17, SDP 4200 readily accommodates processor power management functions such as deep sleep. In a transition to deep sleep, an Operational Function unmaps all processes and flushes all pages from Secure RAM to the DRAM-SWAP.

One or more External APIs (applications processing interfaces) that may call SDP 4200 are collectively referred to as SDP_API 4205 herein. The SDP_API is called for specific different reasons at runtime. For instance, on a MMU PG fault, SDP_API is suitably called and operations branch to Abort Handler 4260 to fill an empty, available or wipeable PHYS_SEC_PG.

SDP_API 4205 provides access by Secure Kernel to Strategic Resolver 4210 and SDP-associated Operational Functions including: 1) Initialize full SDP Environment (FIGS. 22-24), 2) Start a new VMC (FIG. 25), 3) Switch to a different VMC (FIG. 26), 4) Lock/Release a PG_SLOT (make a PG_SLOT irremovable from the Secure RAM) (FIG. 25), 5) Indicate Page Type as Data and Code are loaded, and 6) Close a VMC (FIG. 26), and for a specific VMC, Swap Out all modified pages from Secure RAM.

In response to Call 4205 from Secure Kernel to SDP 4200, Strategic Resolver 4210 acts as a central dispatcher and secure supervisor for SDP 4200. Strategic Resolver 4210 is detailed further in FIG. 25 and dispatches functionality to respond to and handle particular events such as service calls from other parts of the system for control of SDP operations. Strategic Resolver 4210 in FIG. 17 dispatches and responds to an SDP Fault Handler 4260 that in some embodiments includes or utilizes a high speed Dis-assembler 4280. Strategic Resolver 4210 operates or dispatches a Scavenger 4220, a VMC Switch Manager 4230, and a Swapper Manager 4240 with SDP External Storage Manager 4250. Strategic Resolver 4210 identifies unresolved or unresolvable faults by SDP Unresolved Fault operations 4255. Strategic Resolver 4210 performs or dispatches Instruction Requeue operations 4265. Operations 4255 and 4265 are followed by a Return to Secure Kernel 4270.

Scavenger 4220 process and/or hardware identifies a page in VMC VAS that is not likely to fault again until a significant length of time in the future. Scavenger 4220 uses statistics to ascertain this information, and using a superior prediction hardware and procedure for high average performance. One category of embodiments of Scavenger 4220 finds the least-used physical secure page PHYS_SEC_PG and sets or marks the page slot then occupied by that page as a wiped (evicted or victim) slot.

Scavenger 4220 is largely implemented in hardware or largely in software, or some mixture of the two depending on embodiment, as described in detail elsewhere herein and in U.S. non-provisional patent application TI-39617 "Page Processing Circuits, Devices, Methods And Systems For Secure Demand Paging And Other Operations" U.S. Ser. No. 11/426,598, which is hereby incorporated herein by reference.

In FIG. 17, the Scavenger 4220 is coupled by paths to call VMC Switch Manager 4230 and/or call Swapper Manager 4240. The VMC Switch Manager 4230, upon request, switches the VMC used in the Secure Environment. VMC Switch Manager 4230 is coupled by a path to call Swapper Manager 4240. The Swapper Manager 4240 swaps in and swaps out PHYS_SEC_PG in and out of Secure RAM as indicated by a bidirectional path between Swapper Manager 4240 and SDP External Storage Manager 4250. The SDP External Secure Storage Manager 4250 executes security aspects of the SDP that occur during Swap In/Swap Out.

SDP Abort Handler 4260 is coupled to an Exception Handler(s) (not shown) that is provided in the larger system environment of FIG. 3 and is in a module external from SDP 2040 of FIG. 3 (and SDP 4200 of FIG. 17). Such an Exception Handler intercepts a Secure Environment prefetch abort or Secure Environment data abort and, if the abort is an acceptable page fault signal, quickly calls and passes control to the SDP Abort Handler 4260. The Exception Handler determines acceptable page fault by some system integrity checks to verify that the abort is truly an acceptable PG Fault signal. Otherwise, if Exception Handler determines that this abort is not a properly generated PG-FAULT signal, Exception Handler does not call SDP 4200 and instead takes appropriate evasive or responsive action without involving SDP 4200.

The Secure Kernel SK also has abort handler operations (not shown) that back up critical information items that are later used to restore the processor 1030 state to the state before the PG Fault occurred as indicated by the address of the faulting instruction in an instruction fault address register, type of Abort and other information in an instruction fault status register, and any PA registers that might be modified by usage of those registers by the kernels. General purpose registers are backed-up or pushed to an Abort or Supervisor stack of all register file registers from the process. A Stack Frame Pointer (SFP) to these registers on that stack of FIG. 10 is passed to the Strategic Resolver 4210 along with any other pertinent information related to the PG-FAULT. Pertinent information items are passed for processing to, and update by, the SDP Abort Handler 4260 through an SDP_FAULT data structure such as tabulated in TABLE 8.

In FIG. 17 and FIG. 10, the SDP Abort Handler 4260 passes the faulting page address, and type of abort, and pointer to an apps stack frame on the stack. SDP in a more complex embodiment has a high speed dis-assembler 4280 that accesses any registers of the application to detect whether a Load or Store instruction crosses a page boundary.

SDP Prefetch Abort Handler 4264 in a process example thereupon executes these operations:

1) Reading an instruction fault address register to obtain the address of the faulting instruction.
2) Verification that the instruction address of the aborted instruction indeed matches or otherwise refers to the same address as from the instruction fault address register.
3) Verification that a CPU mode bit indicates that the fault occurred only in a user mode. One type of processor 1030 suitably has mode bits indicating user, fast interrupt processing, interrupt processing, and supervisor.
4) If all of the above items pass integrity checks, an SDP_FAULT structure is instantiated as in TABLE 8 and added to a fault queue FIFO.
5) Also, an SDP_FAULT_flags field has a specific flag set to indicate that the fault is properly targeted for SDP resolution. A Prefetch Abort flag is set to indicate that the fault is occurring due to a prefetch abort.

6) If a failure on any above item occurs, another flag in SDP_FAULT_flags field is set to indicate the type of failure. Enough flags are provided for full identification of any fault status.
7) A branch occurs to the Strategic Resolver 4210.

In TABLE 4, the data structure SDP_CFG is configured for demand paging of Code pages only, Data pages only, or both Code and Data pages. Data Abort Handler 4268 handles Data Aborts that are generated by the processor 1030. Where SDP_CFG is configured only for demand paging of code, or in an SDP embodiment omitting Data Aborts, then Data Aborts are not utilized. Note, however, that setting the SDP_CFG configuration only for demand paging of Code may actually reduce Code paging performance because Secure RAM pages become statically occupied with Data pages, leaving fewer pages in Secure RAM for Code paging. Accordingly, SDP_CFG is configurable for demand paging of Data as well.

An SDP_CFG configuration for both Code and Data allows for large Data and Code VMC space. Configuring for both Code and Data also allows Data page(s) to persist and remain between calls into a given PA or different PAs sharing one or more pages in circumstances wherein multiple VMCs are configured. If a partial SDP configuration (with Code only demand paged) is configured with multiple VMCs, the SE kernel may need to unload the data for each secure process, reducing the overall load, at any particular time, on the Secure RAM. On such partial SDP configuration, a sufficient number of Secure RAM pages are provided to avoid impeding the SDP operations with Data pages statically occupying Secure RAM.

For systems configured with full SDP (Data and Code paging), an Exception Handler of the Secure Kernel swiftly passes a Data Abort to the SDP Data Abort Handler 4268 and similarly passes a Prefetch Abort to the SDP Prefetch Abort Handler 4264 as described above.

In FIG. 17, Data Abort Handler 4268 has process steps as listed next, for an example:
1) Reading a data fault address register to obtain the faulting address of the data access associated with the Data Abort. Data fault address means the address to which access was attempted, not the hereinbelow step 3 instruction address of the instruction that caused the Data Abort.
2) Inserting the data fault address into the SDP_FAULT structure of TABLE 8 in a SDP_FAULT_DFA variable.
3) Reading an instruction fault address register to obtain the instruction address of the instruction that attempted access and caused the Data Abort (fault).
4) Inserting the instruction fault address read in step 3 into the SDP_FAULT structure of TABLE 8 in a variable SDP_FAULT_IFA.
5) Setting a flag bit in SDP_FAULT_Flags indicating that a qualifying SDP Data fault has occurred.
6) Calling high speed Dis-Assembler 4280 to analyze the SDP_FAULT[0](in an array of suitably three elements) to ascertain whether another fault will be incurred by the same instruction before the instruction has completed its operation.

High speed Dis-assembler 4280 is used for Data Aborts. Because a particular instruction might result in two pages needing to be swapped into virtual memory, for performance reasons it is better to go ahead and resolve the next fault that a multi-fault instruction will incur.

Multi-fault instruction examples are the Load Multiple or Store Multiple instruction, which cause multiple addresses to be loaded into registers defining page accesses. These addresses can cross page boundaries, potentially causing the same instruction to fault multiple times. Fixing the faults one at a time, and waiting until the next fault occurs, is feasible; however, handling multiple faults from the first fault generated enhances the performance by reducing the page fault and decode overhead.

Thus, Load Multiple and Store Multiple instructions can potentially cross a 4K page boundary causing not one, but two or even three or more page faults depending on the instruction set architecture. The high speed Dis-Assembler 4280 builds SDP_FAULT[1] and, if necessary, a SDP_FAULT[2], and so on. High speed Dis-assembler 4280 also sets a fault resolution count in an SDP_FaultCount variable, for use upon a Return to SDP Data Abort Handler 4268 to handle such additional faults. The fault resolution count bits are suitably included in part of the Instruction Fault Status field of TABLE 8.

For each VMC, an SDP_FAULT structure of TABLE 8 is instantiated and added to a Fault queue. In a more complex embodiment of SDP, the Fault queue is a FIFO in which multiple fault descriptors SDP_FAULT[i] are queued. Strategic Resolver 4210 then handles or services the Fault queue FIFO until the FIFO is empty. In a type of less-complex embodiment no queue is needed and an SDP_FAULT item is generated when a Page Fault occurs, whereupon Strategic Resolver 4210 handles the SDP_FAULT item. Another less-complex embodiment suitably structures even a single SDP_FAULT item as a queue to provide architectural headroom for upgrade to a more complex embodiment as above. In such less-complex embodiment of SDP, the queue depth accommodates one SDP_FAULT item, and one Page Fault at a time is thus queued and emptied by handling operations of Strategic Resolver 4210.

TABLE 8

SDP_FAULT STRUCTURE
SDP_FAULT[i]

| Field | Size in Bytes | Description |
|---|---|---|
| _Abort_Type | 1 | Prefetch Abort or Data Abort |
| _IFA | 4 | Instruction Fault Address |
| _IFS | 4 | Instruction Fault Status |
| _DFA | 4 | Data Fault Address |
| _SFP | 4 | Stack Frame Pointer |

In FIG. 17, an Instruction Requeue 4265 operation occurs when the fault(s) SDP_FAULT[i] have been handled. Then the page-faulting instruction is set up to re-execute, this time without causing the fault since the fault has been resolved by SDP 4200. Stacks and/or registers are modified for the process which faulted. The Exception Handler of Secure Kernel is called at step 4270, and Exception Handler causes an actual return to the faulting process.

In the less-complex version of SDP for multiple page faulting instructions, a Load Multiple or Store Multiple instruction might cross a page boundary and cause two page faults. SDP handles the first fault singly, and then performs the instruction restart. The second fault is handled after the instruction is restarted. When resolving the second fault, the Scavenger 4220 does not wipe the page in Secure RAM that just received a Swap In to resolve the first fault. Scavenger 4220 internally remembers which page is the last PHYS_SEC_PG that has been swapped into Secure RAM by the Swapper Manager 4240, to prevent Scavenger 4220 from removing that last page. Thus, an endless loop scenario is prevented wherein Scavenger 4220 might otherwise thrash between pages that are the subject of page faults by the same instruction.

If the page fault(s) cannot be resolved by Strategic Resolver 4210 and Scavenger 4220, then Instruction Requeue 4255 operations are bypassed and an Unresolved Fault Handler 4255 is utilized by Strategic Resolver 4210. Unresolved Fault Handler 4255 passes fully decoded fault information on to the Secure Kernel for handling. The fault information details any unresolved fault(s) and/or passes a return error value on to the Secure Kernel in a format recognized by the kernel as identifying unresolved fault(s). The Secure Kernel executes its policy for that type of fault, such as taking evasive action according to the policy for that type of fault, which can include resetting the system.

As noted above, for handling a multiple-faulting instruction, a more complex embodiment of SDP 4200 includes a high speed Dis-assembler 4280 associated with Strategic Resolver 4210. Suppose a Load Multiple instruction caused multiple addresses to be loaded into the registers, and these addresses cross Page boundaries and cause the same instruction to fault multiple times. The less-complex embodiment resolves the page faults one at a time. The more-complex embodiment handles the multiple faults in response to the first fault generated, and thereby enhances processing performance by reducing Page Fault and decode overhead. Note that the processor is likely to have few instructions like a load-multiple or store-multiple that can cause multiple page aborts. It would be undesirable to have a situation occur of first swapping in the second page to address a page fault of such an instruction and then immediately replacing that just-swapped-in second page with the additional page because this would still not satisfy the needs of such an instruction. Accordingly, swapper manager of some embodiments swaps in the additional page to both prevent the additional page fault, and the SDP concurrently operates to prevent page replacement of the second page by the additional page. Also, it is possible to include in SDP groups of simpler instructions as substitutes for each such multiple-operand original instruction, but modifying them over the original page fault encountered instructions, such that they "re-execute" or instead-execute for the client (PA) only "portions" of the original instruction, that is, as if SDP were executing an imminent multiply-faulting instruction in portions. The same approach can be done with modifying the instructions of the client, but restoration to original form would be employed to maintain code integrity of the client (PA).

In FIG. 17, an example of Dis-assembler 4280 creates a plurality of SDP_FAULT[i] elements. A first SDP Fault element called SDP_FAULT[0] and the registers pertaining to the given PA (on the stack of FIG. 10 in a stack frame) are used to ascertain whether another page fault will be incurred by the same instruction before the instruction has completed its operation. Depending on the Instruction Set Architecture (ISA) of the processor, the largest number of page faults that one instruction can cause is used to establish the number of SDP Fault elements in the embodiment. Dis-assembler 4280 builds a second SDP fault element SDP_FAULT[1] when necessary, and any further SDP fault elements (e.g. SDP_FAULT[2], etc.) as needed.

In FIG. 17, if a new VMC is needed but is not yet loaded, Strategic Resolver 4210 calls VMC Switch Manager 4230, as detailed in FIGS. 25 and 26 later hereinbelow. The VMC Switch Manager module 4230 switches from a current VMC to a new VMC as shown in FIG. 17 and detailed in FIG. 26. VMC Switch Manager 4230 requests a new VMC Index through an API designated SDP_VMC_GET_NEW( ) API. VMC Switch Manager 4230 invalidates all SDP MMU entries for the current VMC, and can unlock locked physical page(s) PHYS_SEC_PG of the current VMC. But note that in FIG. 25, a locked PG of a current VMC is appropriately locked, such as for message-passing, even as a new VMC is next dispatched.

If the new VMC has never been activated, VMC Switch Manager 4230 activates the new VMC through an API designated SDP_VMC_ACTIVATE. This API provides any required configurations for the PA that is to be loaded as the new VMC. Also, VMC Switch Manager 4230 rebuilds the MMU Tables for the new VMC based in a VMC_PA2VA array. VMC Switch Manager 4230 further resets and initializes secure registers used by Scavenger 4220 in FIG. 18 and incorporated patent application TI-39617, Ser. No. 11/426,598, to administer Secure RAM for the new VMC. Such secure registers include SDP_PAGE_TYPE (Code/Data) register, Dirty Page WR Register, statistics register STAT, page activation register ACT, and page wiping advisor register ADV.

Switching from the current VMC[i] to a new VMC[j] can feasibly generate a call by VMC Switch Manager 4230 to the Swapper Manager 4240 for a Swap In or Swap Out. In a process alternative, operations are returned by VMC Switch Manager 4230 to the Strategic Resolver 4210 and the Swaps are delayed until determined they are absolutely necessary via PG-FAULTs occurring in the new VMC as provided by the Abort Handler 4260. Some embodiments separate the VMC Switch Manager 4230 in the process relative to the Swapper Manager 4240 and can reduce the number of Swap In and Swap Out operations when switching from a current VMC to a new VMC.

Turning to FIG. 18, an example of the Scavenger 4220 of FIG. 17 has a process 4300 in FIG. 18 that finds an available PG (page) by looking for an empty PHYS_SEC_PG such as by looking at the 16 upper address bits in the VMC_PA2VA array variously designated VMC_PA2VA 2120 of FIG. 4, SE Page Tables 2850 of FIGS. 9A-9E, and VMC_PA2VA in the SDP_VMC_CFG area 3150 of FIG. 11. If there is no empty page, then Scavenger 4300 finds a best page for wiping so that a new page can be Swapped In to resolve the Page Fault. This search process is handled in software or hardware according to various embodiments such as shown in FIG. 18 and in incorporated patent application TI-39617, Ser. No. 11/426,598, abandoned.

Some embodiments use statistics hardware or software and a special prioritizing procedure for prioritizing Data pages and Code pages as Dirty (modified) or Clean (unmodified) to determine the next best PG to wipe (free up) and then Swap In a PG_SLOT from SDRAM into that PHYS_SEC_PG in Secure RAM to resolve the current PG-FAULT. Suppose the PHYS_SEC_PG is found for wiping, but that page is dirty. Then a Swap Out operation is executed to keep SDRAM up-to-date with the dirty page. Then the new page is Swapped In to resolve the Page Fault. If the Statistics hardware module is not able to find a PG to wipe, Scavenger 4300 chooses PHYS_SEC_PG at random.

Prior to any process in this Scavenger 4300, a first check is performed to see if the PG_SLOT is already loaded in Secure RAM from a previous VMC switch. The VMC_PA2VA array in the SDP_VMC_CFG Structure 3150 (FIG. 11 and TABLE 5) indicates for the current VMC if a PHYS_SEC_PG is already linked to the requested PG_SLOT. This array is parsed to obtain the information. If the PHYS_SEC_PG is found, then the Scavenger 4300 module simply updates the MMU descriptor which links the VA (virtual address) of the requested PG_SLOT to the PHYS_SEC_PG just found in Secure RAM 1034.

In FIG. 18, operations of Scavenger 4300 begin with a Call 4305 to the Scavenger to load a virtual address index 1VA1, and then a step 4310 identifies the Type (Data or Code) of the request pertaining to a PHYS_SEC_PG.

Next, a decision step 4320 determines if the particular requested virtual page slot PG_SLOT in fact has a PHYS_SEC_PG assigned to PG_SLOT in the table designated VMC-VA2PA. If the physical page is already assigned to the virtual page, and thus the page to which access is needed is already present (Yes), then operations update the MMU Descriptor and end or return from the Scavenger at a step 4325. If the page slot is not present (No), then operations go from decision step 4320 to a second decision step 4330 to determine whether an empty page PHYS_SEC_PG is available in Secure RAM, such as indicated in the Activity register ACT. If not, operations branch to a scavenging step 4340. If so (Yes), then operations go directly to step 4390, call Swapper Manager 4240, and perform a Swap In of the page.

One example of page-specific bits for register ACT operates as follows. Register ACT in the hardware has one bit per physical page to identify whether the page is active in the sense of being subject, or not, to operations of the hardware page wiping advisor in incorporated patent application TI-39617. The page wiping advisor operations discussed in connection with FIG. 18 identify according to current page usage statistics (on pages having ACT=1) the highest priority page for wiping. Software is used to distinguish an Empty page from a Locked page. When an application has just finished or is replaced by another one (multi-threading invokes an SDP Application secure scheduler, see Strategic resolver 4210 and VMC switcher 4230), all pages are suitably entirely wiped-out.

A physical page is activated by setting ACT[N]=1 in this example, in order to be taken into account by the page wiping advisor. When the physical page activated, the hardware statistics mechanism generates statistics STAT[N] on each such activated page. When a page is not activated (ACT[N]=0), such not-activated page is nonexistent to, or beyond or outside of, the hardware page wiping advisor mechanism. Even if a page is activated (ACT=1), this page can be wiped out (e.g., by flush 4365) even if the hardware page wiping advisor says otherwise, since the page wiping advisor monitors functional buses in a non-intrusive manner.

A physical page marked as not activated (ACT[N]=0) might be Empty or non-empty, and Locked or not locked. The not-activate state simply means that the physical page N is not taken into account by the page wiping advisor mechanism.

During loading or filling of a physical page N in Secure RAM by DMA, such as in case of an empty page, operations also set ACT[N] to zero (0) or momentarily keep ACT[N] in that not-active state. Then when the page N is loaded and ready to be used, ACT[N] is set to one (1) for that page, enabling the page wiping advisor to compute statistics on that page N. When the loading is done, the empty page thus becomes a wipeable page-in-use.

A Locked page is one instance of a page that has ACT [N]=0 and is used by the SDP 4200. Such page is not taken into account by the page wiping advisor and accordingly is not identified for wiping out. The Locked page is used by SDP as described elsewhere herein. Code executing from a page-in-use can branch to or jump onto a Locked page. The SDP PPA Code/Data physical pages 3120 of FIG. 11 are suitably also maintained as Locked pages and with any further protections as appropriate to maintain their operations intact regardless of VMC switching for instance.

Another embodiment providing a second example of ACT register Page-specific bits is tabulated in TABLE 9.

The ACT Page Activation Register is set to one for wipeable pages and to zero for not-wipeable pages. A page-in-use is wipeable but needs the Wiping Advisor information to be wiped. An empty page is wipeable without the Wiping Advisor information and is simply loaded until the page space is full, and the Wiping Advisor comes into play after all page space is full. A locked page is not wipeable. Since an empty page, a wipeable page-in-use, and a locked page are all treated differently, two bits per page in the ACT register are used to keep track of these statuses in this embodiment.

TABLE 9

ACT REGISTER PAGE-SPECIFIC BITS

| | |
|---|---|
| 00 | Reset state of ACT register, page information unspecified |
| 01 | Empty Physical Page in Secure RAM |
| 10 | Occupied Physical Page (Loaded page; subject to page wiping advisor.) |
| 11 | Locked Physical Page |

The ACT register in some embodiments has two page-specific bits indicating whether that PHYS_SEC_PG is Empty (01), Loaded (10) or Locked (11) to support step 4330 of FIG. 18. For instance, the ACT Page Activation Register has the page-specific bits set to 10 (one, zero) for each wipeable page and to 11 (one, one) for a Locked (not-wipeable) page. An occupied page or page-in-use is wipeable and uses scavenging 4340 to determine whether it is to be wiped.

Initialization of the ACT register sets the bits to "01" (zero, one) for each Empty page. The Empty page code 01 is detected at step 4330 so that the Empty page can be filled (Swapped In to) without need of scavenging step 4340. Operations go from step 4330 to step 4390 to Swap In a page PG_SLOT to the empty page PHYS_SEC_PAGE. Empty pages are filled until the physical page space is full, and the scavenging 4340 comes into play if all page space is full and thus no Empty pages are present. A locked page is not wipeable, it is prevented from being wiped. Since an empty page, a wipeable page-in-use, and a locked page are all treated differently, two or more bits per page are used in the ACT register or the information is distributed elsewhere in hardware or software (e.g., PA2VA of FIG. 11 and TABLE 5) as suitable to keep track of these Page-specific statuses.

Figure 28:
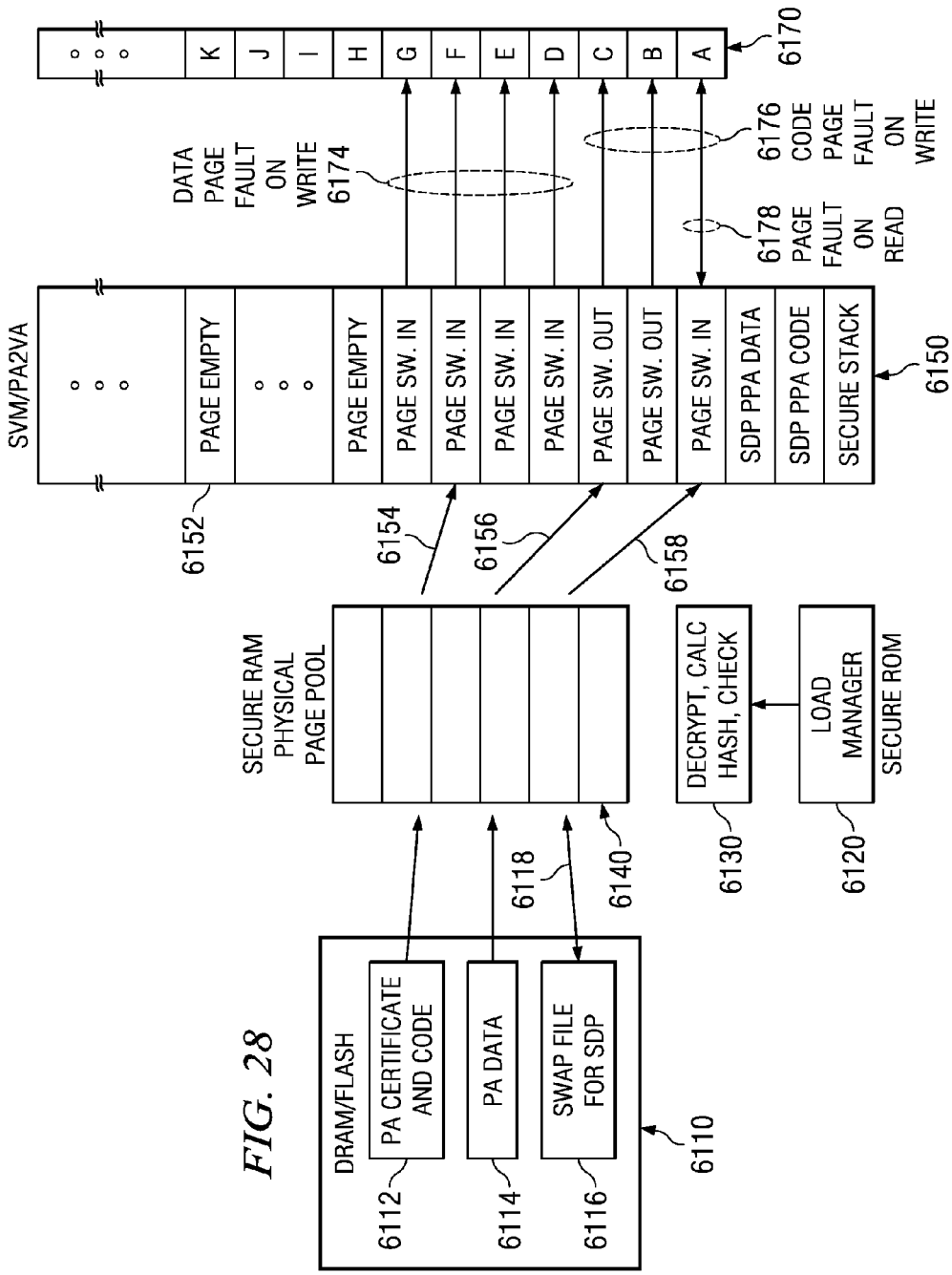
FIG. 28 is a partially-process, partially-block, partially virtual address space diagram of Secure Demand Paging, detailing inventive alternative allocation strategy, control information, and processes for read faults on code and data, Write faults, and swapping.

Step 4340 processes and decides on the best page to wipe, such as by the procedure illustrated in FIG. 28 or otherwise as described in this disclosure and including incorporated patent application TI-39617. The Step 4340 process identifies the best physical page PHYS_SEC_PG index (indexp) and virtual page slot index (PG_SLOT indexv) for the requested type (Data or Code) and puts the page identification in the wiping advisor secure register ADV. If step 4340 determines a single result, then operations go to a decision step 4360. If step 4340 determines multiple results or no result, then operation goes to a step 4350 and randomly selects a page PHYS_SEC_PG, and then goes to the decision step 4360.

Some further embodiments for use with the process of Scavenger Manager 4300 are also detailed in U.S. non-provisional patent application TI-39617 "Page Processing Circuits, Devices, Methods And Systems For Secure Demand Paging And Other Operations" U.S. Ser. No. 11/426,598, abandoned, which is hereby incorporated herein by reference.

Decision step 4360 determines if any of the following conditions are present: 1) Secure RAM physical page PHYS_SEC_PG indexp is Locked, 2) that physical page is not equal to the requested Type (Data/Code), or 3) the physical page PHYS_SEC_PG to be wiped to accommodate requested Virtual page PG_SLOT indexv is the same as the physical page PHYS_SEC_PG into which the last Swapped-In virtual PG_SLOT index v was supplied.

The foregoing first condition (1) means the page is unavailable because it is locked. The second condition (2) means that the step 4340 is returning a non-requested Type of page for wiping in embodiments wherein numerical allocations of Secure RAM pages to Code or Data types are involved, or SDP configuration information includes a particular page type in the operation or not. The third condition (3) prevents thrashing, such as on multiple-faulting instructions like Load Multiple and other scenarios. Step 4360 thus checks for page characteristics unsuitable for wiping and if any such characteristic is present, then branches to identify another page to wipe.

If any of the above conditions pertain (Yes) in decision step 4360, then operations go back to step 4340 and select another page next lower in priority that satisfies the conditions and/or go to step 4350 to randomly select an equally-satisfactory page other than the page which triggered the Yes determination in decision step 4360. Detection operations pertaining to SDP Unresolved Fault 4255 in FIG. 17 determine if an endless or very long loop 4360/4340 is occurring in FIG. 18, or that the foregoing or other unresolved fault conditions are present, whereupon an Unresolved Fault flag is set and operations 4270 return to Secure Kernel.

Some embodiments integrate the tests of step 4360 into the step 4340 so that loops are obviated. For example, software or hardware logic excludes and prevents any Locked, wrong Type page and Last Swapped In page from being in the physical pages that are scavenged.

In FIG. 18, if none of the above conditions pertain (No) in decision step 4360, then operations go to a further decision step 4370. Step 4370 determines if either of the following conditions pertains: 1) physical page PHYS_SEC_PG indexp is unmodified (not-Dirty) as indicated by secure register WR, or 2) that the virtual page slot PG_SLOT is empty. If neither condition pertains (No=Dirty and Not-Empty) in step 4370, then operations go to a step 4380 to execute the Swapper Manager 4240 of FIG. 17 to perform a Swap Out of the current page to be evicted from Secure RAM.

In FIG. 18, operations that use step 4380 go from step 4380 on to a step 4390 to call the Swapper Manager 4240 to execute the desired Swap in of a new page to resolve the Page Fault originally reported by Abort Handler 4260 so the PA can proceed. In decision step 4370, if either condition pertains (Yes=Not Dirty or Slot Empty), then operations bypass Swap Out 4380 and go directly from step 4370 to step 4390 to execute Swapper Manager 4240 to perform the desired Swap In of a new page needed for further executing the PA.

Step 4390 is also responsive to a No Swap In Flag (NSI Flag) with selective operation so that Swap In operation is disabled or bypassed when NSI is active (No Swap In). Swap In operation is enabled and called when NSI is inactive (Swap In=not No Swap In). The NSI flag is useful for supporting embodiments with a pro-active page wiping cycle executed in a processor 1030 lower-use period as described in connection with FIG. 25.

Upon completion or bypassing of Swap In step 4390, the Scavenger has completed its operations and suitably has a RETURN to return control to Strategic Resolver 4210 of FIGS. 17 and 25.

When a page Swap is occurring due to either a page fault usually or precharging (e.g., runtime initialization of FIG. 24) on entry to secure environment, some processing with the RISC processor is suitably performed while the DMA unit is operating the cryptographic accelerator and process. Efficient scavenging process includes the steps of: 1) Start Swap Out operation so that the DMA 2410 of FIGS. 7-8 drives for a while. 2) While DMA is doing crypt operation, use the RISC processor 2425 for scavenging again per 3A. 3A) Use Scavenger 4220 with NSI active to find the next best free page and Swap Out proactively. Alternative to 3A is 3B. 3B) Some embodiments provide an NSO (No Swap Out) bit active and enter a next page identification on a Next Page to Swap Out list or queue NPSO. This defers the Swap Out operation. The page wiping advisor of Scavenger 4220 is further used to selectively find the next-best page for wiping and add it to the NPSO queue as well. The Swap Out is scheduled by parallelizing it with another operation later and/or by performing the Swap Out in a processor lower-activity time period or interval.

In FIG. 19, the Swapper Manager module 4400 shows one example of a process and structure for the FIG. 17 Swapper Manager 4240. Swapper Manager module 4400 handles Swap In of PG_SLOTs from SDRAM to physical pages PHYS_SEC_PG of Secure RAM, and also handles Swap Out of physical pages PHYS_SEC_PG from Secure RAM to PG_SLOTs in SDRAM.

In FIG. 19, operations commence with a Call 4405 to the Swapper Manager 4400 to either Swap In a virtual page identified by indexv1, or Swap Out a virtual page identified by indexv2 (PA2VA identifies the corresponding physical page indexp2 and vice-versa). A Swap Out operation into SDRAM is performed if the PHYS_SEC_PG is considered as dirty (modified). Accordingly, a decision step 4410 determines whether PHYS_SEC_PG is dirty. Page-specific Dirty Bits are provided by the secure WR Register and Dirty indicates that a write access has been performed to this PHYS_SEC_PG. If Dirty, operations go to a Swap Out block 4420 to perform the Swap Out by calling the SDP External Secure Storage Manager 4250 to perform secure storage into SDRAM for page PG_SLOT indexv2.

Operations proceed from Swap Out 4420 to a step 4430. Also, if decision step 4410 determines no Swap Out is required (unmodified page), then operations proceed directly to step 4430, bypassing step 4420. Step 4430 cleans MMU table descriptor(s) for the related PG_SLOT by invalidating a MMU second level descriptor for the virtual address indexv2. In this way, PHYS_SEC_PG in Secure RAM has been wiped by Scavenger and also becomes an Invalid 4K PG as seen by MMU. The VMC_PA2VA array is thus correspondingly cleared to update the Secure RAM contents mapping of virtual pages to physical pages.

Preparatory to Swapping In a virtual page PG_SLOT indexv1, step 4430 updates the MMU second level descriptor for the requested virtual address indexv1 in the MMU Tables. In the SDP_VMC_CFG Structure 3150, the VMC_PA2VA array in one type of embodiment maps 256 PHYS_SEC_PG status (empty=0/loaded=1) of the VMC. See TABLE 5 for another type of embodiment that either also or instead maps sixteen PHYS_SEC_PG of Secure RAM to any currently-resident virtual PG_SLOTs. Step 4430 also initializes the Secure registers page TYPE (Code/

Data) register, Dirty Page WR Register, statistics register STAT, page activation register ACT to Empty, and page wiping advisor register ADV.

Next in a step 4440, the NSI Flag is checked. If No Swap In (NSI) is active, then operations go to RETURN 4460 immediately. Otherwise, if Swap In is permitted by the NSI Flag and PG_SLOT is already securely stored in SDRAM, the Swapper Manager module step 4440 calls the SDP External Secure Storage Manager 4250 to Swap In this PG_SLOT from SDRAM to the wiped PHYS_SEC_PG in Secure RAM. When PG_SLOT Swap In operation is completed, operations go to a step 4450.

Step 4450 updates the VMC_PA2VA array in the VMC_CFG Structure 3150 of FIG. 11 (see also FIG. 4) to identify the correspondence between virtual address indexv2 for the new PG_SLOT that is Swapped In to a given PHYS_SEC_PG having physical indexp2. Step 4450 also updates the Secure registers page TYPE (Code/Data) register, Dirty Page WR Register, statistics register STAT, page activation register ACT, and page wiping advisor register ADV.

Then a RETURN 4460 exits the Swapper Manager module 4400. Swapper Manager module 4400 provides a Return value as follows:
PG_SLOT_SWAP_IN: Swap has been performed correctly.
PG_SLOT_EMPTY: Indicates to the Strategic Resolver 4210 that the Swap In operation has not been performed but the MMU 2nd level descriptor has been set correctly.

An effective SDP Scavenger 4220 process obviates or minimizes thrashing. A sign of thrashing is that an unacceptably high amount of time is consumed performing Swaps on the code being executed, compared to the time occupied in actual code execution. Thrashing in a conventional workstation (wherein data is transferred between DRAM as primary store and hard disk as secondary storage) prolongs applications noticeably and makes a banging sound in hard disk operation. If DRAM thrashing were to occur on a Swap file under SDP swaps between the DRAM and Secure RAM, noise would probably not occur but the PA protected application might appear prolonged or locked. By using a library of PAs with functions that enter and exit, and by using an effective SDP Scavenger process as taught herein, SDP thrashing is avoided.

In FIGS. 20 and 21, the SDP External Secure Storage Manager 4250 module is described. The SDP data structure uses several cryptographic mechanisms to ensure its global security: 1) Integrity, to ensure that data imported and exported between SDRAM and Secure RAM have not been unauthorizedly replaced or unauthorizedly modified, with the integrity being ensured using hashing (e.g., SHA-1) and signing. 2) Authenticity, to ensure that data have been saved in SDRAM by the Secure Mode execution by the chip, with authenticity ensured using dedicated internal Secure RAM which is only accessible within the Secure Environment of the chip (storing a fingerprint of the SDP data). 3) Confidentiality, to ensure that the data saved from Secure RAM to SDRAM are kept secret, with confidentiality ensured using encryption techniques (e.g., AES using CBC mode).

Furthermore, authenticity is ensured over time to prevent replay attack, meaning that actual data is not unauthorizedly replaced with authenticated data stored before. An up-to-date hash value stored in Secure RAM is combined with pre-verification and post-verification of data integrity before and after exporting a SDP PG from Secure RAM to SDRAM.

FIG. 20 shows an example of a process 4800 for executing Swap In utilized by SDP External Secure Storage Manager 4250 of FIG. 17 and for step 4390 of FIG. 18 and/or step 4440 of FIG. 19 in the Secure Swapper of FIG. 4 and in the structures and processes of FIG. 5, FIG. 8, and FIGS. 9A-9E. Swap In Operational Function SDP_PG_SLOT_SWAP_IN Swaps In a PG_SLOT into Secure RAM.

Operations commence with a BEGIN 4805 of Swap In of a PG_SLOT (Load), including a check for valid parameters and if invalid, then an automatic error and RETURN (not shown). Input arguments (parameters) include:
1) SDP_EXT_BK_SEC_STORAGE_ADDRESS: Address of the memory area for the SDP_EXT_BK_SEC_STORAGE structure of FIG. 12 in SDRAM.
2) VMC_INDEX, the index of the VMC for which the PG Swap In is performed.
3) PG_SLOT_INDEX, the index of the PG_SLOT in the VMC.
4) PHYS_SEC_PG which is Swapped In.
5) PG_HASH. Hash value prestored in Secure RAM on during Boot initialization of SDP or on the next-previous Swap Out. Should match a Hash of the page when Swapped In.

If the parameters satisfy the validity check in step 4805, then operations proceed to a step 4810 that sets an index i equal to the requested VMC_INDEX to access VMC[i], sets an index j to access Block Book Keeping block BBK[j] within that VMC[i], and sets an index k to access Book Keeping space BK[k] within that BBK[j]. Book Keeping is discussed in connection with FIGS. 11, 12 and 13.

Next in FIG. 20, a decision step 4820 determines whether the j-indexed BBK[j] of the i-th indexed VMC[i] is already loaded into Secure RAM. If not (No), BBK[j] is used and operations go to a step 4830.

Step 4830 updates the FIG. 11 data structure SDP_INT_SEC_STORAGE in Secure RAM by sending it updated hashes from SDRAM for checking with corresponding hashes already stored in Secure RAM. First, step 4830 hashes the requested Nth one of the SDRAM Book Keeping spaces BK[k] of the Block Book Keeping area BBK[j] to update the BK[k] Hash 3230 in FIGS. 12 and 13. Step 4830 also updates the BBK_HASH[j] in SDRAM that depends on the updated BK[k] Hash 3230.

In this way, step 4830 updates the FIG. 12 structure External Backing Secure Storage SDP_EXT_BK_SEC_STORAGE and then exports the Nth Book Keeping space BK[k] of Block Book Keeping area BBK[j] from the SDRAM. This export operation provides Secure RAM with a a hash of Book Keeping area BK[k], a BBK hash of j-th BBK[j] that depends on the hash of area BK[k], a VMC hash of the current VMC[i] which depends on the BBK hash, and a final hash of SDP Structure comprised of all the VMCs. Various embodiments provide and use one, some or all of these hashes, and also variously execute steps 4830 and 4840 conditioned upon step 4820 or unconditionally. Steps 4830 and 4840 are adapted to the embodiment selected to trade off between Secure RAM space and amount of processing as discussed elsewhere in connection with FIGS. 11 and 12 hereinabove.

Operations proceed to a step 4840 to further update the FIG. 11 structure SDP_INT_SEC_STORAGE in Secure RAM by importing the hash of Book Keeping area BK[k], the BBK hash of j-th BBK[j] that depends on the hash of area BK[k], the VMC hash of the current VMC[i] which depends on the BBK hash, and the final hash of SDP Structure comprised of all the VMCs. See FIGS. 5, 11, 12, 13, 14, 15, 16. Step 4840 checks the integrity of the imported hash(es) BK[k] Hash, BBK_HASH[j], VMC[i] Hash and SDP Hash from FIG. 12 SDRAM by comparing one, some or all of them with the pre-stored Hash value(s) in Secure RAM in FIG. 11.

Operations go from decision step 4820 if Yes (BBK[j] already loaded) directly to a step 4850. Operations also go from step 4840, if executed, directly to step 4850. Step 4850 imports the requested Header k (FIG. 13, FIG. 14) for the requested PG_SLOT into the corresponding SDRAM_PG_HEADER space in FIG. 11 structure SDP_INT_SEC_STORAGE, and further imports the entire requested 4K page PG_SLOT k into the destination physical page PHYS_SEC_PG in Secure RAM. At step 4850 an internal page structure is initialized to have page contents including data of the k-th page k of the j-th BBK j of the i-th VMC I, and a header including 4K byte aligned data1 field and a data2 field of FIG. 13.

Next, a step 4860 processes the PG_SLOT Header for Integrity, if an Integrity Flag is set. Step 4860 utilizes Integrity Check processes such as either or both of the following. In a first Integrity Check process, step 4860 compares its Secure RAM-stored BK_Hash k, which was generated on last Swap Out of the requested PG_SLOT, by comparing for equality with the value BK_HASH newly imported as part of the PG_SLOT Header of the requested PG_SLOT. In a second Integrity Check process, the newly-imported 4K page PG_SLOT itself is hashed and the resulting hash value is compared for equality with BK_HASH k from the PG_SLOT Header. In a third Integrity Check process, the newly-imported 4K page PG_SLOT itself is hashed and the resulting hash value is compared for equality with Secure RAM-stored BK_Hash k, which was generated on last Swap Out of the requested PG_SLOT.

Respective bits in a Verify variable are updated when these first, second, third, and any other Integrity Checks are passed or failed in step 4860. If any of the Integrity Checks are failed, then operations branch to appropriate response(s) to security violation, such as RETURN to Strategic Resolver 4210, reset, warning message, call to central call center and so forth.

Step 4860 suitably includes a call to a Hash function having arguments PgNumDRAM and PgNumSRAM pertaining to the pertinent data structure elements and their locations.

A succeeding step 4870 decrypts PG_SLOT (data1) when directed to do so by a Confidentiality Flag set up for the PA or in the System configuration. Some embodiments double-hash by originally hashing the unencrypted page, combining the page with its hash, encrypting the combined page, and then hashing the encrypted result. On Swap In of FIG. 20, a reverse process is then performed. Step 4860 checks the hash of that encrypted combined page. Step 4870 decrypts and also checks the requested newly-decrypted page PG_SLOT for integrity using an Integrity Pattern (final motif comparison data2) when directed to do so by an Integrity Flag. The Verify variable is accordingly updated depending on whether the verification succeeded or failed.

Then a further step 4880 updates the structure VMC_CFG by setting vmc_index equal to i, bbk_index equal to j within the VMC, and bk_index equal to k within the BBK. Integrity of the entire SDP data structure including SDP_INT_SEC_STORAGE of FIG. 11 is checked, and the Verify variable is further updated based on verification of any one, some or all of the BBK hash, VMC hash, SDP final hash, and SDP final hash versus Secure RAM final hash. Upon completion of step 4880, a step 4890 sets active and returns a datum PG_SWAPPED_IN to represent that the requested page PG_SLOT is successfully Swapped In. Operations RETURN to Strategic Resolver 4210 of FIG. 17 or otherwise as described in connection with FIGS. 18 and 19.

Description now turns to a Swap Out function as depicted in FIG. 21. Compared to FIG. 20, a Swap Out function SDP_PG_SLOT_SWAP_OUT conversely Swaps Out a PG_SLOT from Secure RAM to SDRAM. In this way SDP External Secure Storage Manager 4250 of FIG. 17 has a Swap Out function as well as a Swap In function.

In FIG. 21, SDP External Secure Storage Manager 4250 of FIG. 17 executes a Swap Out process 4900 example for executing Swap Out for step 4380 of FIG. 18, and/or step 4420 of FIG. 19 in the Secure Swapper of FIG. 4, and in the structures and processes of FIG. 6 and FIG. 7. This Operational Function SDP_PG_SLOT_SWAP_OUT saves a page from Secure RAM to DRAM. Operations commence with a BEGIN 4905 of Swap Out a PG_SLOT (Store), including a check for valid parameters and if invalid, then an automatic error and RETURN (not shown).

Input parameters to this Operational Function include
1) SDP_EXT_BK_SEC_STORAGE_ADDRESS: Address of the memory area for the SDP_EXT_BK_SEC_STORAGE structure of FIG. 12 in SDRAM.
2) VMC_INDEX, the index of the VMC for which the PG Swap Out is performed.
3) PG_SLOT_INDEX, the index of the PG_SLOT in the VMC.
4) PHYS_SEC_PG, the physical page which is Swapped Out.

This Operational Function returns an internal hash value as well as performing the Swap Out.

If the parameters are determined valid, in that they satisfy the check in BEGIN 4905, then a step 4910 sets an index i equal to the requested VMC_INDEX to access a requested VMC[i], sets an index j to access a requested BBK[j] within the VMC, and sets an index k to access a requested Book Keeping area BK[k] and page within the BBK[j]. Book Keeping is discussed in connection with FIGS. 11, 12 and 13.

Next in FIG. 21, a decision step 4920 determines whether the j-indexed BBK[j] of the i-th indexed VMC[i] is already loaded in. This step 4920 (with steps 4930 and 4940) is used in embodiments that progressively load PAs from Flash via Secure RAM to SDRAM at run-time instead of loading the whole PA from Flash via Secure RAM to SDRAM at Boot time as in FIG. 24. In the latter case operations simply go from step 4910 to step 4950 in runtime Swap Out. With step 4920, if the determination is Not Already Loaded In (No), BBK[j] is used and operations go to a step 4930.

Step 4930 updates the FIG. 11 structure SDP_INT_SEC_STORAGE in Secure RAM. Step 4930 hashes the N Book Keeping elements BK[k] of the Block Book Keeping area BBK[j] and, now that new BK_HASH[k] data is on hand, proceeds to update the hash BBK_HASH[j] by hashing all sixteen hashes BK_HASH[k] in the Block Book Keeping area BBK[j]. Also step 4930 updates the FIG. 12 SDRAM data structure SDP_EXT_BK_SEC_STORAGE 3200B and exports and copies all N Book Keeping elements BK[k] of Block Book Keeping area BBK[j] from the Secure RAM of FIG. 11 to the corresponding respective spaces in SDRAM of FIG. 12.

Operations proceed to a step 4940 to further update the FIG. 11 structure SDP. INT_SEC STORAGE in Secure RAM by importing all N Book Keeping spaces BK of Block Book Keeping area BBK[j] from the SDRAM into the Secure RAM. This import operation provides Secure RAM with a final hash of the SDP data structure, a set of VMC hashes for each VMC, a set of BBK[j] hashes of any given VMC[i], and a set of N BK[k] hashes contained in the j-th BBK. Step 4940 checks the integrity of the BBK[j] imported hash BBK_HASH[j] from FIG. 12 SDRAM by comparing it with the pre-stored Hash value of FIG. 11 Secure RAM. Integrity of SDP data structure SDP_INT_SEC_STORAGE of FIG. 11 is checked and the Verify variable is further updated based on verification of any one, some or all of the BBK hash, VMC hash, SDP final hash, and SDP final hash versus Secure RAM final hash. Steps 4930 and 4940 are adapted to the embodiment selected to trade off between Secure RAM space and amount of processing as discussed elsewhere in connection with FIGS. 11 and 12 hereinabove.

Operations go from decision step 4920 if Yes (BBK[j] already loaded) directly to a step 4950. Operations also go from step 4940, if executed, directly to step 4950. Step 4950 encrypts PG_SLOT k (data1) if a Confidentiality configuration flag indicates that encryption is requested. Also, step 4950 sets PG_SLOT integrity using the integrity pattern. Step 4950 sets the integrity of the internal page using the final motif (data2).

Next, a step 4960 processes the PG_SLOT Header. If an integrity flag is set, then step 4960 depending on embodiment 1) generates an Internal Page Data Hash k by hashing the PG_SLOT, or 2) separately generates an Internal Page Header Hash by hashing the PG_SLOT Header, or 3) hashes the PG_SLOT and the header together, and/or 4) otherwise suitably establishes integrity. BK_HASH[k] for Book Keeping element BK[k] is processed by writing the new hash into BK_HASH[k] as labeled in FIG. 11 Hash of Swap PG_SLOT Assoc. with BK. Integrity of the entire SDP data structure SDP_INT_SEC_STORAGE of FIG. 11 is furthered by also storing any one, some or all of the BBK hash BBK_HASH[j], SDP_VMC_HASH[i], and final hash SDP_HASH of all VMC hashes.

A succeeding step 4970 exports the following from Secure RAM to SDRAM: 1A) the updated Nth Book Keeping element BK[k] including hash BK_HASH[k] of j-th Block Book Keeping BBK[j], 1B) the updated jth hash BBK_HASH[j] of the i-th VMC[i], 1C) the updated i-th hash VMC_HASH[i] of VMC[i], 1D) the updated hash SDP_HASH of SDP structure over all VMCs, 2) PG_SLOT Header k, 3) the whole internal page of PG_SLOT k to SDRAM_PG, encrypted or not as an Encryption Flag directs, and 4) an Integrity Pattern (encrypted or not) related to this page PG_SLOT k. Step 4970 operates from on-chip Secure Environment with processor and Secure RAM to organize and generate the Page Header for transfer to SDRAM_PG_HEADER in FIG. 12 as described in connection with various embodiments such as those of FIG. 12 and FIGS. 14, 15 and 16. Step 4970 thus stores and updates the corresponding SDRAM areas of FIG. 12 to which the just-stated fields from Secure RAM are exported.

For purposes of steps 4960 and 4970, a function call is suitably made to a function Encrypt4kPGWithHMAC_to_DRAM having arguments PgNumSRAM and PgNumDRAM. The operations are suitably supported in software by process 1030, offloading to DSP 1110 and/or 1420 of FIG. 2 and/or to Security Accelerators 1140 and/or 1450.

Then in FIG. 21 a further step 4980 updates the structure VMC_CFG by setting vmc_index equal to I, bbk_index equal to j within the VMC, and bk_index equal to k within the BBK. The structure SDP_VMC_CFG 3150 of FIG. 11 is updated for instance at VMC_PA2VA to reflect wiping of the page. Embodiments that also or instead use the inverse mapping of PG_SLOT_FLAGS of TABLE 6 update that data structure PG_SLOT_FLAGS as well, to reflect wiping of the page. Upon completion of step 4980, a step 4990 returns a datum PG_SWAPPED_OUT signaling Success that the page is Swapped Out.

SDP Swap security is resistant to Replay Attack and Data Modification Attack. Replay Attack attempts an unauthorized replacement of any part or parts of the data structure DRAM_PG_TRACK_ARRAY of FIG. 12, such as any one or more of page(s) PG_SLOT, a page header, an integrity element in the hierarchical hashing structure, addresses, or backup tables. In the Replay Attack, an earlier-valid instance of any such part(s) is intercepted and copied back into the data structure to attack the secure system. Data Modification Attack or Accident results from operations of unauthorized code, or simply buggy or errant code, in the non-secure operating environment taking control of a secure process at a non-privileged level in the Secure Environment. Some embodiments provide an additional category of security so that the privileged PAs (PPAs) are stored and run inside the secure environment and are not transferred off-chip to the DRAM. Both Replay Attack and Data Modification are detected and prevented as described herein.

Replay attacks are also deterred in SDP by applying methods, processes and structures to SDP such as those described in TI-38214, U.S. Ser. No. 11/100,690 filed Apr. 7, 2005, entitled "Methods, Apparatus, and Systems for Securing SIM (Subscriber Identity Module) Personalization and Other Data on a First Processor and Secure Communication of the SIM Data to a Second Processor," and hereby incorporated herein by reference.

In an additional security aspect, the SDP software checks what has been defined in the Page TYPE register (CODE/DATA) and check that no write accesses occurred on CODE. This check ensures that no page has been overwritten locally in Secure RAM by a buffer overflow attack, DMA attack, or other security attack. This check is performed at non-periodic frequent intervals, such as by Scavenger 4220 and/or Strategic Resolver 4210 and/or by any of the modules of FIG. 17.

Encryption Key Rotation is provided to prevent brute force decryption attacks attempting to find patterns in encrypted structures, if any such patterns existed. Accordingly, encryption keys used for encrypting and hashing Swapped data are rotated to avoid occurrence of such patterns.

Partitioned Sequence ID with bits for Key Index component. The bottom two bits for four keys (or three bits for eight keys, etc.) of a 64 bit sequence ID (identification) are herein called a KSelector. Those bottom bits are used as an index to select a next encryption key in an array of keys which are internally stored in secure storage. KSelector is used as an index for selecting the encryption key to be used for HMAC and TDES. KSelector is suitably used directly for indexing to the key for HMAC, and for extra security, the KSelector is XORed for inverting the index to the TDES encryption key.

The Swap Out structure and process 4900 of FIG. 21 in some embodiments suitably include a Swap Out Sequence Counter that is incremented at step 4910 with each call to the Swap Out 4900 process. The counter maintains a running count called a Swap Out Sequence Number. The keys referenced by KSelector roll over and are rearranged due to the Swap-out Sequence Number (64 bits) incrementing in an ever higher binary count on every Swap-out operation. In this way, the keys are used round-robin for page Swap-out in step 4950 of FIG. 21, for instance.

In some embodiments, the KSelector bits and the Swap Out Sequence Number are hashed into the corresponding page PG_SLOT with the encryption key to generate an HMAC for that page being Swapped Out. The KSelector bits are situated in a predetermined location in the Swapped Page structure, such as related to the SDRAM_PG HEADER in data structure 3200A of FIG. 12, and the Page Header Other Management Information of FIG. 14, and need not be encrypted into the overall cipher text of the Swapped Page structure of FIGS. 14, 15, and 16.

In FIG. 21 step 4960, some embodiments hash the page PG_SLOT together with a predetermined part of, or the whole of, SDP_INT_SEC_STORAGE 3160 hierarchical hash data structure of FIG. 11. For encryption, both related entities, PG_SLOT and the Page Header are encrypted together serially. Before the encryption is started, the 64-bit Swap Out Sequence Number with Kselector bits is copied into the temporary holding variable at the predetermined location. After the encryption is completed, the KSelector bits are saved away in Secure RAM or securely elsewhere for use in decryption by a later Swap In operation to re-load the same PG_SLOT at step 4870 of FIG. 20.

Turning to FIG. 22, secure booting and flashing operations in processor 1030 of FIG. 1 (or baseband processor 1100 and/or apps processor 1400 of FIG. 2) commence with a BEGIN 5105 and proceed to boot. Boot begins with a step 5110 that starts in a CS0 (chip select zero) memory space in on-chip ROM 1032 of FIG. 1 (or ROM 1130 and/or 1440 of FIG. 2 or 2040 of FIG. 3). Next, a step 5115 checks eFuse bits called Production ID bits. If these Production ID bits have a predetermined value such as 00, operations branch to Other Code step 5118. Otherwise, operations go to a Secure Boot sequence, starting with a step 5140.

In FIG. 22, step 5140 executes a Secure mode entry sequence of instructions from on-chip ROM, e.g. 2040 of FIG. 3. The Secure State Machine 1038 of FIGS. 1 and 2 (or 2060 of FIG. 3) is arranged in its hardware monitoring function to detect authorized characteristics pre-established for that Secure mode entry sequence of instructions and/or its associated data. This Secure mode entry sequence of instructions and/or data is pre-programmed by manufacturer with the authorized characteristics, and the ROM code enters secure mode. Secure code is executed at this time rather than user application code.

A further step 5150 executes ROM code to authenticate XLoader/2$^{nd}$ boot code including Flash loader, for flash and other memory authentication such as described in FIG. 3. References to 2ND mean a Flash Loader software in the apparatus (such as a wireless handset). The Flash memory 1025 is one example of a storage medium that has coded physical representations of operations or instructions which processor 1030 of FIG. I and hardware of FIG. 2 executes. The Flash Loader loads software external to the apparatus via a serial interface (e.g., SSI, UART, or USB) into Flash memory 1025 in the cell phone 1010 of FIG. 1. References to XLoader mean bootstrap code that loads Code and/or Data into or out of Flash memory.

In Secure mode, public initialization, secure initialization, and interface initialization occur. In step 5150, Flash memory is checked to determine what spaces are NAND flash, what spaces are NOR flash, and any flash sub-types of Flash memory. Then a Table of Contents (TOC) is searched for presence of the loadable security kernel and SDP Configuration structure SDP_CFG.

A TOC entry includes, for instance an address offset of a described item from the TOC, a size in bytes of the item, a title string, and a TOC end address of the item. For one example, the boot operations of step 5150 search the peripherals by querying the interfaces for a signal that a download host, such as web site(s) 1055 or 1065 or PC 1070 from hard drive and/or optical disk or CD 1075, is trying to boot the system and checks to see if the host has a valid TOC or other suitable information representing acceptable boot code. In step 5150, if no prospect for boot through a peripheral is found, then the external memory interfaces for NAND and/or NOR flash memory are accessed to detect a TOC with valid information. Alternatively, the flash is accessed for other suitable information representing acceptable boot code, but the example description of this paragraph is based on the TOC approach for conciseness. If no valid boot prospect is found, step 5150 returns an error message and the system Secure Kernel takes appropriate default action such as a warm reset. If a valid boot prospect is found, memory booting or peripheral booting occurs as appropriate.

In a step 5160 of FIG. 22, a boot-time Secure Demand Paging (SDP) initialization process SDP_BOOT_INIT is executed to establish the configuration SDP_CFG 3130 of FIG. 11 in Secure RAM, as described further in connection with FIG. 23.

Then in FIG. 22, a step 5165 exits Secure mode. Exit from Secure mode at step 5165 of FIG. 22 makes secure ROM space inaccessible, Security Control Register SECCTRL inaccessible, and secure RAM space inaccessible and establishes any other appropriate protections to additionally foster security. In some embodiments, any subsequent attempts without re-boot to enter Secure mode, even by the special Secure mode entry sequence of instructions and/or data, is detected as a security violation and protective measures follow immediately. For example, this approach is suitably used for Secure mode operations such as updating of Secret Data of FIG. 3. Depending on embodiment, specified operations such as updating of Secret Data occur by forced re-boot and/or occur at run-time by entry into Secure mode. Step 5165 is also suitably put after step 5170.

Next, a step 5170 executes a SDP_RUNTIME_INIT process of FIG. 24 to set up the data structures of FIG. 11 in Secure RAM and the data structures of FIG. 12 and/or FIG. 13 in SDRAM, and by calling XLoader/2$^{nd}$ Flash loader as appropriate for support.

Operations proceed at CONTINUE 5180 to execute the High Level Operating System (HLOS) and User applications, including User applications in non-secure space that call protected applications (PAs). Secure mode is suitably reentered as needed to accomplish secure operations such as PAs 2090 of FIG. 3 and as elsewhere described herein.

In FIG. 23, SDP_BOOT_INIT operations are detailed relative to step 5160 of FIG. 22. SDP_BOOT_INIT operations commence with a call to BEGIN 5205. In a step 5210, a signed image called the SDP Certificate is downloaded from Flash memory 1025 to Secure RAM 1034 to configure SDP. The SDP Certificate is suitably OEM-configurable on a per product basis as an SDP Configuration Data Image SDP_CFG and signed. The Flash TOC (Table of Contents) points to the SDP Certificate as a secured item and data type in Flash memory. SDP Certificate is authenticated in the Secure boot process and imported into Secure RAM 1034. Signed means providing a signature in the sense used in secure communications technology.

Information portion SDP_CFG contains information to initialize SDP_CFG 3130 of FIG. 11 with SDP_CFG information of TABLE 4. A cryptographic signature portion provides the signature of the SDP Certificate. Step 5210 of boot searches for this TOC item and imports SDP Certificate. A non-SDP (non-SVM) configuration is recognized by the Secure Kernel if no SDP_CFG item turns up in the search of the TOC. In that case, Secure Environment ROM-related variables reserved for SDP usage are or remain initialized and set to a predetermined value, such as zero.

SDP PPA 3120 of FIG. It is suitably executed to load the data structure SDP_VMC_CFG 3150 of FIG. 11 and VMC_CFG_ITEM of TABLE 6. In FIG. 23, some embodiments provide information for VMC_CFG_ITEM from the SDP Certificate and include VMC_CFG_ITEM in the SDP_CFG data structure 3130. For instance, determining the number of VMCs can represent a tradeoff. Using fewer VMCs, or only one VMC, with VMC re-use, reduces time that might be spent operating a VMC Switch Manager 4230 and switching VMCs. Using two or more VMCs additionally hardware-protects PA applets from each other and simplifies multi-threading. Accordingly, the data structures are arranged for convenience to and accessibility by the respective authorized persons who are in the best position to determine tradeoffs and establish the various configurational aspects.

In FIG. 23, the SDP_BOOT_INIT process is suitably provided by a type of SDP function called an Initialization Function in response to the one-time call at BEGIN 5205. SDP_BOOT_INIT provides and ensures 1) secure importation 5210 of the SDP Certificate into the Secure Environment, 2) Authentication 5220 of the SDP Certificate, 3) Validity determination 5230 of the parameters in the SDP Certificate, 4) Conversion 5240 of the SDP Certificate into the SDP_CFG structure 3130 of FIG. 11 in Secure RAM, and 5) handshake with the HLOS signifying completion of SDP_BOOT_INIT.

If Authentication 5220 fails or Validity determination 5230 finds any invalid SDP Certificate parameters, then operations branch to a step 5250 to set one or more error flags representing the errors found. Operations proceed from either step 5240 or 5250 to a RETURN 5260. Function Arguments include a pointer to the SDP Certificate, and the SDP Certificate is returned. The Secure Kernel is arranged to set a pointer to the SDP Certificate by looking in the TOC (Table of Contents).

The function SDP_BOOT_INIT(SDP_CFG) is a function of the argument SDP_CFG, the configuration structure 3130. This SDP function performs early initialization of the secure environment, and is an internal-only-supplied function which, to enhance security, is not exported to the non-secure environment. Secure Kernel includes a PPA caller program from Secure ROM. The PPA caller program suitably has already authenticated a Security Certificate including the SDP Certificate so that the Security Certificate contains the OEM-specified configuration for instantiating the security of a particular product such as a cell phone model.

The OEM-specified configuration for security is passed in pertinent part to SDP_CFG 3130 in already-parsed binary form originated from the SDP Certificate pointed to by TOC. SDP Certificate in Flash is previously authenticated, loaded to Flash memory, and tested and validated in a previous secure process such as in manufacturing. In some embodiments, usage (or not) by OEM of SDP technique is selected by a configuration bit or field in an OEM- or manufacturer-provided certificate in Flash memory 1025 and/or by a hardware E-fuse on chip having an on/off conductive state established at manufacture. Product alternatives of SDP and non-SDP (statically mapped Secure RAM) code usefully are located to start at the same virtual address. In this approach, the SE environment Code detects and takes into account a larger secure memory resource with the SDP configuration than with a non-SDP configuration.

The SDP PPA is loaded and has access to the SDP_CFG 3130 receives the SDRAM_SDP_SIZE parameter of TABLE 4 that indicates the total size of the DRAM reserved from HLOS for the data structure of FIG. 12 to support SDP swap file operations. This parameter not only takes into account the FIG. 12 space SDRAM_PG for 4K pages but also the overhead size of the integrity check variables and other spaces in areas 3200A and 3200B.

At step 5240, the SDP PPA provides two API function calls, for example. The first API function call to the non-Secure Environment indicates how much physically contiguous DRAM memory is reserved to SDP so as to notify HLOS-associated secure driver. The second API function call is a handshake by an HLOS-associated secure driver such as by passing a physical pointer identifying to the SDP PPA the SDP swap area SDRAM_BACKING_STORE_ADDR and SDRAM_BK_EXT_STORAGE_ADDR of TABLE 4 for example. The second API function returns a value indicating success or failure to the non-secure caller. If a success value is returned, the SDP is active and SDP Runtime Initialization of FIG. 24 is permitted. If a failure value is returned, the SDP Runtime Initialization is prevented.

In FIG. 24, a process for further initializing Secure Demand Paging organizes and loads software from Flash or download Host via Secure RAM into the FIG. 12 data structure DRAM_PG_TRACK_ARRAY. FIG. 24 gives an example of steps for FIG. 22 step 5170 to execute a process SDP_RUNTIME_INIT of FIG. 24 to set up the data structures of FIG. 11 in Secure RAM and the data structures of FIG. 12 and/or FIG. 13 in SDRAM.

SDP_RUNTIME_INIT is suitably provided as an Initialization Function that establishes the Virtual Machine Contexts (VMCs) in external DRAM as well as initializing portions of Secure RAM of FIG. 11, by calling XLoader/$2^{nd}$ Flash loader as appropriate for support. SDP_RUNTIME_INIT 1) initializes to zero (0) the full SDP_EXT_BK_SEC_STORAGE Structure in SDRAM that is used at runtime by the External Secure Storage Manager 4250 of FIG. 17 to store Secure information, 2) allocates memory area SDRAM_PG of FIG. 12 for the PG_SLOT Backing Store Pages, and 3) establishes the hierarchical Book Keeping data structure 3200B of FIG. 12 and 3300 of FIG. 13.

SDP_RUNTIME_INIT is suitably written as an API that is one-time-only called to initialize the SDP 4200 environment inside the Secure Mode prior to or at the beginning of runtime and after the SDP is configured by SDP_BOOT_INIT step 5160 of FIG. 22 and FIG. 23. SDP_RUNTIME_INIT is called after the non-secure OS initialization/boot is complete, and before loading Non-Privileged Protected Applications (NPPA). This Function is called after HLOS initialization completes when a multi-threaded (multi-process) secure environment is desired. If a single VMC environment is configured, it is suitably called after the SDP_BOOT_INIT function executes.

The SDP_BOOT_INIT function of FIG. 23 suitably responds to a one-time-only call 5160 during secure boot of FIG. 22. The SDP_RUNTIME_INIT function of FIG. 24 suitably responds to a one-time-only call as well. Any subsequent calls to either of these two Functions for service from any source after the respective one-time-only call, suitably result in such subsequently-called Function returning an error. When such an error is returned, then for security purposes the Function prevents re-execution of operations that were provided by the Function in response to the original one-time-only call. This security protection is independent of, and coordinated with, the desirable operations by Strategic Resolver 4210 in FIGS. 17 and 25 to get a new VMC and use VMC Switch Manager 4230 of FIGS. 17 and 26 to update memory spaces and load the new VMC during runtime operations.

The SDP_RUNTIME_INIT function of FIG. 24 has, for example, the following arguments:
1. SDP_PATCH_ELEMENT
2. VMC_Activate.
3. StartingPageSlot
4. StartingPhysPageNum
5. EligiblePhysPageCount
6. PageTableSize In FIG. 24, Function SDP_RUNTIME_INIT installs higher performance SDP patch routines, if any, to augment the run-time performance and establishes the VMCs according to the SDP_CFG configuration. Function SDP_RUNTIME_INIT arguments are described in more detail next. Note that function arguments are process inputs to which SDP 4200 responds to establish or execute operations.

SDP_PATCH_ELEMENT is an SDP Patch Structure pointer or patch list. This pointer is allowed to be NULL, when no modifications to the current SDP functionality of a given embodiment are intended for the platform and multiple VMC (Multi-VMC herein) capability is not configured. SDP_PATCH_ELEMENT is suitably used in an environment where security services are provided by the Security Kernel for loading extensibility through secure applets. The code (contained in a PPA) for implementing that new functionality is previously and entirely loaded in privileged secure mode before the Initialization Function SDP_RUNTIME_INIT is called.

SDP_PATCH_ELEMENT is an SDP Patch List that depends on manner in which ROM code is patched (Presequenced, Replaced, or Post-sequenced, with loadable PPAs). Patches to SDP-MGR are suitably all placed by this Function SDP_RUNTIME_INIT. Running this function SDP_RUNTIME_INIT to completion signifies to Secure Kernel and to SDP Strategic Resolver 4210 that all SDP-related Secure Kernel patches and SDP 4200 patches are now applied. At this point SDP initialization is finalized and ready for subsequent FIG. 25 runtime VMC get-new operations and switching operations by Strategic Resolver 4210 and calls to VMC Switch Manager 4230 for operations of FIG. 26.

The arguments VMC_Activate, StartingPageSlot, StartingPhysPageNum, EligiblePhysPageCount, and PageTableSize are suitably supplied by or derived from the configuration information in SDP_CFG 3130 and SDP_VMC_CFG 3150 of FIG. 11.

VMC_Activate is an input flag argument that selects and activates Multi-VMC functionality to support multi-threading. After return from this SDP_RUNTIME_INIT Function, Multi-VMC functionality is subsequently fully initialized such that SDP 4200 accepts control function calls that initialize, start, and switch between multiple VMCs. If this flag is set to False, SDP activates one VMC and multi-threading of non-privileged applications is not supported and the secure environment is limited to serialized calls. VMCs provide a robust and simplified multi-threaded environment.

StartingPageSlot is a parameter indicating the 4K-aligned starting address of the secure virtual memory in VAS. Let it be assumed that External memory management and MMU have already allocated, created and/or have reserved for their use, appropriate Page Directory Entries PDE in a secure page directory in Secure ROM. The secure PDEs point to SDP Page Table Entries PTE (e.g. up to four with 4K each), as also described in connection with FIG. 4. Strategic Resolver 4210 locates these physical Page Tables via a direct access to the secure PDE[x]. The Page Tables are aligned in physically addressed and contiguous Secure RAM on 4K Secure RAM boundaries (pages). In extended examples, SDP 4200 utilizes four Page Tables to provide, in effect, 4 MB of secure virtual memory as configured by OEM.

StartingPhysPageNum is a parameter indicating the physical address of the first Secure RAM page which identifies the start of the pool of Secure RAM pages to be utilized by SDP for operations to dynamically create a large secure virtual memory. For simplicity, the page number is the physical PG address shifted-right by 12 bits.

EligiblePhysPageCount is a parameter indicating the number of 4K physical Pages beginning at the address StartingPhysPageNum. The physical pages are physically contiguous, so StartingEligiblePhysPageCount and StartingPhysPageNum fully describe the pool of Secure RAM pages to be utilized by SDP.

PageTableSize: is a parameter that ranges from zero to four, for example, and identifies the number of MegaBytes (MB) of secure virtual memory in SDRAM. Zero is a special condition which indicates that demand paging is not utilized, and configures and operates SDP 4200 Abort Handlers 4264 and 4268 for immediate pass-through with no decode or ordinary SDP 4210 response to a Page Fault event.

In FIG. 24, operations of SDP_RUNTIME_INIT commence with a BEGIN 5405 and have access to configuration parameters from spaces 3130 and 3150 pertaining pointing to the SDP data structure of FIG. 11. Next, a step 5410 sets and adjusts indices i, j, k to perform nested loops including an inner first loop k on N Pages per BBK, an intermediate second loop j on L BBK for each VMC, and an outer third loop i on K VMCs.

The inner first loop k proceeds from step 5410 to a step 5415 to Load a first (or next) PA pagewise from Flash memory 1025 of FIG. I (or by wire or wireless from a Download Host machine such as PC 1070, a secure web site such as 1055 or 1065, or optical disk 1075 or other storage medium holding coded physical representations) to Secure RAM. Step 5415 decrypts and authenticates any encrypted, signed page. Further in step 5415, operations set the state of an integrity flag and confidentiality flags for each page i. These flags are set depending on security information that is suitably pre-stored with the PA itself and/or according to security policies established in the Secure Kernel, in the SDP PPA, and in the configuration such as in spaces 3130 and 3150. An Initial Vector IV for a page is set to a random value or otherwise according to security policy. A first space data1 of the page is initialized with any appropriate data. A second space data2 of the page is initialized with a fixed pattern, or with a hash of the contents of first space data1, depending on embodiment.

A succeeding decision step 5420 determines whether the Confidentiality Flag(i,j,k) for the page is set active. If Yes, then operations proceed to a step 5425 to encrypt the contents data1 concatenated with data2 (data1||data2) using AES CBC Mode, Key Encryption Key KEK, and Initial Vector IV as one example of many possible encryption methods.

After step 5425, or after No in step 5420, operations go to a decision step 5430 to determine whether the Integrity Flag(i,j,k) for the page is set active. If Yes, then operations proceed to a step 5433 to Hash the contents of first space data1 of the page and store the hash result in a hash field of the header of Page k in Secure RAM of FIG. 11. If No in step 5430, then operations go to a step 5435 to fill the hash field of the header of Page k with a fixed pattern.

The Confidentiality flags and Integrity flags are page-specific in various embodiments in the sense of being able to specify some pages and not others. These flags are regarded as page-specific when they specify all pages in a block book keeping block BBK or all pages in a virtual machine context VMC without necessarily being granular to page-level in some embodiments.

After either step 5433 or 5435, operations go to a step 5440 to store the Hash header hash result in the hash field 3230 of the k-th BK Book Keeping element k in SDRAM of FIG. 12 and/or FIG. 13. Then the internal page k itself, as encrypted (or not) in steps 5420-5425, is stored to area SDRAM_PG in area 3200A of SDRAM. In step 5440, a virtual page map is established and updated in Secure space to map and relate the virtual page addresses to the VMC/BBK/BK [i,j,k] hierarchy in SDRAM of FIG. 12. At this point the inner first loop k operations 5415-5440 are completed, and the process flow of loop k loops back to step 5410 to repeat the inner first loop k for all N Pages for a given BBK.

Further in FIG. 24, when the inner first loop k is repeated and completed for all N Pages for a given j-th BBK, operations proceed to a step 5450. Step 5450 Hashes the N Book Keeping elements of the j-th BBK. The Hash result is stored in a j-th BBK hash field BBK. HASH[j] of i-th VMC I in Secure RAM of FIG. 11 and similarly into SDRAM in space 3210 of FIG. 12 and/or BBK HASH area of FIG. 13. At this point the intermediate second loop j operations 5415-5450 are completed, and the process flow of loop j loops back to step 5410 to repeat the inner loop k and intermediate second loop j BBK by BBK for all of the Block Book Keeping BBK blocks which are numerous in an amount specified by the number L in a given VMC.

Still further in FIG. 24, when the intermediate second loop j is repeated and completed for all L Block Book Keeping BBK blocks of one VMC, then operations proceed to a step 5460. Step 5460 Hashes the L hash values BBK_HASH[j] concatenated together for the i-th VMC[i]. The Hash result is stored in an i-th VMC hash field SDP_VMC, HASH[i] of the SDP data structure SDP_INT_SEC_STORAGE 3160 in Secure RAM of FIG. 11 and similarly into SDRAM in space 3240 of FIG. 12 and/or the VMC HASH area of hierarchy 3300 FIG. 13.

At this point the outer third loop i operations 5415-5460 are completed, and the process flow of loop i loops back to step 5410 to repeat for the next VMC the inner loop k, the intermediate second loop j BBK by BBK for all of the Block Book Keeping BBK blocks in the next VMC, and then the outer third loop i for the next VMC. In some embodiments, the process is repeated over and over again, VMC-by-VMC, until all VMCs are processed. The VMCs are numerous in an amount specified by the number K. In other embodiments, the process is repeated to put one PA or some frequently-used PAs into the VMCs, and space is left over for other VMCs to be added and/or switched in as described in FIGS. 25 and 26.

Upon completion in FIG. 24 of outer third loop i, operations proceed to a step 5470. Step 5470 Hashes the K hash values of the set of VMCs (K in number) and stores the result in another hash field in space 3240 in DRAM of FIG. 12 and final_hash of FIG. 13 and in a top-level hash field in space 3160 in the Secure RAM of FIG. 11, whence a RETURN 5495 is reached.

Some embodiments use non-volatile on-chip memory 1036 to store the hashes at each level, and other embodiments do this hash storage in Secure RAM 1034 using an always-powered hash storage register, to protect against playback or replay attacks, for instance.

In FIG. 24 SDP_RUNTIME_INIT initializes the SDP data structures of FIGS. 11-13 for use at run-time and provides initial values of the hierarchical Book Keeping structure. Various embodiments provide for different levels or numbers of loops of the hashing in FIG. 24. The process of FIG. 24 is repeated as appropriate on re-boot and soft reset. For example, SDP_RUNTIME_INIT is an API that is accessible inside the secure ROM Code only by the Secure Kernel in privilege mode.

In FIG. 25, Strategic Resolver 4210 has an SDP Initialization Sequence for a new VMC. The sequence occurs as often as a new VMC is loaded during run-time even in the absence of some reset event. The operational blocks of process and structure 5600 in Strategic Resolver 4210 are first described as a whole flow of FIG. 25 and then various operational blocks are individually described in further detail.

Operations 5600 in Strategic Resolver 4210 commence at a BEGIN 5605 of an SDP initialization sequence. Initialization sequence operations go to a decision step 5610 to determine whether resolving a Page Fault needs a particular page from SDRAM associated with a new VMC. New VMC means a VMC that does not pertain to pages that are the main subject of operations being executed out of Secure RAM.

Suppose in step 5610 that the determination is Yes that a page from a new VMC has not already been Swapped In to Secure RAM from SDRAM. Then operations proceed to a step 5615 to identify the new VMC by accessing the virtual page map that was established by step 5440 to relate virtual page addresses to the VMC/BBK/BK [i,j,k] hierarchy in SDRAM of FIG. 12. Some embodiments pre-establish the VMC information in SDP_CFG for use in Step 5615. Step 5615 calls an Operational Function SDP_VMC_GET_NEW that identifies the VMC index i in which the needed page resides and returns a function argument New_vmc with that value specifying the VMC that is needed to resolve the Page Fault.

Then operations proceed to a step 5620 designated SDP_VMC_SWITCH(New_vmc) to perform the VMC switch of FIG. 26. For example, a new VMC can be needed if one PA calls another PA, or when a User application has finished using one PA and subsequently calls another PA.

From step 5620 in FIG. 25, operations go to a decision step 5625 to determine whether the new VMC is Activated. If No, then operations proceed to activate the VMC in a step 5630 SDP_VMC_ACTIVATE(param) based on parameters pertaining to the VMC.

Next, a step 5635 uses a SDP_VMC_CODE_DATA_FLAG that establishes the requested page Type as Code or Data. If Code, then a step 5640 1) responds to the SDP Abort Handler 5645 pertaining to Prefetch Abort Handler 4264 of FIG. 17, 2) calls Scavenger 4300 of FIG. 18 and finds a PHYS_SEC_PG in Secure RAM, 3) Swaps In the requested Code page PG_SLOT from SDRAM into PHYS_SEC_PG in Secure RAM as shown in FIGS. 18, 19 and 20, and 4) goes to step 5655. If not Code in step 5635, then operations go to step 5655.

Step 5655 uses the SDP_VMC_CODE_DATA_FLAG in the case of a requested Data page to activate step 5660. Step 5660 1) responds to the SDP Abort Handler 5665 pertaining to Data Abort Handler 4268 of FIG. 17, 2) calls Scavenger 4300 of FIG. 18 and finds a PHYS_SEC_PG in Secure RAM, 3) Swaps In the requested Data page PG_SLOT from SDRAM into PHYS_SEC_PG in Secure RAM as shown in FIGS. 18, 19 and 20, and 4) goes to step 5670. If not Data in step 5655, then operations go to step 5670.

Further considering decision step 5625, if the new VMC is already activated, then operations go from step 5625 (Yes) directly to step 5670 wherein the VMC is running the application. The intervening steps 5630-5660 are bypassed. Further considering decision step 5610, if no switch to a new VMC is needed, then operations go from step 5610 directly to step 5670 wherein the Strategic Resolver 4210 stands ready to handle Page Faults generated by the application in the currently active VMC. Some embodiments use a combined flow in Strategic Resolver 4210 wherein the operations go from step 5610 to 5635 and load the page into Secure RAM for the currently running VMC. In such embodiments decision step 5625 (Yes) then goes to step 5635 too.

In FIG. 25, after step 5670, a decision step 5675 determines whether the application execution of step 5670 is complete. If not complete (No) at step 5675, operations go to a decision step 5680 to determine if an asynchronous message buffer or other page lock needs to be set up. If No in step 5680, operations continue running the application in step 5670.

If Yes in decision step 5680, PA or an Interrupt Handler is calling or requesting Strategic Resolver 4210 to set up a Locked page whether or not a Page Fault is involved. Strategic Resolver 4210 operations respond to the Yes condition at step 5680 by proceeding to a step 5690 to Lock a page, such as by calling a process SDP_VMC_UPDATE_PG_STATUS or executing a process of FIG. 27 as described elsewhere herein.

Depending on embodiment, Lock pertains to one page or alternatively the PA requests a specified number of pages within a permitted range to be Locked, and Strategic Resolver responds. This decision step 5680 represents a Call, an interrupt-driven operation or polling operation depending on the nature of the embodiment. Once the page Locking is performed, operations go to step 5670 to continue running the application. Each Locked page is then suitably used to support the applications code and any interrupt-driven operation or polling operation of the application.

In decision step 5675, if the application execution of step 5670 is complete (Yes at step 5675), then operations branch to step 5685 to optionally operate the Scavenger 4220 of FIG. 17 (4300 of FIG. 18). Scavenging at step 5685 and at steps 5640 and 5660 in the process 5600 occurs according to a time allocation that puts scavenging in processor idle periods, when possible. For example, suppose the processor has an idle loop involving a Halt that yields to HLOS wherein interrupts in HLOS cause pre-emption of the Secure environment. During the low activity interval, the Scavenger 4220 suitably detects any pages with dormancy, in usage, while dispatching those pages found dirty for Swap Out. This scavenging process serves to optimally keep ahead of future page demands by freeing dormant pages, with respect to application access, such that future application page demands can be resolved quickly with free pages from a free page pool.

Step 5685 applies to certain embodiments that perform pro-active page wiping by Scavenger 4300 to maintain one or more empty pages PHYS_SEC_PG in Secure RAM. In such embodiments, processor 1030 signals a low-activity interval or status of processor 1030 pertaining to any of several names such as Idle, Standby, Sleep, or otherwise as appropriate. Pro-active page wiping is established by Strategic Resolver 4210 checking the PA2VA and determining that Secure RAM is fully utilized according to a definition such as the number of physical pages currently in use exceeding a threshold number.

If Full, Strategic Resolver 4210 sets a No Swap In Flag (NSI Flag) before calling Scavenger 4300 by step 5685. Thereupon, Scavenger 4300 operates as in FIG. 18 with the selective operation that Swap In step 4390 of FIG. 18 is disabled or bypassed on the pro-active page wiping cycle. When Strategic Resolver 4210 in FIG. 25 determines that PA2VA is not Full, in that one page or some predetermined number of Secure RAM pages PHYS_SEC_PG is/are Empty, then step 5685 scavenging is bypassed. When Strategic Resolver 4210 subsequently calls Scavenger 4300 in step 5640 and/or 5660 of FIG. 25, the Page Fault is resolved by Swapping In to an empty page PHYS_SEC_PG quickly via Empty Page decision step 4330 of FIG. 18 going directly to Swap In step 4390.

Operations 5600 complete at a RETURN 5695 and go from Strategic Resolver 4210 of FIG. 17 to SDP step 4255 or 4265 and to RETURN 4270 to Secure Kernel.

Some particular steps in FIG. 25 are detailed further hereinbelow.

In FIG. 25, step 5615 performs the function SDP_VMC_GET_NEW. This function returns a free VMC index designated New_vmc analogous to or referring to the VMC_INDEX_LOCKED variable in the SDP_VMC_CFG Structure 3150 of FIG. 11. The variable VMC_INDEX_LOCKED is parsed bit by bit. When a free VMC Index value is found, the value is designated as a value New_vmc and a presence bit for it is set (e.g., to one (1)) and returned to the Strategic Resolver 4210. This process is suitably made uninterruptible. The function does not need to have any argument.

Step 5615 returns the value New_vmc that associates a VMC with the PA to be executed and for which a page is requested. This value New_vmc is used for subsequent step 5620 to call Operational Function SDP_VMC_SWITCH (new_vmc) of FIG. 26. Step 5620 causes SDP 4200 to revise the VMC VAS space to accommodate a specific PA to be executed. A status field VMC_HANDLE of TABLE 10 for the VMC also include bit(s) for predetermined error diagnostic value(s), when returned by step 5615 or 5620, to indicate that the new VMC is not instantiated due to an invalid configuration or other reason specified by the error diagnostic value. If the predetermined error value is returned by function SDP_VMC_SWITCH, Strategic Resolver 4210 takes appropriate remedial action. The value New_vmc is suitably included in the VMC_HANDLE field.

TABLE 10

| | FIELDS IN VMC_HANDLE |
|---|---|
| Value | Description |
| New_vmc | VMC index for the new VMC. See Function SDP_VMC_GET_NEW |
| ERROR | Error diagnostic bits field. New_vmc is set to error value too. |

TABLE 10-continued

FIELDS IN VMC_HANDLE

| Value | Description |
|---|---|
| ERROR_MINSLOT | Locking has reduced or imminently will reduce the number of wipeable pages below the MINSLOT minimum. |
| Fields for Return Values From VMC Switch Manager 4230: | |
| NEW_VMC_NOT_INIT | New VMC is available in DRAM but not accessible in SDP_VMC_CFG 3150 of Secure RAM. New VMC is not yet initialized with request parameters. |
| VMC_ACTIVATION_REQUEST | The new VMC requested is not in DRAM. |
| VMC_DEACTIVATION_REQ | Request for Deactivation of a VMC. |
| VMC_READY | New VMC is initialized. |
| VMC_PGLOCK | VMC to which a Page Lock is directed. |
| VMC_OTHER_PGLOCK | Bit signifying Scavenger wiping advisor is needed before Locking a page. |
| PG_FLUSH_START | Bit signifying Scavenger needs to flush a specific page. |
| VMC_OTHER_PGRELEASE | Bit used in releasing Locked page and restoring a page. |
| Page Locking Across VMCs: | |
| STATUS | Commands a page be locked or unlocked. 00 No page status change 01 Lock the Page 10 Unlock the Page (Lock Release) 11 Page locking error |
| Field accompanying VMC_HANDLE | |
| PG_SLOT_INDEX | Virtual Address of a page to be locked or unlocked (Physical page address with PA2VA is alternative.) |

In FIG. 25, VMC Activate step 5630 is implemented, for example by an Operational Function SDP_VMC_ACTIVATE. The function SDP_VMC_ACTIVATE starts a VMC to support a new secure virtual memory context and provide secure memory space for a new NPPA to be loaded. In this way, in embodiments that do not load all PAs from to Flash to DRAM except as needed, the new VMC is added to SDRAM and to Secure RAM when a Page Fault occurs that demands a new PA and new VMC. In other embodiments that have pre-loaded all PAs from Flash to DRAM, and the number of PAs exceeds the maximum number NUM_VMC of VMCs identified with values of index i, then SDP_VMC_ACTIVATE provides a VMC index i for a PA that does not currently have a VMC index i. SDP_VMC_ACTIVATE further sets up the SDP_VMC_CFG space 3150 as described herein for the PA as a new VMC.

For activating a new VMC that is in Flash and not SDRAM, the function SDP_VMC_ACTIVATE operates like the process of FIG. 24 on inner loop k and intermediate loop j using steps 5410-5450, followed by step 5460 once for the one additional VMC being selectively activated, and then steps 5470 and 5495. The operations of FIG. 24 are selectively controlled to include 1) a first alternative of initializing a set of virtual machine contexts, as in runtime initialization, and 2) a second alternative of activating a single virtual machine context to update such a set, as in SDP_VMC_ACTIVATE.

For activating a new VMC that is in SDRAM because of previous execution of SDP_RUNTIME_INIT of FIG. 24 but currently not in Secure RAM, the function SDP_VMC_ACTIVATE sets VMC_CURRENT_INDEX to New_vmc and downloads the VMC image 3200B of FIG. 12 or 3300 of FIG. 13 to Secure RAM from SDRAM.

The function SDP_VMC_ACTIVATE sets the appropriate parameters such as function arguments for VMC index VMC_CURRENT_INDEX, the VAS size VMCVAS_SIZE, and the number of Code pages NUMBER_OF_CODE_PHYS_SEC_PG in the data structure 3150. Some of these parameters are suitably specified by OEM. Some parameters depend on particulars of hardware protection capabilities of the MMU. Some parameters for the VMC depend on the nature of the PA to be loaded and are provided in a PA Certificate supplied with the PA.

The argument VMC_CURRENT_INDEX in the area 3150 of FIG. 11 supplies the index [i] of the VMC data structure. Argument NUMBER_OF_CODE_PHYS_SEC_PG specifies a partition between DATA and CODE secure pages PHYS_SEC_PG for those embodiments that allocate pages by code and data Type in the Secure RAM space for the VMC. Page wiping and loading of a new page PG_SLOT is then performed subject to the allocation constraint. DATA or CODE type information is correspondingly entered into TYPE bits of a secure register SDP_PAGE_TYPE for each physical page PHYS_SEC_PG of Secure RAM. Argument VAS_SIZE tells the External Secure Storage Manager 4250 the size of the virtual address space for this particular VMC that is subject to Swapping and Book Keeping.

In response to SDP_CFG parameters and specific hardware protection capabilities of the MMU, this function SDP_VMC_ACTIVATE accommodates NPPAs by partitioning the VMC between Stack, Data and Code as in FIG. 10. Stack, Data and Code segments are suitably allocated in 4K pages and have a No-Execute attribute for Stack, and page Type register bit for Data pages. The process allocates the private stack for an NPPA at the beginning (low address end) of the VMC VAS. The NPPA stack is isolated and protected in case the NPPA stack exceeds its size bound on its lowest address in embodiments wherein the stack grows towards lower memory addresses. In other words, the stack crosses a predetermined boundary in the VAS. In this way, a security violation such as a replay attack on the stack is readily detected. SDP_VMC_ACTIVATE positions Data segments in VMC VAS in addresses that are followed by the address positions of the Code segments.

Some embodiments establish a one-to-one mapping of NPPAs in order of the VMCs up to the NUM_VMC maximum number defined in the SDP-CFG. Each consecutive Call to this function SDP_VMC_ACTIVATE creates one VMC per call. This mapping and creation of VMCs supports OEM configuration of different VMCs with different sizes VMC_VAS_SIZE via the SDP_CFG configuration structure.

Function SDP_VMC_ACTIVATE returns a value in the bit-field VMC_HANDLE of TABLE 10 associated with each NPPA VMC loaded by Strategic Resolver 4210. This VMC_HANDLE value is used for any subsequent calls to function SDP_VMC_SWITCH of FIG. 26 that cause SDP 4200 to change the VMC VAS for different NPPAs to be executed. A value of zero, when returned by SDP_VMC_ACTIVATE, indicates that an error occurred, and the VMC could not be instantiated due to an invalid configuration. The field VMC_HANDLE is also used as a status field and error diagnostic for the function SDP_VMC_SWITCH of FIG. 26.

Function SDP_VMC_ACTIVATE is run on-demand as shown at step 5630 of FIG. 25. Also, Function SDP_VMC_ACTIVATE is run proactively in some embodiments by a prediction mechanism using information available in advance of need of VMC activation. Then the VMC activation operation is scheduled for a period of lower processor activity as discussed in connection with step 5685 of FIG. 25 or parallelized to make the system operate very efficiently.

FIG. 26 depicts a VMC Switch Manager 5620 process, which in an example is established by an Operational Function SDP_VMC_SWITCH. Function SDP_VMC_SWITCH is called by the Strategic Resolver 4210 of FIG. 17 and FIG. 25 for switching the VMC VAS to allow one or more of a different set of NPPAs to execute. The SDP VAS is re-mapped, and fully re-mapped as by the SDP_RUNTIME_INIT process of FIG. 24 if necessary. A revised and/or different area of the DRAM-SWAP space is thereupon utilized by SDP for servicing page faults for the new VMC. Each VMC VAS is allocated its own private set of backing DRAM pages in the external DRAM data structures of FIG. 12 and FIG. 13.

An index New_vmc is provided and used internally to access an array of VMCs in the SDP_VMC_CFG data structure 3150 of FIG. 11. The SDP_VMC_CFG structure contains pointers to each VMC. The range of index New_vmc is from one (1) to configuration value NUM_VMC in SDP_CFG 3130 of TABLE 4.

Function SDP_VMC_SWITCH 5620 has New_vmc suitably included in an argument VMC_HANDLE, which is supplied by the caller process such as Strategic Resolver 4210 and utilized internally as an array index into SDP_VMC_CFG data structure 3150. SDP_VMC_CFG consecutively contains each VMC structure as partially defined and initialized by the SDP_RUNTIME_INIT function of FIG. 24 and updated by Strategic Resolver 4210 in FIG. 25 and SDP_VMC_SWITCH of FIG. 26 to form the latest updated array for SDP_VMC_CFG data structure 3150.

In FIG. 26, step 5620 of FIG. 25 commences operations of SDP_VMC_SWITCH( ) at point 5710. The value VMC_HANDLE of TABLE 10 is checked for any predetermined value indicative of an error condition before argument New_vmc is utilized as an index into the SDP_VMC_ARRAY of SDP_VMC_CFG 3150.

A decision step 5720 determines whether there is an active VMC in Secure Mode in the sense of being available in SDRAM. If decision step 5720 determines No, then operations branch to a step 5770 and return a VMC Activation Request datum VMC_ACTIVATION_REQUEST such as in a subfield of VMC_HANDLE. In this way, when operations thereafter reach step 5625 of FIG. 25, the operations go to step 5630 to Activate the new VMC by download of information and pages pertaining to the new VMC from Flash in the manner of a further iteration of the process FIG. 24 for the new VMC.

In FIG. 26, if decision step 5720 determines Yes, then operations go to a second decision step 5730 to determine whether the VMC_Index is locked in VMC Index Initialization VMC_INDEX_LOCKED. Decision step 5730 makes this determination whether the requested VMC is already initialized in the sense of being available in SDRAM but not accessible in SDP_VMC_CFG 3150 of Secure RAM in FIG. 11. If the VMC_Index is not locked, then operations at a step 5740 return a datum NEW_VMC_NOT_INIT, such as in a subfield of VMC_HANDLE, that the new VMC is not initialized. In this way, when operations thereafter reach step 5625 of FIG. 25, the operations go to step 5630 to Activate the new VMC by download of information pertaining to the new VMC from area 3200B of SDRAM.

If the VMC_Index is locked in the sense that the requested VMC is accessible in SDP_VMC_CFG 3150 of Secure RAM of FIG. 11, then operations go from decision step 5730 to a step 5750.

In step 5750, a determination is made whether the SDP_VMC_CFG 3150 is full of VMCs. If Full, then operations call the function SDP_VMC_DEACTIVATE. If Not Full, then operations at step 5750 partially clean the area of SDP_VMC_CFG 3150 pertaining to the current VMC from which the switch to New_vmc is being made.

If Not Full, step 5750 partially cleans as to current VMC as follows: 1) clean the entries VMC_MMU_TABLE, 2) clean the VMC_CURRENT_INDEX to a predetermined value such as all-ones, 3) Unlock all locked pages PHYS_SEC_PG in Secure RAM of the current VMC, 4) clean the VMC_PA2VA array for the current VMC, and 5) clean the PG_SLOT_FLAGS.

Notice that the step 5750 operates on page-specific locking data established in the secure memory space and alters the page-specific locking data in-place by unlocking free of rearrangement of the locking data.

If Full, Deactivation SDP_VMC_DEACTIVATE is applied to the current VMC being used prior to the new VMC, or applied to a VMC in a VMC-wiping process analogous to the page-wiping process or by another appropriate policy depending on embodiment, and unlocks all locked pages PHYS_SEC_PG of the VMC being Deactivated. VMC Deactivation is also suitably performed during a processor Idle condition or other interval of processor lower-activity, such as discussed in connection with step 5685. Operational Function SDP_VMC_DEACTIVATE has an argument New_vmc that indicates the index of the VMC that is processed. This index range is from 1 to NUM_VMC of TABLE 4. A VMC_CURRENT_INDEX is suitably set to another predetermined value (e.g., all ones) for a de-activated VMC.

Function SDP_VMC_DEACTIVATE is responsible to de-activate a VMC from the Secure Environment by cleaning the VMC Configuration item SDP_VMC_CFG 3150 in Secure RAM (FIG. 11) related to the VMC_Index for the VMC to be deactivated. Cleaning the SDP_VMC_CFG 3150 in Secure RAM includes steps of 1A) clean the entries VMC_MMU_TABLE, 1B) clean the VMC_CURRENT_INDEX to a predetermined value such as all-ones, 1C) clean the VMC_ACTIVE and VMC_INDEX_LOCKED fields to unlock all locked pages PHYS_SEC_PG in Secure RAM, 1D) clean the VMC_PA2VA array for all entries related to the removed VMC_CURRENT_INDEX, and 1E) clean all fields in the area VMC_CFG_ITEM.

Operations go from step 5750 to a third decision step 5760 to determine whether the new VMC has already been activated. If No, then operations go to the step 5770 and return the VMC Activation Request datum VMC_ACTIVATION_REQUEST.

Suppose decision step 5760 determines Yes, and operations now reach composite step 5780 that includes steps 5782, 5784, 5786. This condition occurs, for example, when a PA has been called by a User application, the PA has completed, and then the PA is called again by a User application. In such case, the VMC has already been activated and the new VMC is already represented in SDP_VMC_CFG 3150. In other words, a switch from the current VMC to the new VMC in Secure RAM is to be performed.

In composite step 5780 the VMC switch is performed by switching in the new VMC and reconstituting its fields in SDP_VMC_CFG 3150 in Secure RAM. Operations proceed to 1) rebuild MMU Tables in a sub-step 5782 based on information in the VMC_PA2VA array of the new VMC, 2) Initialize/update the Secure registers in a sub-step 5784 so Scavenger 4220 in FIG. 18 and incorporated patent application TI-39617, Ser. No. 11/4,2659,8 can administer Secure RAM for the new VMC. Such secure registers include page TYPE (Code/Data) register, Dirty Page WR Register, statistics register STAT, page activation register ACT, and page wiping advisor register ADV. For page type-allocation and other embodiments, update the secure registers for the new VMC by reading the SDP_VMC. CFG structure 3150 and the SDP_CFG structure 3130 including CODE_DATA of TABLE 4 to update the ACT secure register. 3) Set the VMC Current Index VMC_CURRENT_INDEX to the new index New_vmc in a sub-step 5786.

After completion of composite step 5780, operations at step 5790 return the datum VMC_READY such as in a field of VMC_HANDLE.

In FIGS. 25 and 26, Locking and Unlocking of pages is performed in a first process example by an Operational Function SDP_VMC_UPDATE_PG_STATUS. This Function has a first argument called STATUS to command a page to be locked as in step 5690 of Strategic Resolver 4210, unlocked as in step 5750 as VMC Switch Manager 4230, or relocked as in step 5640 of Strategic Resolver 4210. This Function has a second argument PG_SLOT_INDEX that specifies a virtual address (or address offset) that is mapped to secure physical page PHYS_SEC_PG of Secure RAM. Some embodiments specify the physical page address itself by the second argument.

In some embodiments, a status entry in the page Activation register ACT pertains to the particular PHYS_SEC_PG to which PG_SLOT_INDEX indirectly or directly points. In such embodiment, this function SDP_VMC_UPDATE_PG_STATUS suitably changes the status entry in the page Activation register ACT. The active or inactive state of each physical page-specific ACT bit respectively defines for each PHYS_SEC_PG in Secure RAM whether that PHYS_SEC_PG is or is not used in the Scavenger mechanism. The ACT register of TABLE 9 thus defines whether the page is included in or effectively removed from the pool of PHYS_SEC_PG pages available for page wiping by Scavenger 4220 of FIG. 18. Thus the ACT Register can also appropriately be named a Page LOCK register in such embodiment. (Page Locking in the ACT Register is independent of initializing a VMC index as tabulated in the VMC_INDEX_LOCKED field of TABLE 5 of SDP_VMC_CFG 3150 of FIG. 11.)

In other embodiments, the Lock status is maintained as a STATUS field by software, such as shown for example in TABLE 9. Operations for locking and unlocking refer to either or both of the STATUS field and the ACT register.

Suppose a virtual page PG_SLOT is not already present in Secure RAM and needs to be Locked. A call to Function SDP_VMC_UPDATE_PG_STATUS Locks such a page by calling Scavenger 4220 of FIGS. 17 and 18 to identify a particular physical page PHYS_SEC_PG as the lock target and wipe and Swap In or reload PG_SLOT to that PHYS_SEC_PG. The PHYS_SEC_PG is prepared for its intended use, such as handling messaging or asynchronous events such as interrupts. The virtual address of PG_SLOT is mapped to the address of lock target PHYS_SEC_PG by writing (FIG. 19) to PA2VA and/or PG_SLOT_FLAGS of FIG. 11. With PG_SLOT now Swapped In to PHYS_SEC_PG, the PHYS_SEC_PG is marked as Locked, the STATUS bit(s) for the page are set to 01 (Locked in TABLE 9) and the PHYS_SEC_PG is now prevented from being wiped by the Scavenger 4220.

If virtual page PG_SLOT of the current VMC[i] is already present at the appropriate PHYS_SEC_PG, Function SDP_VMC_UPDATE_PG_STATUS takes the following actions: 1) Checks the PG_SLOT to insure that physical page PHYS_SEC_PG in Secure RAM is slotted or assigned to PG_SLOT and thus bypasses Scavenger 4220 and 2) Marks the slot PG_SLOT as Locked, the STATUS for the page is set to 01, and thus is made Ineligible for wiping by Scavenger 4220. No further PG faults occur for a Locked page because the page is being held as always-present in the VMC VAS.

Figure 27:
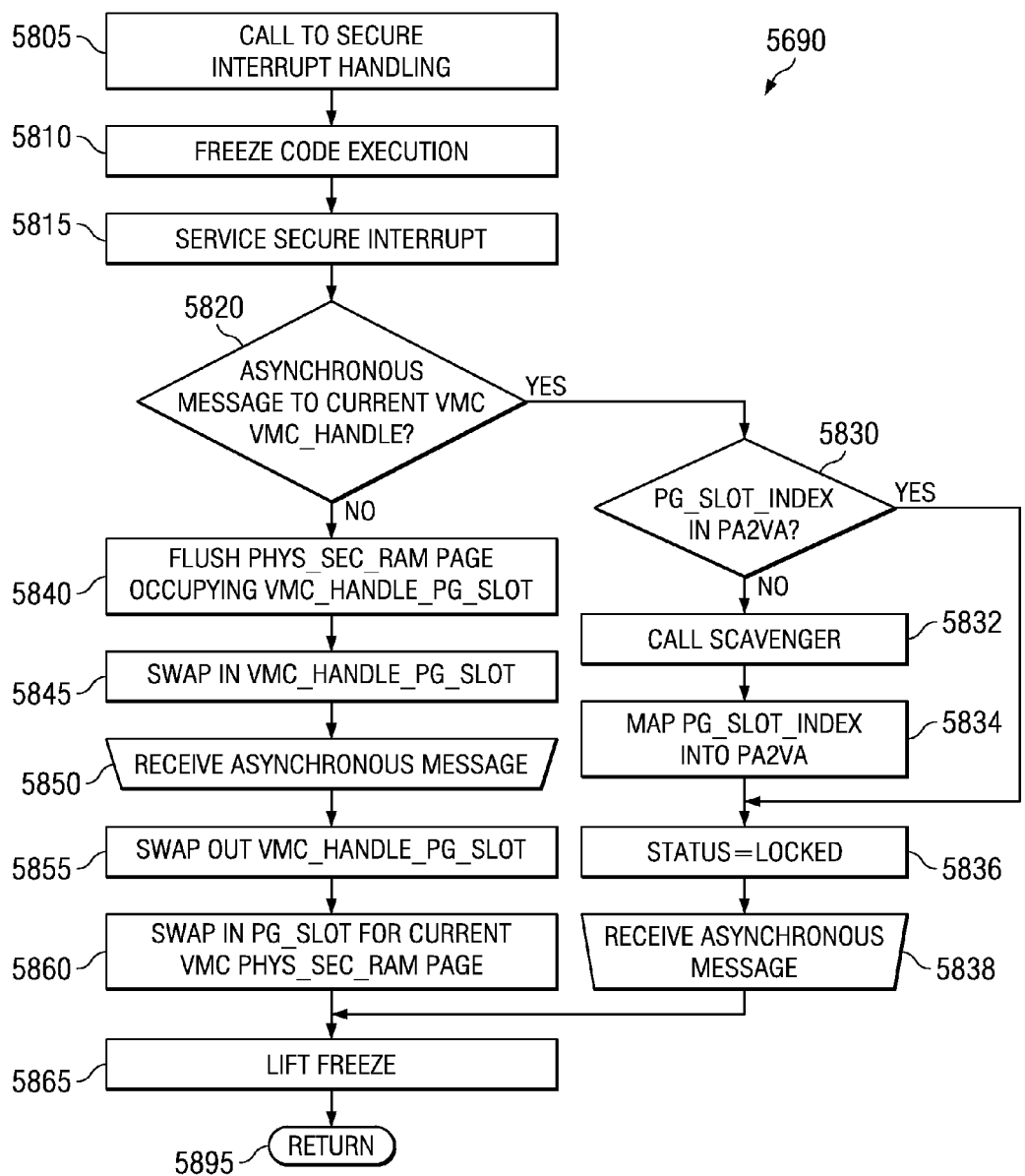
FIG. 27 is an inventive process block diagram for Secure Demand Paging, detailing an inventive process of Secure Interrupt Handling for asynchronous messaging for use in connection with the processes of FIG. 25 and FIG. 17.

Applications and certain Pages can benefit from being Locked for operations like delivering asynchronous messages into PA message buffers such as in FIG. 27. The Locking function is utilized appropriately for short periods of time sparingly and as necessary, to thereby maintain high performance of the overall system. Also, in some embodiments SDP 4200 establishes a minimum space parameter MINSLOT of TABLE 5 that provides, for instance, that at least two Secure RAM pages are empty or are pages mapped into wipeable slots. MINSLOT is suitably set by either SDP boot initialization of FIG. 23 and/or runtime initialization of FIG. 24. ACT register, in effect, marks these physical pages as victim PG_SLOT candidates for wiping prioritization operations or wiping queue of the Scavenger. If locking has reduced, or imminently will reduce, the number of wipeable pages below the MINSLOT minimum, an error is returned in VMC_HANDLE of TABLE 10.

In a second process example, two Functions are respectively provided for Locking and Unlocking either as an alternative to, or in support of, the first example Function SDP_VMC_UPDATE_PG_STATUS. These two Functions are designated SDP_VMC_PageLock and SDP_VMC_PageLockRelease.

In the second process example, a page locking Function SDP_VMC_PageLock has arguments VMC_HANDLE and PG_SLOT_INDEX.

Page locking Function SDP_VMC_PageLock is suitably employed to pass asynchronous messages (e.g., secure interrupt handling) to a particular NPPA or any similar purpose. The process example of FIG. 27 freezes the code execution state of a currently-active VMC[i] during a period in which Page Locking is active for another VMC. Thus, if a message is desired to be copied into another VMC[m] that is not the currently active VMC[i], it can be done. In FIG. 27, code executing the current VMC[i] is frozen until the PG-LOCKs are released and removed for the other VMC[m] that is a destination for an asynchronous message such as message data copied into a message buffer existing in the VMC[m] VAS.

The VMC_HANDLE parameter indicates by field VMC_PGLOCK the VMC[i] or VMC[m] to which the Page Lock is directed. For instance, VMC_PGLOCK is set by operation of the PA that is making itself available as a destination to receive a message. VMC_PGLOCK is set to the VMC index of the VMC of that message-destination PA itself. That message-destination PA also provides the PG_S-LOT_INDEX of its designated message destination page to a storage element or data structure used by the Interrupt Handler to vector incoming information to the virtual page at PG_SLOT_INDEX.

If the VMC for the Page Lock is not the currently active VMC[i], or if the PG_SLOT to be locked is not currently in Secure RAM, then Scavenger 4220 of FIGS. 17 and 18 is operated to identify an empty or wipeable page and update VMC. HANDLE. The PG_SLOT_INDEX parameter with VMC_HANDLE indicates the actual PG_SLOT which is requested to be locked or is identified by Scavenger. This PG_SLOT_INDEX parameter is suitably specified as a virtual address offset for the PG_SLOT from the base address of the destination VMC VAS, and the 4K LSBs inside the page can be omitted.

Unlocking a page is accomplished by a second Function SDP_VMC_PageLockRelease. Function SDP_VMC_PageLockRelease has arguments VMC_HANDLE, and PG_S-LOT_INDEX. This function releases Page Locks which have previously been issued by the function SDP_VMC_PageLock. The Lock Release is issuable for any PG-LOCKed PG_SLOT in any VMC. This function SDP_VMC_PageLockRelease releases a single VMC PG_SLOT in the VMC VAS. If multiple PG_SLOTs need release, the function in this embodiment is repetitively called even if and when the PG_SLOTs are contiguous in the VMC-VAS. More complex embodiments suitably provide multiple releases according to the teachings herein.

When SDP_VMC_SWITCH function is called in FIG. 26, PG_SLOTs that are Page Locked, other than the newly specified (targeted) VMC, are released in step 5750 or even prior to calling function SDP_VMC_SWITCH. In some embodiments, the currently-active PA is responsible prior to the switch to release its Page Locks and SDP_VMC_SWITCH function checks to make sure that any Page Lock is released. If not, SDP_VMC_SWITCH returns an error in an embodiment that arranges the VMC Switch Manager 4230 to re-utilize (remap) VMC VAS for targeted VMC activations. When a Page Lock is being held by another VMC[m], a hole or unusable page space exists in the reusable address space in which at least one PG_SLOT is still mapped for a different VMC-VAS.

In FIG. 27, one or more of the above Functions, such as SDP_VMC_UPDATE_PG_STATUS, is suitably used in another embodiment as a page-locking service for passing asynchronous messages (e.g., in secure interrupt handling) to a particular PA or for any similar purpose. This example shows interrupts coordinated with and by Strategic Resolver 4210 of FIG. 17 and suitably provides operational details of block 5690 of FIG. 25.

Operations commence with a call 5805 to secure interrupt handling. A page-locking process is used to establish Page Lock(s) either for another VMC[m] that is not the currently-active VMC[i] or for the currently-active VMC[i] itself. For example, the other VMC[m] may need to receive an asynchronous message wherein message data is copied into a message buffer established in the VMC[m] VAS.

A step 5810 freezes the code execution state of the currently-active VMC[i] during the period of active Page Lock(s) for the other VMC[m]. In other words, if a message is needed for the other VMC[m] that is not the currently active VMC[i], that copying function is permitted. Code executing the current VMC[i] is frozen and prevented in step 5810, until the PG-LOCKs are later released/removed/lifted in a step 5865.

For operations of the Function(s), an argument VMC_HANDLE has a bit-field STATUS coded 01: Page Lock, and 10: Page Unlock. Another argument PG_S-LOT_INDEX is a parameter indicating the actual PG_SLOT associated with the page PHYS_SEC_PG to be locked. The parameter PG_SLOT_INDEX is specified as noted hereinabove.

In FIG. 27, after step 5810, operations proceed to a step 5815 to commence servicing the secure interrupt. A decision step 5820 determines whether an asynchronous message is directed to the current VMC[i] by comparing the index i of the current VMC[i] with parameter VMC_PGLOCK in VMC_HANDLE of TABLE 10. If VMC_PGLOCK is the same as the index i of the current VMC[i], then operations proceed to steps 5830-5838 to receive the asynchronous message into the current VMC[i] and code execution of the current VMC[i] is unfrozen at a step 5865. If the Page Lock pertains to a PG_SLOT in another VMC[m], meaning that VMC_PGLOCK=m and is not equal to the current VMC[i] index i in step 5820, then operations branch to a step 5840.

If VMC_PGLOCK is the same as the index i of the current VMC[i], then operations proceed to a step 5830. Step 5830 checks table VMC_PA2VA of FIG. 11 (see also PA2VA 2120 of FIG. 4 and SE Page Tables 2850 of FIGS. 9A-9D) to determine whether or not table VMC_PA2VA has virtual page PG_SLOT_INDEX in the current VMC[i] assigned to a physical page PHYS_SEC_PG.

If No in step 5830, (virtual page PG_SLOT_INDEX in the current VMC[i] is not assigned to a physical page PHYS_SEC_PG in Secure RAM), then a step 5832 calls Scavenger 4220 of FIGS. 17 and 18 to identify a particular physical page PHYS_SEC_PG as the lock target. The PHYS_SEC_PG is prepared for its intended use, such as 1a) messaging by Swapping In the virtual page identified by PG_SLOT_INDEX to that PHYS_SEC_PG or 1b) simply clearing the page to provide a clear data destination page by setting to all-zeroes according to a Page Clear mode. Step 1a) suitably involves Swapping In a message destination data page, and/or Swapping In a code page from the second VMC to handle the incoming message. Then a step 5834 further prepares by 2) mapping the virtual address of PG_S-LOT_INDEX to the address of lock target PHYS_SEC_PG by writing (FIG. 19) to PA2VA and/or PG_SLOT_FLAGS of FIG. 11. In some embodiments, a further operation 3) identifies the different VMC of the locked page or assigns the locked page to the different VMC by writing to the VMC column of PA2VA 2120 of FIG. 4. After step 5834, operations go to a step 5836.

If Yes in step 5830 (virtual page PG_SLOT of the current VMC[i] is already present at the appropriate PHYS_SEC_PG), operations branch to step 5836. Yes from step 5830 bypasses the step 5832 call to Scavenger 4220 and the step 5834.

After either step 5834 or Yes in step 5830, step 5836 marks the PHYS_SEC_PG as Locked, the STATUS bit(s)

for the page are set to 01 (Locked according TABLE 9) in PA2VA and the PHYS_SEC_PG is now made Ineligible and prevented from being wiped by the Scavenger 4220 for the time being. No further PG faults occur for a Locked page because the page is being held as always-present in the VMC[i] VAS.

Then operations proceed to a step 5838 to receive the asynchronous message, if any, followed by step 5865 to lift the code freeze.

In step 5820, as noted hereinabove, if the Page Lock pertains to a PG_SLOT in another VMC[m], meaning that VMC_PGLOCK=m and is not equal to the current VMC[i] index i, then operations branch to a step 5840.

Step 5840 checks table VMC_PA2VA of FIG. 11 (see also PA2VA 2120 of FIG. 4 and SE Page Tables 2850 of FIGS. 9A-9D). If a Condition is true that table VMC_PA2VA has a virtual page in the current VMC[i] assigned to a physical page PHYS_SEC_PG, and that virtual page has the same virtual address offset bits specifying an offset for current VMC[i] as the virtual offset bits PG_SLOT_INDEX that specify the offset for page to be Locked for use with the other VMC[m], then this physical page PHYS_SEC_PG should be flushed specifically. In other words, to avoid confusion of virtual pages in different VMCs that might otherwise point to the same physical page in Secure RAM, the physical page is flushed. If the foregoing Condition is not true, then the Secure RAM should simply be scavenged to identify a physical page in Secure RAM to use for the virtual page from the other VMC[m].

Accordingly, step 5840 sets a VMC_OTHER_PGLOCK bit. Step 5840 also checks to see whether the foregoing Condition is true and if so a PG_FLUSH_START bit is set and Scavenger 4220 is called. If the foregoing Condition is not true, the PG_FLUSH_START bit is not set, and Scavenger 4220 is called. Scavenger 4220 operates as described in FIG. 18 with the further aspect that step 4320 checks whether PG_FLUSH_START is set and if a page flush is needed (Yes), then operations branch from step 4320, bypass the Page Wiping Advisor and wipe the physical page PHYS_SEC_PG that satisfied the hereinabove Condition, and then go to step 4370 and proceed to Swap Out the page in step 4380 if need be. In this way, the Secure RAM page PHYS_SEC_PG occupying the PG_SLOT has its contents flushed to the corresponding DRAM Swap page of current VMC[i] in SDRAM_PG space of area 3200A of FIG. 12.

If PG_FLUSH_START is not set, then step 4320 goes to step 4330 and the rest of the subsequent Scavenger 4220 operates as described earlier hereinabove in connection with FIG. 18 to find space for the new page.

Then a step 5845 calls the Swap In function of FIG. 20 to Swap In the PG_SLOT identified by VMC_HANDLE parameter VMC_PGLOCK identifying other VMC[m] and by Parameter PG_SLOT. INDEX identifying the actual PG_SLOT by its offset from the base address of that other VMC[m]. This PG_SLOT is locked by setting the STATUS bits for it in VMC_PA2VA to "01" (Lock the Page code from TABLE 9). Notice that the step 5845 operates on page-specific locking data established in the secure memory space and alters the page-specific locking data in-place by locking, free of rearrangement of the locking data. Step 5845 represents the execution of Swap In step 4390 of FIG. 18 with Return from that step 4390 to FIG. 27 step 5850 in response to the active state of the VMC_OTHER_PGLOCK bit rather than doing a Return to some other part of Strategic Resolver 4210 of FIG. 17 and FIG. 25. VMC_OTHER_PGLOCK bit is reset.

A step 5850 receives the asynchronous message, which is the subject of the secure interrupt, as applicable. When reception of the asynchronous message is completed, a step 5855 uses the Swap Out function of FIG. 21 to Swap Out the PG_SLOT to the other VMC[m] identified by VMC_HANDLE and Parameter PG_SLOT_INDEX. This PG_SLOT is unlocked using the SDP_VMC_UPDATE_PG_STATUS function.

Next, if the Condition of step 5840 is true, a step 5860 calls the Swap In function of FIG. 20 to reconstitute the conditions just prior to step 5840. The hereinabove-described Function SDP_VMC_PageLockRelease is suitably used for the purpose. If the Condition is not true, then the Locked PG_SLOT is Unlocked and wiped.

In an example of further detail, step 5855 resets a VMC_OTHER_PGLOCK bit, sets a VMC_OTHER_PGRELEASE bit, and updates VMC_PGLOCK to identify the current VMC[i] (not the other VMC[m] at this point). PG_FLUSH_START remains set or is affirmatively set. Scavenger 4220 is called. Scavenger 4220 step 4320 recognizes that PG_FLUSH_START is set and branches from step 4320, bypasses the Page Wiping Advisor and executes step 4365 instead and wipes the physical page PHYS_SEC_PG that satisfied the hereinabove Condition, and then goes to step 4370 and proceeds to Swap Out the page in step 4380 if need be. In this way, the Secure RAM page PHYS_SEC_PG occupying the PG_SLOT has its contents flushed to the corresponding DRAM Swap page of other VMC[m] in SDRAM_PG space of area 3200A of FIG. 12.

Then step 5860, in an example of further detail, calls the Swap In function of FIG. 20 to Swap In the PG_SLOT identified by VMC_HANDLE parameter VMC_PGLOCK identifying current VMC[i] and by Parameter PG_SLOT_INDEX identifying the actual PG_SLOT by its offset from the base address of VMC[i]. The Swapped In page goes to the same PHYS_SEC_RAM page identified by the current VMC[i] and the same PG_SLOT_INDEX. This PG_SLOT is unlocked by setting the STATUS bits for it in VMC_PA2VA to "10" (Unlock the Page code from TABLE 9). Step 5860 represents the execution of Swap In step 4390 of FIG. 18 with Return from that step 4390 to FIG. 27 step 5860 in response to the active state of the VMC_OTHER_PGRELEASE bit rather than doing a Return to some other part of Strategic Resolver 4210 of FIG. 17 and FIG. 25. VMC_OTHER_PGRELEASE bit is reset.

A succeeding step 5865 then lifts the code freeze of step 5810. Operations from step 5838 also go to step 5865 to lift the code freeze. A RETURN 5895 is reached after step 5865 so that code from the current VMC resumes executing.

For conciseness of illustration, FIG. 27 depicts some operations together that in some embodiments, or some phases of operation of a same embodiment, can occur at different times. For example, the message-destination PA sets up the message-destination page at PG_SLOT_INDEX mapped to PHYS_SEC_PG according to a procedure as shown by part of FIG. 27 and prior to interrupt by a message source.

In a first category of embodiments such as for multi-threading, VMC[i] is the currently-operating VMC and Secure RAM is administered so that one VMC[i] uses most of the physical pages of Secure RAM and a page Locked for use by any other VMC[m] is the exception under the SDP embodiment. In this situation FIG. 27 depicts real-time response to the interrupt by setting up the message-passing page for VMC[m] temporarily, receiving the asynchronous message, and closing the message-passing page and reconstituting the original page in VMC[i]. This avoids confusion of different pages having the same virtual address offset bits pertaining to different VMCs. An alternative embodiment defers the reconstitute process of step 5860 until the current VMC[i] attempts to access the Locked page. Steps 5830-5838 of FIG. 27 also show how to establish a message-passing page in the current VMC[i] while VMC[i] is running.

In a second category of embodiments such as for single-threading, the message-destination page is set up by a PA of a currently-operating VMC[m], and then later the context is switched to VMC[i]. Suppose that thereafter the message-passing interrupt occurs, so that now the currently-operative VMC is VMC[i] but the locked page still correctly pertains to VMC[m]. The locked page is established and ready for use immediately upon interrupt. The locked page has its ACT register bit set to zero to put it outside the Scavenger 4220 process. Using a PA in VMC[m] may be inapplicable to set up the destination page for itself in the context VMC[i] precisely because VMC[i] is running. Accordingly, that earlier setup procedure by the message-destination PA suitably involves steps 5830-5836 when the message-destination PA is the operative VMC[m]. The Lock status on a PHYS_SEC_PG used for VMC[m] persists through the context switch to VMC[i]. When an interrupt by the message source occurs at some later time, then the response is shown in steps 5805, 5810, 5815, and 5850. Pages having the same virtual address offset bits but respectively pertaining to different VMCs are made independently accessible by using PA2VA, ACT, STATUS, and the VMC identifiers taught herein, thereby preventing confusion between such pages. The Lock status on the message page persists and remains until some later time when it is released by reset or execution of the SDD_VMC_PageLockRelease function relative to that page. If the VMC_PGLOCK message-destination VMC is not equal to index i of the current VMC[i], then step 5860 is suitably bypassed.

As described hereinabove for FIG. 27, SDP 4200 is coordinated with interrupt handling, exception handling, and pre-emptive scheduling. A form of multi-threading is supported by the context switching processes of FIG. 26, and page locking processes of FIG. 27. Other forms of multi-threading are also supported in other embodiments, such as by providing plural data structures of FIG. 11 in separate areas of Secure RAM to support plural VMCs concurrently and execute them on a multi-threaded, multi-pipelined and/or multi-core processor.

In FIG. 28, an SDP system has DRAM 6110, Load Manager (or Strategic Resolver) 6120, Decryption, Hashing and Checking 6130, Secure RAM physical page pool 6140, and Secure Virtual Memory SVM/PA2VA with Page Table columns 6150 and 6170. DRAM 6110 has PA Certificate and Code 6112, PA Data 6114, and Swap File for SDP 6116 including many 4K pages. The DRAM 6110 holds a PA image with a large sub-application, for example. The PA Certificate and PA Code 6112 are fully loaded. PA Data 6114 is stored in DRAM at this time. DRAM Swap File 6116 is ready for secure demand paging operations.

In FIG. 28, the PA Certificate and Code 6112 are copied physically to a Physical Page Pool in Secure RAM 6140 and virtually to Secure Virtual Memory SVM by operation of the Load Manager 6120. Similarly, the PA Data 6114 are copied physically to Secure RAM 6140 and virtually to SVM. The Load Manager 6120 is copying data, with Page Fault on write. Load Manager copies the PA Data 6114 to different pages in SVM than the pages occupied by the PA Certificate and Code 6112.

If the code is not self-modifying, as illustrated, the arrow from block 6112 is one way (Swap In) from DRAM 6110 to Secure RAM 6140. If the code is self-modifying then the arrows are bi-directional or two-way. In either case, Swap File 6116 is generally coupled to Secure RAM 6140 bi-directionally (Swap In, Swap Out) by a bi-directional arrow 6118.

SDP mediates this process transparently to Secure Kernel. SDP detects when Secure RAM 6140 is out of free pages, triggers scavenging of Secure RAM 6140, and then copies Code and Certificate Page Headers, and Pages themselves, physically to Secure RAM 6140 and virtually to SVM 6150, 6170.

Physically, the PA Certificate and Code 6112 are copied to Secure RAM, and virtually organized in SVM (Secure Virtual Memory) according to the mapping defined by the S.E. Page Tables of FIGS. 9A-9E (also called a physical address to virtual address table PA2VA). Notice that PA2VA cells are or may be partially filled with entries when the Secure RAM is being filled. The Secure RAM is smaller in page size than the DRAM.

In FIG. 28, another embodiment keeps a record of more states associated with SVM (secure virtual memory using Secure RAM and associated information of FIG. 11. The record in block 6150 includes information such as 1) Page Swapped In, 2) Page Empty, 3) Page Swapped Out, 4) Page Swapped In after Page Swapped Out. The information 1), 2), 3), 4) represents Page status information and signifies completion of key steps in and for use by the operations of Scavenger 4220, Swapper Manager 4240 and SDP External Storage Manager 4250 of FIGS. 17, 18 and 19. Block 6150 is maintained as information in PA2VA or VA2PA or both.

Statistics of number of swaps associated with a page are also kept in a register space (e.g., registers designated STAT2 [N]) in some embodiments to dynamically detect page thrashing (high number of swaps) and lower the priority of the page for Swap Out purposes. In one embodiment software responds to number of swaps on a page exceeding a threshold to left-shift the singleton one in a multi-bit priority code specific to the thrashing page itself in Priority Sorting Page 3160 of FIG. 13 of incorporated U.S. patent application TI-39617, Ser. No. 11/426598. In another embodiment software responds to a number of swaps exceeding a threshold for a given page, to reallocate an additional page of space in Secure RAM to the page Type (Code or Data) of the page that is experiencing the excessive number of swaps.

In FIG. 28, SVM column 6170 (compare to PG_SLOT_FLAGS of FIG. 11) includes rows corresponding to virtual addresses A-K with Secure RAM addresses (e.g. 4 bits for physical pages 0-15) entered in some of the rows depending on which virtual addresses have physical pages in Secure RAM corresponding to them.

As noted hereinabove, SVM column 6150 for each virtual address has a row entry comprised of plural bits representing 1) Page Swapped In, 2) Page Empty, 3) Page Swapped Out, 4) Page Swapped In after Page Swapped Out.

For instance, any of virtual addresses H-K can have entries like 6152 representing Page Empty. In case of Page Empty, no Secure RAM physical page assignment (represented by a diagrammatic arrow) connects Page Empty 6152 in SVM column 6150 to any virtual address in SVM column 6170.

In FIG. 28, Read faults are suitably processed in SDP, with or without a Write fault capability. Read fault capability involves paging in pages of information from memory. For example, a page to overwrite in the Secure RAM is selected, and then the Read Fault is processed to page in a page from DRAM and overwriting the selected physical page in Secure RAM with the page from DRAM. For example, when the CODE_DATA field of TABLE 4 is set for Code paging only in SDP_CFG 3130 of FIG. 11, then Read Faults are processed without a Write fault capability. When that CODE_DATA field is set for Data paging or both Code and Data paging, then the Write fault capability is included.

Write fault involves Swapping out pages of information to memory. In embodiments with Write fault operation, the Write fault capability is suitably configured to be enabled/disabled, such as according to CODE_DATA field of TABLE 4 or a more complicated field that includes at least one additional bit to selectively provide a Write fault paging mode in Scavenger 4220 of FIG. 18. In the selective Write fault paging mode, if the Write fault is the first fault for that page, the processor is programmed (if the additional bit is active) to set the physical page in Secure RAM to all zeros inside the secure environment first, before allowing the application to write to that page on the instruction restart. The selective Write fault paging mode is suitably default-established by the FIG. 11 SDP_CFG 3130 CODE_DATA field augmented with the additional mode bit, and then the same augmented field is made VMC-specific as a field in VMC_CFG_ITEM spare area of SDP_VMC_CFG 3150.

Another example of Write fault operation selects a particular physical page in the Secure RAM. The Write Fault is processed to page out the information on the selected physical page from Secure RAM to DRAM. Then a page is loaded or swapped in from DRAM (the page of information to which the write is intended or directed) into the selected physical page in Secure RAM. Then the write instruction is executed by writing to the newly-swapped in page of information residing at the selected physical page in the Secure RAM. A form of this Write fault operation is provided in FIG. 27 steps 5840-5845 and steps 5855-5860.

For the system of FIG. 28, the SDP abort handler (or front end fault handler) 4260 of FIG. 17 is, for example, structured and operated to detect at least two cases. The SDP abort handler 4260 in the first case detects a read operation producing a Read fault and then Strategic Resolver 4210 and Scavenger 4220 execute Read fault handling. In the second case, the SDP abort handler detects a write operation, determines a fault was from the write and not a read, and then Strategic Resolver 4210 and Scavenger 4220 execute Write fault handling.

Further in FIG. 28, virtual addresses D-G all have entries like 6154 representing Page Swapped In. These entries have been made in column 6150 in response to respective occurrences 6174 of Data page fault on write. For instance, a diagrammatic one-way arrow connects Page Swapped In 6154 in SVM column 6150 to virtual address F in SVM column 6170.

Virtual addresses B and C each have entries like 6156 representing Page Swapped Out. These entries have been made in column 6150 in response to respective occurrences 6176 of Code page fault on write. For instance, a diagrammatic one-way arrow connects Page Swapped Out 6156 in SVM column 6150 to virtual address C in SVM column 6170.

Virtual address A has an entry Page Swapped In After Page Swapped Out. For purposes of example, this entry has resulted after a Page Swapped Out followed by a Page Swapped In to the same virtual address A in SVM. This entry has been made in column 6150 in response to an occurrence 6178 of page fault on read.

For instance, a diagrammatic two-way arrow connects Page Swapped In 6158 in SVM column 6150 to virtual address A in SVM column 6170. The PA is reading data, with Page Fault on Read. Suppose Secure RAM page pool 6140 is full. A Read triggers a page fault. Scavenging frees or wipes and Swaps Out a page of Secure RAM. Operations under control of the SDP Manager now check PA Header and Hashes by calculating and comparing the hash relative to pages in Secure Virtual Memory. Hashing is described in connection with BK and BBK of FIGS. 11-13 and step 4860 of FIG. 20, step 4940 of FIG. 21, and step 5470 of FIG. 24 for instance. In this way, the PA Code and PA Data are authenticated and decrypted (at least in case of PA Data) and made available for actual execution out of the Secure RAM.

Figure 29:
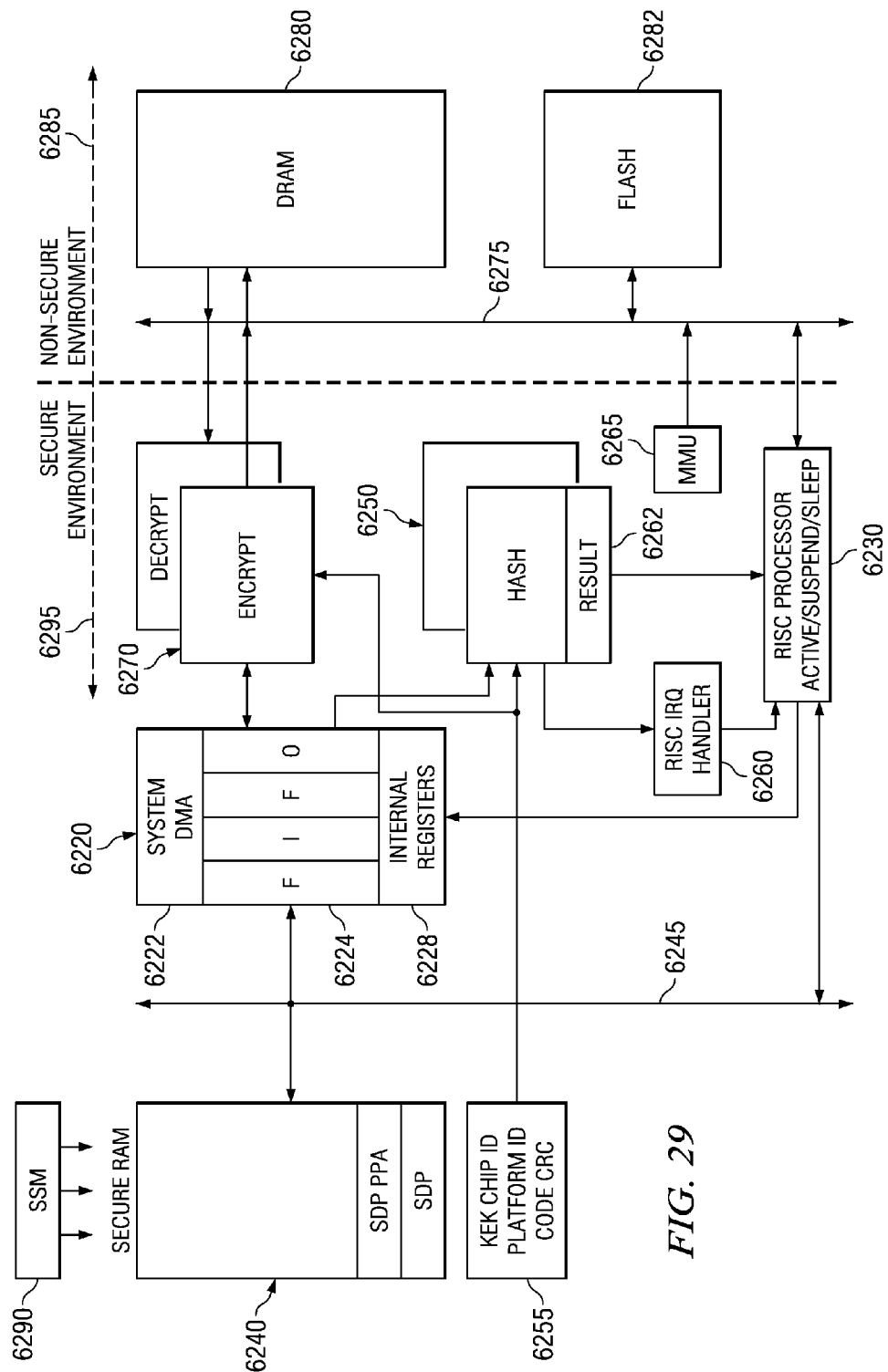
FIG. 29 is a block diagram of inventive structure and process for DMA (Direct Memory Access) for concurrent control of cryptographic and hashing operations.

Turning to FIG. 29, a paging mechanism is provided that simultaneously utilizes DMA, hashing, and encryption, all in one RISC processor programming operation. In other words, the encryption accelerator and hashing accelerator are slaved together, and the DMA drives a page one time from DRAM or Secure RAM through both hash and encrypt at the same time, or hash and decrypt depending on direction in/out Secure RAM. For instance, logical DMA channels are utilized in concurrent operation of the hash and crypt operations that comprise a page swap operation. A logical channel is suitably utilized for the hash operation, and two channels are suitably utilized for the supply and retrieval transfers involved with the cryptographic operation. The high performance secure demand paging capability thereby does not involve the RISC processor expending extra cycles on control and other operations.

In FIG. 29, an embodiment performs encryption and HMAC hashing in SDP with symmetric keys. A system DMA 6220 includes a DMA Control circuit 6222, FIFO 6224 and Internal DMA Registers 6228. A RISC Processor 6230 is coupled to System DMA 6220 and Secure RAM 6240 via a bus 6245. The RISC Processor 6230 also supplies configuration data and other data pertinent to the System DMA 6220 to DMA Internal Registers 6228.

A Hash unit 6250 is also coupled to and fed by the DMA FIFO 6224. A RISC Interrupt Request (IRQ) Handler block 6260 responds to operations of Hash unit 6250 so that Hash results from one or more Result register(s) 6262 are fed by Hash unit 6250 to RISC Processor 6230. Hash unit 6250 and a cryptographic unit 6270 provide acceleration for hash and cryptographic functions respectively.

In FIG. 29, cryptographic unit 6270 is also coupled to the DMA FIFO 6224 either in parallel with the Hash unit 6250 or suitably coupled elsewhere into the DMA FIFO 6224 to accomplish operations coordinated with the operations of Hash unit 6250. The cryptographic unit 6270 includes Encrypt and Decrypt functions either separately as shown or controllably integrated together. Cryptographic unit 6270 is coupled via a bus 6275 to a DRAM 6280.

The RISC Processor 6230 and a MMU (Memory Management Unit) 6265 are also coupled to the bus 6275. DRAM 6280, Flash memory 6282 and bus 6275 are in a Non-Secure environment 6285. Parts of FIG. 29 left of bus 6275 are protected by an SSM (Secure State Machine hardware) 6290 that monitors and protects busses and circuit operations to establish a Secure Environment 6295. In effect, some secure demand paging embodiments herein build hardware wrappers for an encryption structure and process to deliver high performance secure demand paging.

In FIG. 29, keys 6255 are stored, including Key Encryption Key, Chip Identification (Chip ID), Platform ID, and Code CRC (Code Cyclic Redundancy Checksum). Any one, or more, or all of the keys are coupled in encrypted or unencrypted form to the Hash unit 6250 and to the cryptographic unit 6270.

Page creation (FIG. 24), descriptor blocks (FIG. 14), and tuple maintenance (FIGS. 11-12) all contribute to higher security. Some embodiments perform encryption and HMAC hashing in SDP with symmetric keys and other embodiments use assymetric keys. Another embodiment alternative uses HMAC in place of the separate AES encryption and SHA Hash.

A process embodiment example performs encryption and HMAC hashing in SDP. In FIG. 29, a Hash accelerator 6250 runs in parallel with encryption accelerator 6270 in this HMAC process. On the front end of HMAC a key (e.g., a Key Encryption Key or KEK) to the hash process is fed in from block 6255 to make the hashing generate a Chip-Unique hash result. This prevents a hacker from being able to compute a hash and spoof the processor to take in a data block. The unique chip ID is used in any suitable way. For instance, the unique chip ID in a first alternative is combined (hashed in) with platform identification code, software code CRC (cyclic redundancy checksum), other specialized data, or any one, some or all of the foregoing. For example, the embodiment first runs a cycle on the hash engine 6250 (e.g., SHA1) with an HMAC key. Then the process starts both the hash engine 6250 and the cryptographic engine 6270 in parallel on the data and runs to completion.

In an example lacking HMAC, a process has steps of 1) Encrypt code. 2) Encrypt hash. 3) Again encrypt the hash. This process uses DMA efficiently and provides high performance by running the hash accelerator 6250 in parallel with an encryption accelerator 6270 in this no-HMAC approach. One initial hash iteration cycle is executed on the RISC processor 6230. Then dual crypt and hash are respectively executed in parallel on the encryption accelerator 6270 and hash accelerator 6250 immediately upon completion of that initial hash iteration cycle.

In some embodiments, a three-way DMA capability is provided by System DMA 6220 to obtain the performance benefit of overlapping and/or simultaneous operation of SHA1 Hashing by unit 6250 and AES encryption by unit 6270. In other embodiments, less DMA capability is provided and/or in which data is serialized on busses, the hashing and encryption operations are serialized instead.

In FIG. 29, the DMA 6220 itself drives hash accelerator 6250 and encryption accelerator 6270 in parallel. An extra cycle operation on the front of the process with the SHA1 hash and hashing key occurs before starting the data in parallel to complete the full operation. On the tail end of the process, an additional operation encrypts the hash and adds it to a tail end of the block going out to DRAM.

On the reverse process involving decryption, the decrypt operation of accelerator 6270 is run through the whole encrypted block that has earlier been stored out to DRAM. The Hash accelerator 6250 is fed with the incoming decryption result and programmed to run down to the end of the block but not including the tail end hash earlier stored at the tail end of the encrypted block if that was not hashed into itself. DMA is thus used efficiently by doing a hash and encrypted hash.

In FIG. 29, DMA logical channels (e.g., 32 in number) perform scatter/gather operations. The number is appropriately established for the computer processing such as bulk encryption with HWA (hardware accelerators). The DMA 6220 achieves an efficient parameter shuttling service. The circuit of FIG. 29 allows an unlimited number of uniquely addressed DMA operations to occur, theoretically increasing the maximum size bulk operation to an amount limited only by size of memory even in embodiments that have a multimedia framework (MMF) that allocates channels.

As illustrated in FIG. 5, FIG. 6, FIG. 7, and FIG. 8, for instance, some embodiments chain cryptographic and hash operations and/or blocks. SDP 4200 encrypts the pages and for integrity, provide a chained HMAC or a chained hash operation on the encrypted data to make a very efficient verification process.

In FIG. 29, parallel hardware accelerator operation of encryption and hash combined with a single fetch of the source data provides for not only a very fast but also a very efficient page swap subsystem that achieve a high bandwidth swap capability. Faster swap capability confers a proportionally large amount of virtual secure memory that can be provided to secure applications. Because C-language applications, for instance, may scatter data in a manner that does necessarily go to a neatly-defined page size, some embodiments encrypt all pages swapped out to DRAM for safety margin.

An example of a scatter/gather embodiment has DMA Control Block Fetch with the DMA functionality allowing for a maximum number of logical channels and having Logical Channel Registers (LCRs). Each of these channels permits a link to another channel, which provides a scatter/gather capability that is feasible even if it may limit the total number of uniquely addressed operations to the maximum number of logical channels. An extended scatter/gather embodiment provides for an extension to the logical channel which fetches address descriptor blocks from any secure memory. In this way, broadly addressed scatter/gather operations are unlimited even in embodiment systems that share the DMA resource system-wide.

For virtual scatter/gather capability, each virtual to physical lookup is suitably performed before the start of a DMA operation while calling process is still in context so that virtual to physical lookups are simplified. These lookups result in a physical page list (called an address descriptor or physical descriptor) being created that is suitably utilized later by a DMA secure interrupt handler at each page completion to start the next physical page transfer. This speeds SDP runtime initialization of FIG. 24 and VMC activation of FIG. 26 and FIG. 24.

The DMA programs itself from control blocks pre-formatted into DRAM when the DMA allows linking of logical channels. Even where full scatter/gather is not part of the DMA design, this programming usage method regains RISC processor CPU cycles otherwise spent babysitting smaller DMA operations. In this way, the DMA is utilized in a more intelligent I/O controller fashion. A radio receive process suitably has a circular ring of buffers that are consistently and continually filled by DMA without RISC processor intervention on each packet. That leaves the RISC processor free to simply process the data contained in those packets, or shut a DMA-based receive operation off when the buffers approach the full or all-buffers-used mark.

In an extended scatter/gather example herein, address descriptor blocks (ADBs) are used. These are related to the address descriptor physical page list of the previous paragraph herein. The ADBs are linked in memory by a 32 bit link field in each ADB to next ADB, allowing for an unlimited number of uniquely addressed DMA transfers to memory. The ADB also contains a control bit field with a first control bit indicating last ADB block (stop bit ST), and a second control bit (EI) indicating whether this ADB should Enable any Interrupt described in the logical channel registers (LCRs) upon completion or not.

The ADB fetch enhancement is suitably applied to secure memory type targets, and to processor interrupt generation by synchronized device type targets. Where two logical channels are used for a DMA transfer, one logical channel using the ADB extension works with another logical channel which is not using ADB fetch by using that logical channel to repeat operations for each ADB fetched by its mating logical channel. This process accommodates transfers from ADB described memory locations, such as in Secure RAM of FIG. 29, to a synchronized device such as a cryptographic accelerator.

FIG. 29 illustrates transfer from a single secure memory 6240 on bus to two separate synchronous targets, and uses parallel encryption and hash. This embodiment simultaneously transfers the same secure memory data to two synchronous targets. For cryptographic and security purposes, the same data block is transferred to the hashing accelerator 6250 and the encryption accelerator 6270, in parallel operation, to obtain both ciphering and hash of the data. More specifically, each byte of data entering the DMA FIFO is transferred both to the encryption accelerator 6270 and the hashing accelerator 6250. The hashing accelerator 6250 delivers a hash result 6262 which is read directly by the RISC processor in FIG. 29. This direct read from Hash accelerator 6250 to RISC processor 6230 efficiently uses the system by because such embodiment does not need to occupy the DMA unit 6220 with transfer of the relatively-small amount of resulting hash data that is output at the end of a Hash operation.

Decipher operation with a decryption accelerator and a hashing accelerator feeds the output/result of a decryption block of unit 6270 to the input of hashing accelerator 6250 and to Secure RAM 6240 concurrently on the result side of the operation. In this example, deciphering as compared to enciphering reverses the source/target roles of the Secure RAM and the crypt accelerator 6270, but the target role of the hash accelerator 6250 remains the same. For DMA transactions involving encryption and hashing desired for security, each DMA transfer has a first predetermined maximum number of (e.g. one) data supplier (source) and a second predetermined maximum (e.g. two) of data consumers (targets). Any combination of synchronized or non-synchronized consumers (targets) is utilized as desired for this enhanced DMA operational mode. Sufficient bus bandwidth is provided to transfer information over a bus if one bus is shared by plural accelerators that are being operated simultaneously from one or more memories 6280, 6282 or storage devices such as disk drive or remote storage.

Some process and device embodiments parallelize the accelerator operations with scavenging. In this way, the secure demand paging operates the processor for page scavenging of the secure memory substantially in parallel time-wise with at least some operation on another page by the cryptographic accelerator. The page scavenging is selectively performed, such as by using the no-swap-in NSI and next-page-to-swap-out NPSO features, to achieve very efficient processing and parallelization. The DMA circuit subsequently activates the cryptographic accelerator(s) to perform a cryptographic operation on another page for swap out, while the processor is scavenging for yet another page for swap out during the accelerator operation.

The foregoing operation is also useful for running the run-time initialization loop of FIG. 24 in parallel with the acceleration hardware. Further, for power saving embodiments, the processor is suitably provided with a sleep mode and is operated to swap out all modified pages from the Secure RAM and transition to the sleep mode. The processing, such as through DMA and accelerators or by the CPU directly, generates page hashes over unmodified pages and modified pages, and generates a BBK hash of the page hashes. Prior to the transition to the sleep mode, the BBK hash of hashes is updated.

Another method platform-efficiently gives the processor back to the non-secure operating system (OS) during cryptographic hardware operational periods. A SE (secure environment) OS adaptation driver is associated with the non-secure OS itself. A non-secure interrupt handler posts a semaphore for a DMA interrupt completion event on the cryptographic operation started by SDP. The method further utilizes a Call from SE (secure environment) code to the non-secure OS at which point the SE OS adaptation driver intercepts the Call and blocks on the semaphore. The external non-secure function is released from its previous wait on the semaphore posted by the DMA completion interrupt. When that release occurs, the SE adaptation driver function simply performs a return. The above Call mechanism of secure ROM re-enters and the SDP code continues directly after the point where that Call mechanism was invoked.

The above method keeps the entire platform responsive and the CPU at high efficiency during the cryptographic operations of the SDP. This method can be performed due to the fact that the secure DMA and interconnect allows these accelerated cryptographic operations to be set up inside the SE, but continue to operate even when the SE is exited via the Call mechanism as described above. The SDP code simply includes the Call, and the OS is not neglected during cryptographically accelerated operation.

Another embodiment of a secure demand paging system is illustrated in FIG. 29 wherein an external non-volatile flash memory 6282 has encrypted and integrity-protected code and data pages for Swap-in. The external volatile DRAM memory 6280 is specially used for bi-directionally swapped pages subject to modification by processing. The system uses the memories 6280 and 6282 ambidextrously. A processor combination 6230, 6250, 6270 (RISC 6230 and accelerators 6250, 6270 viewed together as one entity) is coupled to Secure RAM 6230 and external flash memory 6282 and operates to decrypt and verify the integrity of the code pages thereby to transfer code pages to the Secure RAM 6240 directly from the flash memory 6282 and bypass the DRAM 6280 in respect of the code pages. The processor combination 6230, 6250, 6270 Swaps out and Swaps in the swap pages between Secure RAM 6240 and DRAM 6280 and bypasses the flash memory 6282 in respect of the swap pages for DRAM 6280.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), and 11) multiple-core using any one or more of the foregoing.

Design, Verification and Fabrication

Figure 30:
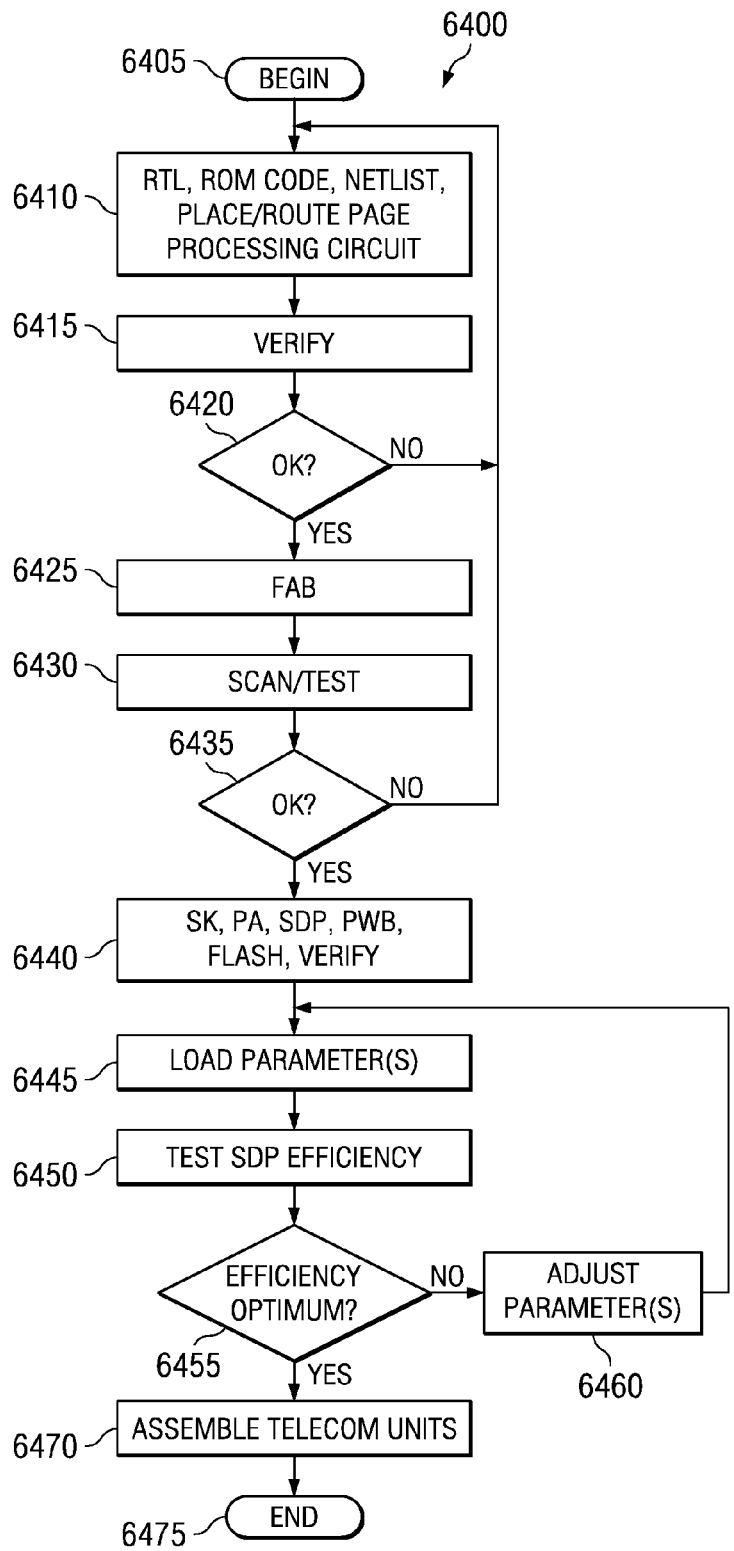
FIG. 30 is a flow diagram of a manufacturing process for making telecommunications unit having SDP.

Various embodiments of an integrated circuit and processes improved as described herein are manufactured according to a suitable process of manufacturing 6400 as illustrated in the flow of FIG. 30. The process begins at step 6405 and a step 6410 prepares RTL (register transfer language) and netlist for a particular design of an integrated circuit including, for instance, a processor, a cryptographic accelerator, a hash accelerator, and a secure memory coupled to the processor and coupled to transfer the same secure memory data to the cryptographic accelerator and the hash accelerator in parallel, the hashing accelerator having a hash result output coupled directly from the hashing accelerator to the processor. The Figures of drawing show some examples, and the detailed description describes those examples and various other alternatives.

In a step 6415, the design of the page processing circuit is verified in simulation electronically on the RTL and netlist. In this way, the contents and timing of the memory, of the processor and of the accelerators are verified. The operations are verified pertaining to the desired parallelism of operations of processor 6230, secure RAM 6240, DMA 6220, and accelerators 6250 and 6270 and memories 6280 and 6282 of FIG. 30. Then a verification evaluation step 6420 determines whether the verification results are currently satisfactory. If not, operations loop back to step 6410.

If verification evaluation 6420 is satisfactory, the verified design is fabricated in a wafer fab and packaged to produce a resulting secure demand paging integrated circuit at step 6425 manufactured according to the verified design. Then a step 6430 verifies the operations directly on first-silicon and production samples by using scan chain methodology on the page processing circuit to confirm that actual operation is in accordance with the expected operation of the verified design. An evaluation decision step 6435 determines whether the chips are satisfactory, and if not satisfactory, the operations loop back as early in the process such as step 6410 as needed to get satisfactory integrated circuits.

Given satisfactory integrated circuits in step 6435, a telecommunications unit based on teachings herein is manufactured. This part of the process first prepares in a step 6440 a particular design and printed wiring board (PWB) of a telecommunication product having a telecommunications modem having a transmitter and receiver as in FIG. 2, microprocessor 6230 coupled to the telecommunications modem to at least one of said transmitter and receiver of the modem. The microprocessor 6230 is operable for instance for centrally controlling scavenging, and virtual machine context switching and page swapping first and second pages in response to a page fault. The swapping swaps out the first page from the Secure RAM 6240 to the external memory DRAM 6280 with DMA 6220 operations and integrity information and encryption provided by accelerators 6250 and 6270 respectively. The swapping then swaps in the second page from DRAM 6280 with decryption and integrity check, in place of the first page, using accelerators 6250 and 6270 and DMA 6220. SDP certificate parameters are loaded in a step 6445 to Flash 6282 and configure the secure demand paging. A user interface such as a keypad, microphone and speaker of FIG. 2, is coupled to the microprocessor 6230.

The particular design of the page processing circuit is tested in a step 6450 by electronic simulation and prototyped and tested in actual application.

The SDP certificate parameter(s), and other parameters as are suitably embedded in the system according to the teachings herein, are adjusted for increased SDP and system operational efficiency in step 6455, as reflected in faster initialization of SDP and particular VMCs, faster application execution, decreased Swap Rate in executing the same application code, lower power dissipation and other pertinent metrics. If further increased efficiency is called for in step 6455, then adjustment of the parameter(s) is performed in a step 6460, and operations loop back to reload the parameter(s) at step 6445 and do further testing. When the testing is satisfactory at step 6455, operations proceed to step 6470.

In a manufacturing step 6470, the signed SDP certificate and any embedded configuration parameters for the SDP system are loaded into the Flash non-volatile memory 6282. The processor 6230 is provided and responds to the non-volatile memory 6282 to configure and execute an SDP protected application after assembly. The components are assembled on a printed wiring board or otherwise manufactured as the form factor of the design is arranged to produce resulting secure demand paging (SDP) system units such as in telecommunications products according to the tested and adjusted and verified design. For example, manufacturing a telecommunications end product combines the above-mentioned wireline or wireless modem with the non-volatile memory 6282 and the processor 6230. Operations are completed at END 6475.

Aspects (See Explanatory Notes at End of this Section)

1A. The secure demand paging system claimed in claim 1 wherein said swapper manager is further operable to swap out the first page from said internal memory to said external memory with integrity information and encryption prior to the swap in.

1B. The secure demand paging system claimed in claim 1 wherein said abort handler includes an instruction prefetch abort handler and a data abort handler.

1C. The secure demand paging system claimed in claim 1 further comprising a direct memory access (DMA) circuit coupling said processor and said external memory.

1D. The secure demand paging system claimed in claim 1 further comprising a hardware accelerator responsive to said swapper manager and operable to encrypt a page from internal memory for storage in said external memory.

1E. The secure demand paging system claimed in claim 1 further comprising an encryption circuit responsive to said swapper manager and a source of keys coupled to said encryption block for encryption key rotation.

1F. The secure demand paging system claimed in claim 1 further comprising a hardware accelerator responsive to said page swapper and operable to hash the first page for the integrity information and storage in said external memory of a hash value resulting from the hash.

1G. The secure demand paging system claimed in claim 1 further comprising a time stamper responsive to said page swapper and operable to time-stamp the first page for storage in said external memory.

1H. The secure demand paging system claimed in claim 1 wherein said abort handler is operable to determine whether an additional page fault is imminent before the instruction completes operation, and if so then said central controller responsive to have an additional page swapped in to prevent the additional page fault. (This eliminates the additional overhead of the future page fault.)

1J. The secure demand paging system claimed in claim 1 further comprising a fault queue for holding fault descriptors when at least one additional page fault is preventable before the instruction completes operation.

1K. The secure demand paging system claimed in claim 1 wherein said abort handler is operable to ascertain whether an additional page fault is imminent and preventable before the instruction completes operation, and if so then said swapper manager responsive to swap in an additional page to both prevent the additional page fault and concurrently prevent page replacement of said second page by the additional page.

1L. The secure demand paging system claimed in claim 1 further comprising an instruction re-queuer responsive to said central controller and operative after the swap in to re-queue for execution the instruction associated with the page fault.

1M. The secure demand paging system claimed in claim 1L further comprising a secure kernel operable to generate a call to said central controller, wherein said instruction re-queuer is coupled for a return to the secure kernel.

1N. The secure demand paging system claimed in claim 1 for use with a caller wherein the caller operable to call a protected application, and the secure demand paging system operates transparently to the caller.

1P. A secure demand paging method for use with a processor for executing instructions, an internal memory for a first page in a first virtual machine context, an external memory for a second page in a second virtual machine context, and a protective circuit coupled to said processor and to said internal memory for maintaining the first page secure in said internal memory, the method comprising:
  centrally controlling operations of scavenging,
  virtual machine context switching and page swapping in response to a page fault,
  the scavenging identifying the first page as a page to free,
  the virtual machine context switching changing from the first virtual machine context to the second virtual machine context, and
  the swapping includes swapping in the second page from said external memory with decryption and integrity check, in place of the first page.

1PA. The secure demand paging method claimed in claim 1P wherein the swapping further includes swapping out the first page from said internal memory to said external memory with integrity information and encryption prior to the swapping in.

1PB. The secure demand paging method claimed in claim 1P further comprising separately handling an instruction prefetch abort and a data abort to respectively initiate the centrally controlling.

1PC. The secure demand paging method claimed in claim 1P further comprising hardware-accelerated encrypting of the first page and rotating encryption keys for the hardware-accelerated encryption.

1PD. The secure demand paging method claimed in claim 1P further comprising hardware-accelerated hashing of the first page for the integrity information and storing in said external memory with the encrypted first page a hash value resulting from the hashing.

1PE. The secure demand paging method claimed in claim 1P further comprising time-stamping the first page for storing in said external memory.

1PF. The secure demand paging method claimed in claim 1P further comprising determining whether an additional page fault is likely before the instruction completes operation, and if so then said swapping in an additional page to prevent the additional page fault.

1PG. The secure demand paging method claimed in claim 1PF further comprising concurrently preventing page replacement of said second page by the additional page.

1R. A wireless communications unit comprising
  a wireless antenna;
  a wireless transmitter and receiver coupled to said wireless antenna;
  a microprocessor coupled to at least one of said transmitter and receiver, said microprocessor operable for centrally controlling scavenging, virtual machine context switching and page swapping in response to a page fault, the scavenging identifying the first page as a page to free, the virtual machine context switching changing from the first virtual machine context to the second virtual machine context, and the swapping first swapping out the first page from said internal memory to said external memory with integrity information and encryption and then swapping in the second page from said external memory with decryption and integrity check, in place of the first page; and
  a user interface coupled to said microprocessor.

1RA. The wireless communications unit claimed in claim 1R further comprising an encrypted application securely demand paged by said microprocessor.

1RB. The wireless communications unit claimed in claim 1R further comprising an encryption accelerator, a hash accelerator, and a direct memory access (DMA) circuit coupled to transfer the first page to said encryption accelerator and said hash accelerator in parallel.

1RC. The wireless communications unit claimed in claim 1R further comprising a hash accelerator for a page, and said hashing accelerator delivers a hash result which is read directly from said hashing accelerator by said microprocessor.

1RD. The wireless communications unit claimed in claim 1R wherein said user interface has at least one arrangement selected from the group consisting of 1) mobile phone handset, 2) personal digital assistant (PDA), 3) wireless local area network (WLAN) gateway, 4) personal computer (PC), 5) WLAN access point, 6) set top box, 7) internet appliance, 8) entertainment device, and 9) base station.

1S. A wireless communications unit comprising
  a wireless antenna;
  a wireless transmitter and receiver coupled to said wireless antenna;
  a DRAM (dynamic random access memory);
  a microprocessor having a secure internal memory and coupled to at least one of said transmitter and receiver, said microprocessor operable for multi-threading a secure demand paging process and a non-secure process, and operable to establish page configuration data and to secure demand page between the secure internal memory and the DRAM in response to a page fault in the secure internal memory, and operable to apply confidentiality processing page-specifically when the page configuration data signifies confidentiality for the page, and to apply integrity processing page-specifically when the page configuration data signifies integrity protection for the page; and a user interface coupled to said microprocessor.

1SA. The wireless communication unit claimed in claim 1S further comprising priority circuitry coupled to said microprocessor and operable to determine priority for page replacement in said secure internal memory.

1SB. The wireless communication unit claimed in claim 1SA wherein the priority circuitry is further operable to accord data pages less priority relative to code pages for page replacement.

1SC. The wireless communication unit claimed in claim 1S further comprising an encrypted application securely demand paged by said microprocessor.

1SD. The wireless communications unit claimed in claim 1S further comprising an encryption accelerator, a hash accelerator, and a direct memory access (DMA) circuit coupled to transfer the page to said encryption accelerator and said hash accelerator in parallel.

1SE. The wireless communications unit claimed in claim 1S further comprising a hash accelerator for a page, and said hashing accelerator delivers a hash result which is read directly from said hashing accelerator by said microprocessor.

1SF. The wireless communications unit claimed in claim 1S wherein said user interface has at least one arrangement selected from the group consisting of 1) mobile phone handset, 2) personal digital assistant (PDA), 3) wireless local area network (WLAN) gateway, 4) personal computer (PC), 5) WLAN access point, 6) set top box, 7) internet appliance, 8) entertainment device, and 9) base station.

2A. The method claimed in claim 2 wherein the processor has variable loading, and the applying of the process being responsive to the variable loading to execute the process at least in part during otherwise-low processor loading.

2B. The method claimed in claim 2 wherein the processor has variable loading, and further comprising swapping out of at least one dirty page at least in part during otherwise-low processor loading.

2C. The method claimed in claim 2 further comprising organizing the external DRAM for plural virtual machine contexts having pages and the secure internal memory for pages from one virtual machine context.

2D. The method claimed in claim 2 further comprising selectively performing page replacement for part of the secure internal memory to support a locked messaging area for a particular virtual machine context and current pages in the secure internal memory for a current virtual machine context.

2E. The method claimed in claim 2D further comprising allocating at least a predetermined amount of space for the current virtual machine context.

2F. The method claimed in claim 2 further comprising monitoring page thrashes on a page-specific basis, and downgrading in priority for page replacement a page encountering excessive page thrashes.

2G. The method claimed in claim 2 further comprising monitoring page thrashes and increasing physical page space in the secure memory when page thrashes are excessive.

2H. The method claimed in claim 2 further comprising downgrading in priority for page replacement a page that was last swapped in compared to other pages.

3A. The system claimed in claim 3 further comprising a wireless receiver coupled to said microprocessor.

3B. The system claimed in claim 3 wherein said non-volatile memory further stores an encrypted digital rights management application for secure demand paging by said microprocessor.

3C. The system claimed in claim 3 wherein at least one book keeping space includes a page and a book keeping element.

3D. The system claimed in claim 3 wherein the coded physical representation of the secure demand paging process includes a representation of page swapping that has operations to establish a first index for a requested virtual machine context, establish a second index for a requested block book keeping block, and establish a third index for a requested book keeping space.

3E. The system claimed in claim 3 wherein the coded physical representation of the secure demand paging process includes a representation of updating a configuration structure in the secure internal memory to reflect a swap in by a first index for requested virtual machine context, a second index for requested block book keeping block, and a third index for requested book keeping space of the page swap in.

3F. The system claimed in claim 3 wherein the book keeping spaces respectively include a page hash, and the block book keeping block includes a block hash.

3G. The system claimed in claim 3 wherein the coded physical representation of the secure demand paging process includes a representation of saving page hashes and saving a block hash of a block book keeping block in secure internal memory.

3H. The system claimed in claim 3G wherein the coded physical representation of the secure demand paging process includes a representation of loading from DRAM to secure internal memory a page hash and a block hash.

3J. The system claimed in claim 3H wherein the coded physical representation of the secure demand paging process includes a representation of verifying the loaded block hash with the saved block hash in secure internal memory.

3K. The system claimed in claim 3H wherein the coded physical representation of the secure demand paging process includes a representation of integrity verification including generation of a hash over page hashes including the page hash loaded, by comparison with the saved block hash of the block book keeping block.

3L. The system claimed in claim 3G wherein the coded physical representation of the secure demand paging process includes a representation of swapping a page out from secure internal memory and saving a page hash in a book keeping space in DRAM for the page swapped out and updating in a block book keeping block in DRAM a block hash dependent on the page hash.

3M. The system claimed in claim 3 wherein the coded physical representation of the secure demand paging process includes a representation of encryption key rotation for encrypting pages.

3P. The system claimed in claim 3 wherein the coded physical representation of the secure demand paging process includes a representation of an operation to swap out a page by a first index for requested virtual machine context, by a second index for requested block book keeping block, and by a third index for requested book keeping space of the page swap out.

3Q. The system claimed in claim 3 wherein the coded physical representation of the secure demand paging process includes a representation of an operation to organize the secure internal memory to store pages corresponding to at least some of the pages in a single virtual machine context organized in the SDP space in external memory.

3R. The system claimed in claim 3 wherein the coded physical representation of the secure demand paging process includes a representation of an operation to organize the secure internal memory to store information pertaining to plural virtual machine contexts but store selected pages into the secure internal memory from a single virtual machine context organized in the SDP space in external memory.

3S. An article comprising a storage medium and a coded physical representation established in the storage medium to represent electronic processor operations including operations to configure an SDP space in a memory, to organize the SDP space into virtual machine contexts, to organize at least one of the virtual machine contexts into block book keeping blocks and book keeping spaces in the block book keeping blocks, and to execute a secure demand paging process on said book keeping spaces and block book keeping blocks.

3SA. The article claimed in claim 3S wherein said storage medium includes a flash memory.

3SB. The article claimed in claim 3S wherein said storage medium includes an optically-readable disc.

3SC. The article claimed in claim 3S wherein said coded physical representation includes encrypted representations of at least some of the operations.

3SD. The article claimed in claim 3S wherein said storage medium includes a web site.

3SE. The article claimed in claim 3S wherein said storage medium includes a computer loaded with said coded physical representation and accessible for downloading of said coded physical representation.

3T. A secure demand paging (SDP) method for a portable apparatus with an external memory and a processor for executing at least one protected application in a secure internal memory having a physical address space, the method comprising
configuring an SDP space in the external memory;
organizing the SDP space into virtual machine contexts; and
organizing at least one of the virtual machine contexts into block book keeping blocks and book keeping spaces in the block book keeping blocks.

3TA. The method claimed in claim 3T wherein at least one book keeping space includes a page and a book keeping element and the method further comprising page swapping by establishing a first index for a requested virtual machine context, a second index for a requested block book keeping block, and a third index for a requested book keeping space.

3TB. The method claimed in claim 3T further comprising organizing the secure internal memory to store information pertaining to plural virtual machine contexts but selecting one at a time of the virtual machine contexts as a current virtual machine context and storing selected pages from the external memory into the secure internal memory primarily from the selected current virtual machine context organized in the SDP space in external memory.

3TC. The method claimed in claim 3T further comprising performing secure demand paging on an encrypted digital rights management application.

3TD. The method claimed in claim 3T wherein the book keeping spaces respectively include a page and a page hash, and the block book keeping block includes a block hash, and the method further comprising loading a page hash and block hash from external memory to secure internal memory for integrity verification.

3TE. The method claimed in claim 3TD wherein the integrity verification includes verifying the block hash of the block book keeping block against a pre-stored value in secure internal memory.

3TF. The method claimed in claim 3TD wherein the integrity verification includes verifying the block hash of the block book keeping block with a hash of the hashes for the book keeping spaces in the block book keeping block.

4A. The system claimed in claim 4 wherein the coded physical representation further represents operations to establish a table of virtual pages for code and data and stack for the protected application, and operations to establish a mapping between at least some of the virtual pages and at least some of the physical address space of said secure internal memory by the table.

4B. The system claimed in claim 4 wherein the coded physical representation further has a representation of operations to establish a separate shared space in secure internal memory for the protected application to share with a second protected application.

4C. The system claimed in claim 4 further comprising a wireless receiver coupled to said microprocessor.

4D. The system claimed in claim 4 wherein the protected application includes an encrypted application for secure demand paging by said microprocessor.

4E. The system claimed in claim 4 wherein the data structure includes a hash for each book keeping element, and a hash for each block book keeping block.

4F. The system claimed in claim 4 further comprising a chip for at least said microprocessor, wherein the data structure includes a hash for each book keeping element, the chip having a hash memory space for the hash and coupled to said microprocessor, the hash memory space being always-powered for the hash to survive power down of said microprocessor.

4G. The system claimed in claim 4 further comprising a chip for at least said microprocessor, wherein the data structure includes a hash for each book keeping element, the chip having a hash memory space for the hash and coupled to said microprocessor, the hash memory space being non-volatile, whereby to impede playback attack.

4H. The system claimed in claim 4 wherein the data structure includes a hash for each book keeping element, and a hash for each block book keeping block, coordinated between both said secure internal memory and said DRAM.

4J. The system claimed in claim 4 wherein the coded physical representation of operations includes a representation of operations to access the data structure by a third index for different virtual machine contexts.

4K. The system claimed in claim 4J wherein the coded physical representation of operations includes a representation of operations to hash each book keeping element, to hash each block book keeping block, and to hash each virtual machine context.

4L. The system claimed in claim 4 wherein the data structure includes page-specific integrity flags.

4M. The system claimed in claim 4 wherein the data structure includes an integrity pattern for a physical page in secure internal memory.

4N. The system claimed in claim 4 wherein the data structure includes page-specific confidentiality flags.

4P. A secure demand paging method for a processor for executing a protected application in a secure internal memory having a physical address space and for use with a DRAM coupled to the secure internal memory, the method comprising establishing a data structure pertaining at least in part to both the secure internal memory and the DRAM, the data structure organizing the protected application in the secure internal memory into virtual pages by a first index for a book keeping element in use, and a second index for a block book keeping block in use, and demand paging between the secure internal memory and the DRAM utilizing the data structure.

4PA. The method claimed in claim 4P wherein establishing the data structure includes hashing for each book keeping element, and hashing for each block book keeping block.

4PB. The method claimed in claim 4P wherein establishing the data structure includes a time stamp for each book keeping element.

4PC. The method claimed in claim 4P wherein establishing the data structure includes a third index for a current virtual machine context.

4PD. The method claimed in claim 4P wherein the data structure includes a stack and the method includes verifying integrity of the pages and checking the data structure for containment of the stack within a predetermined address boundary.

5A. The system claimed in claim 5 wherein the coded physical representation of operations further includes a representation of indexing a set of block book keeping blocks pertaining to respective sets of book keeping elements for the protected application, and hashing the hash values for the book keeping elements for each block book keeping block together, and storing the hash result into a hash field of the respective block book keeping block.

5B. The system claimed in claim 5A wherein the coded physical representation of the operations includes at least two nested loops.

5C. The system claimed in claim SA wherein the coded physical representation of the storing further includes a representation of storing the hash fields of the respective book keeping elements and block book keeping blocks in both the secure internal memory and the external volatile memory.

5D. The system claimed in claim 5A wherein the coded physical representation of operations further includes a representation of establishing a set of virtual machine contexts, hashing the hash values for the block book keeping blocks of each virtual machine context together, and storing the hash result into a hash field of the respective virtual machine context.

5E. The system claimed in claim 5D wherein the coded physical representation of the storing further includes a representation of storing the hash fields of block book keeping blocks and the hash fields of virtual machine contexts in both the secure internal memory and the external volatile memory.

5F. The system claimed in claim 5A wherein the coded physical representation of operations further includes a representation of selective operation with including a first alternative of initializing a set of virtual machine contexts and a second alternative of activating a single virtual machine context to update such a set.

6A. The system claimed in claim 6 wherein the additional protected application has a virtual space and the coded physical representation includes a representation of mapping at least part of the virtual space for the additional protected application to the physical page space of the secure memory.

6B. The system claimed in claim 6 wherein the coded physical representation includes a representation of an operation to reserve in said external volatile memory an SDP space for SDP operations in said external volatile memory.

6C. The system claimed in claim 6 wherein the coded physical representation includes a representation of an SDP API (application peripheral interface) process coupling said operating system and said SDP protected application.

6D. The system claimed in claim 6 wherein the SDP abort handler includes an SDP prefetch abort handler and an SDP data abort handler.

6E. The system claimed in claim 6D wherein the client application has an operation to access a code page and an operation to access a data page, and the operation to vector includes a first operation for transfer of an unsuccessful code page access to the SDP prefetch abort handler and a second operation for transfer of an unsuccessful data page access to the SDP data abort handler.

6F. The system claimed in claim 6 wherein the SDP protected application has a configuration for enabling or disabling write fault handling.

6G. The system claimed in claim 6 wherein the SDP protected application supports multi-threading.

6H. The system claimed in claim 6 wherein the SDP protected application includes a representation of an operation to establish page-specific locking data in the secure memory space and to alter the page-specific locking data in-place free of rearrangement of the locking data.

6K. The system claimed in claim 6 wherein said microprocessor further includes a secure non-volatile memory holding an entry address to the SDP abort handler to support the operation to vector.

6L. The system claimed in claim 6 wherein the SDP protected application includes a representation of an operation to swap out a modified page from said secure memory.

6M. The system claimed in claim 6 wherein the SDP protected application includes a representation of an operation to swap out a modified page from said secure memory with a time-stamp.

6N. The system claimed in claim 6M wherein the operation to swap out includes a representation of an operation to store a page-specific time stamp both in the secure memory space and in said external volatile memory, and the operation to load the pertinent page has an operation to load the page-specific time-stamp with the pertinent page from the external volatile memory to said secure memory and to compare the page-specific time-stamp with the already-stored time stamp in the secure memory for that page.

6P. The system claimed in claim 6 wherein the SDP protected application further includes a representation of an operation for page replacement for the secure memory that treats a code page differently from a data page for page replacement in the secure memory, prior to the load of the pertinent page of the protected application.

6Q. An article comprising a storage medium and a coded physical representation established in the storage medium to represent electronic processor operations including operations for an operating system, a client application, a secure demand paging (SDP) protected application and at least one additional protected application, said SDP protected application including an SDP abort handler and a representation of operations to memory-save the additional protected application page-wise via decryption, authentication, encryption and integrity protection governed by a page-specific confidentiality flag and page-specific integrity flag;

said client application including a representation of an access directed to a pertinent page of the additional protected application, the operating system including a representation of an access abort detection and an operation to vector access abort to the SDP abort handler, said SDP protected application further including a representation of an operation to search for the pertinent page of the protected application, a load of a pertinent page of the protected application by decryption and authentication governed by the confidentiality flag and the integrity flag, and re-queue of the access to the pertinent page.

6QA. The article claimed in claim 6Q wherein said storage medium includes a flash memory.

6QB. The article claimed in claim 6Q wherein said storage medium includes an optically-readable disc.

6QC. The article claimed in claim 6Q wherein said storage medium includes a web site.

6QD. The article claimed in claim 6Q wherein said storage medium includes a computer loaded with said coded physical representation and accessible for downloading of said coded physical representation to a remote location.

7A. The system claimed in claim 7 wherein the coded physical representation further has a representation of operations to switch from the first virtual machine context to another virtual machine context while maintaining the page-specific lock and index of the first virtual machine context for the page.

7B. The system claimed in claim 7 wherein the locked page is established and ready for interrupt messaging.

7C. The system claimed in claim 7 wherein the coded physical representation further has a representation of operations to establish pages in said external volatile memory for a plurality of virtual machine contexts each accessible by a respective value of the index, each virtual machine context having a respective base address, the pages having respective virtual address offsets relative to the base address of the virtual machine context of a page.

7D. The system claimed in claim 7C wherein the coded physical representation further has a representation of operations to associate the page-specific lock with the virtual machine context index value, and to switch from the first virtual machine context to another virtual machine context while maintaining the page-specific lock and index value of the first virtual machine context for the page, whereby to avoid confusing the locked page with a page having the same virtual address offset bits but pertaining to the other virtual machine context.

7E. The system claimed in claim 7 wherein the coded physical representation further has a representation of operations to subsequently release the page-specific lock for the page.

7F. The system claimed in claim 7 wherein the coded physical representation further has a representation of operations to establish a second virtual machine context and to establish a separate space in secure internal memory that is shared between the first-named and second virtual machine contexts.

7G. The system claimed in claim 7 wherein said non-volatile memory includes storage for an operating system and the coded physical representation further has a representation of operation to handshake with the operating system upon establishing the secure demand paging configuration in said secure internal memory.

7H. The system claimed in claim 7 wherein the coded physical representation further has a representation of operations to switch from the virtual machine context to another virtual machine context and to unlock a code page in said secure internal memory.

7J. The system claimed in claim 7 for use with a memory management unit having a page table and wherein the coded physical representation further has a representation of operations to switch from the virtual machine context to a new virtual machine context and to rebuild the MMU page table with another mapping of virtual addresses to physical addresses for the new virtual machine context.

7K. The system claimed in claim 7 wherein the coded physical representation further has a representation of an update to the index of the virtual machine context to an index value for a new virtual machine context.

7L. The system claimed in claim 7 further comprising a secure register, wherein the coded physical representation further has a representation of operations to switch from the virtual machine context to a new virtual machine context, the switch including update to the secure register with page-specific data pertaining to scavenging.

7M. The system claimed in claim 7 wherein the coded physical representation further has a representation of operations to switch from the virtual machine context to a new virtual machine context, the switch including activation of the new virtual machine context in a secure mode.

7N. The system claimed in claim 7 wherein the secure demand paging configuration further includes page status data for page empty.

7P. The system claimed in claim 7 wherein the secure demand paging configuration further includes page status data pertaining to page swapping.

7Q. The system claimed in claim 7 wherein the secure demand paging configuration further includes page status data including page swapped in, page swapped out, and page swapped out with page swapped in.

7R. The system claimed in claim 7 wherein the secure demand paging configuration further includes page status data pertaining to page locking.

7S. The system claimed in claim 7 wherein the secure demand paging configuration further includes a virtual address space size of the virtual machine context.

7T. The system claimed in claim 7 wherein the virtual machine context has a virtual address space and the stack is situated at the bottom of the virtual address space of the virtual machine context.

7U. The system claimed in claim 7 wherein the stack has a high address side and a low address side in virtual address space and the non-volatile memory further having first and second unused page slots respectively situated on the high address side and low address side of the stack, whereby buffer overflow attack is impeded.

7V. The system claimed in claim 7 further comprising a monitoring circuit coupled to detect expansion of the stack beyond a predetermined address boundary, whereby impeding buffer overflow attack.

7W. The system claimed in claim 7 wherein the coded physical representation further has a representation of operations to switch from the virtual machine context to a new virtual machine context, the representation of operations to switch including an operation to load at least one page and new page-specific lock data for the new virtual machine context from said external volatile memory to said secure internal memory.

8A. The system claimed in claim 8 wherein the coded physical representation includes configuration information to include a particular page type in said search or not.

8B. The system claimed in claim 8 wherein the coded physical representation includes configuration information to include a particular page type in said request operation or not.

8C. The system claimed in claim 8 wherein the coded physical representation further has a representation of an operation to determine whether the identified physical page has a characteristic unsuitable for wiping and if so, identify another physical page to wipe.

8D. The method claimed in claim 8C wherein the characteristic includes the identified physical page is locked.

8E. The method claimed in claim 8C wherein the characteristic includes the identified physical page is last swapped in.

8F. The method claimed in claim 8 wherein the representation of the operation to search includes identification of plural physical pages to wipe and a selection of one of those physical pages to wipe.

8G. The method claimed in claim 8 wherein the representation of the operation to search includes pre-selection of plural physical pages to wipe and a random selection of a physical page from among the plural pages to wipe to identify said physical page to wipe.

8H. The method claimed in claim 8 wherein the representation of the operation to search is conditioned on a status of secure internal memory for paging as full.

9A. The system claimed in claim 9 wherein the coded physical representation further has a representation of operation to determine whether a condition is true that a virtual page in the current virtual machine context is assigned to a physical page and that virtual page has the same virtual address offset bits specifying an offset for current virtual machine context as the virtual offset bits that specify the offset for page to be used for the message with the second virtual machine context, and when said condition is true then to flush this physical page specifically and then to prepare the page for handling the asynchronous message.

9B. The system claimed in claim 9 wherein the coded physical representation further has a representation of operation to determine whether the virtual machine context for the message is current virtual machine context but the page is absent from said internal secure memory, and in such case to wipe a page and prepare the page for handling the asynchronous message in the current virtual machine context.

9C. The system claimed in claim 9 wherein the coded physical representation further has a representation of operation to swap out a modified page in internal secure memory occupying a predetermined page slot for handling said asynchronous message.

9D. The system claimed in claim 9 wherein the representation of operation to prepare the particular page includes a swap in of code from the second virtual machine context from said external memory for handling said asynchronous message.

9E. The system claimed in claim 9 wherein the representation of operation to prepare the particular page includes a mode for clearing the particular page.

9F. The system claimed in claim 9 wherein the representation of operation to prepare the particular page includes locking the page.

9G. The system claimed in claim 9 wherein the representation of operation to prepare the particular page includes assigning the particular page to the second virtual machine context.

9H. The system claimed in claim 9 wherein the coded physical representation further has a representation of operation to swap out the message from the predetermined page slot from internal secure memory to external memory, and to unlock the predetermined page slot.

9J. The system claimed in claim 9 wherein the coded physical representation further has a representation of operation to swap in the page from the first virtual machine context in external memory to restore the particular page, and to unfreeze code execution in the first virtual machine context.

9K. The system claimed in claim 9 wherein the coded physical representation further has a representation of operation to unfreeze code execution in the first virtual machine context and to subsequently swap in the particular page from the first virtual machine context in external memory to restore the particular page provided the current virtual machine context subsequently attempts to access the particular page.

9L. The system claimed in claim 9 wherein the coded physical representation further has a representation of operation to generate a secure interrupt for the asynchronous message prior to the freeze of code execution.

9M. The system claimed in claim 9 wherein the coded physical representation further has a representation of operation to swap out the message from the predetermined page slot by encryption and hashing governed by a page-specific confidentiality flag and a page-specific integrity flag.

9N. The system claimed in claim 9 wherein the coded physical representation further has a representation of operation to swap in code from the second virtual machine context by decryption and authentication by a page-specific confidentiality flag and a page-specific integrity flag.

9P. The system claimed in claim 9 further comprising a wireless modem coupled to said microprocessor.

10A. The secure demand paging system claimed in claim 10 further comprising a memory management unit wherein said secure internal memory has physical addresses and said memory management unit is responsive to virtual addresses, and said processor is further operable to establish a table in secure internal memory relating at least some of the physical addresses to at least some of the virtual addresses.

10B. The secure demand paging system claimed in claim 10A wherein said processor is further operable to record entries in the table identifying whether a page slot is empty.

10C. The secure demand paging system claimed in claim 10A wherein said processor is further operable to record entries in the table identifying swap status for a page slot.

10D. The secure demand paging system claimed in claim 10A wherein said processor is further operable to record entries in the table identifying whether a page slot is swapped in, or a page is swapped out, or a page is swapped in after a page was swapped out.

10E. The secure demand paging system claimed in claim 10 wherein said processor is further operable to select code and data pages differently in priority for swap out.

10F. The secure demand paging system claimed in claim 10 wherein said processor is further operable to select pages differently in priority for modified or unmodified pages for page fault on read and for page fault on write.

11A. The secure demand paging system claimed in claim 11 wherein the hash accelerator is further operable to perform a hash on identification information before said transfer in parallel.

11B. The secure demand paging system claimed in claim 11 wherein the hash accelerator is further operable to perform a key hash before said transfer in parallel.

11C. The secure demand paging system claimed in claim 11 wherein the cryptographic accelerator is operable to encrypt the hash result upon completion of the parallel transfer of the data.

11D. The secure demand paging system claimed in claim 11 further comprising a DMA (direct memory access) circuit operable to couple said secure memory to said cryptographic accelerator for encryption and to said hash accelerator.

11E. The secure demand paging system claimed in claim 11D wherein said DMA circuit is coupled to activate said cryptographic accelerator and said hash accelerator by said DMA circuit itself.

11F. The secure demand paging system claimed in claim 11D wherein said cryptographic accelerator and said hash accelerator are operable as two synchronous targets for said DMA circuit.

11G. The secure demand paging system claimed in claim 11F further comprising an external volatile memory wherein said DMA circuit is further operable to couple said cryptographic accelerator to said external volatile memory.

11H. The secure demand paging system claimed in claim 11 further comprising a DMA (direct memory access) circuit operable to couple a decryption stream from said cryptographic accelerator concurrently to said secure memory and to said hash accelerator.

11J. The secure demand paging system claimed in claim 11H further comprising an external volatile memory and wherein said DMA circuit is operable to couple said external volatile memory to said cryptographic accelerator for decryption.

11K. The secure demand paging system claimed in claim 11D wherein said DMA circuit has virtual scatter/gather capability with virtual to physical lookups prior to a DMA operation.

11L. The secure demand paging system claimed in claim 11K wherein the lookups provide a physical page list, and said DMA circuit has a secure interrupt handler and is operable at each page completion to start the next physical page transfer based on the physical page list.

11M. The secure demand paging system claimed in claim 11K wherein said DMA has first and second logical channels and said DMA circuit is operable for DMA fetch to operate the first logical channel in response to the physical page list and operate the second logical channel to repeat each fetch by the first logical channel.

11P. The secure demand paging system claimed in claim 11D wherein said hashing accelerator is operable to deliver the hash result directly to said processor to bypass said DMA circuit.

11Q. The secure demand paging system claimed in claim 11 wherein said hash accelerator supplies an interrupt request, and said processor is responsive to the interrupt request to read the hash result directly from the hashing accelerator.

11R. The secure demand paging system claimed in claim 11 further comprising a security key and wherein said hash accelerator is responsive to said security key.

11S. The secure demand paging system claimed in claim 11 further comprising an external volatile memory coupled to said secure memory to receive pages from said secure memory hashed by said hash accelerator and encrypted by said cryptographic accelerator.

11T. The secure demand paging system claimed in claim 11 further comprising an external memory coupled to said secure memory to feed pages from said external memory to said secure memory, the pages decrypted by said cryptographic accelerator and hash-checked by said hash accelerator in parallel.

11U. The secure demand paging system claimed in claim 11 further comprising a source of rotating cryptographic keys coupled to said cryptographic accelerator.

11V. The secure demand paging system claimed in claim 11 further comprising a source of rotating cryptographic keys coupled to said hash accelerator.

11W. A process of manufacturing a secure demand paging integrated circuit comprising
preparing a particular design of an integrated circuit including:
a processor;
a cryptographic accelerator;
a hash accelerator; and
a secure memory coupled to said processor and coupled to transfer the same secure memory data to the cryptographic accelerator and the hash accelerator in parallel, the hashing accelerator having a hash result output coupled directly from the hashing accelerator to said processor;
verifying the design of said secure demand paging integrated circuit in simulation; and
manufacturing to produce a resulting secure demand paging integrated circuit according to the verified design.

13A. The device claimed in claim 13 wherein said processor is operable to selectively perform the page scavenging so that a swap out is included and a swap in is bypassed.

13B. The device claimed in claim 13 wherein said processor is operable to selectively perform the page scavenging so that page wiping is included and a swap out of a modified wiped page is deferred.

13C. The device claimed in claim 13 wherein said processor is operable in the page scavenging to find a second page for swap out.

13D. The device claimed in claim 13C wherein said processor is further operable in the page scavenging to store an identification of that second page.

13E. The device claimed in claim 13 wherein said processor is further operable to swap in a page after the page scavenging.

13F. The device claimed in claim 13C wherein said DMA circuit is operable to subsequently activate said cryptographic circuit to perform a cryptographic operation on the second page for swap out.

13G. The device claimed in claim 13F wherein said processor is operable during the page scavenging to find a third page for swap out during the operation on the second page by said cryptographic circuit.

13H. The device claimed in claim 13 wherein said processor has a page replacement policy for said page scavenging to find a high priority page for swap out.

13J. The device claimed in claim 13 wherein said processor is also operable prior to the operation on the first page by the cryptographic circuit to identify the first page for swap out.

13K. The device claimed in claim 13 wherein said processor is operable during the page scavenging to identify a next page for swap out, store an identification of that next page, and said DMA circuit is subsequently responsive to the stored identification of that next page to perform a cryptographic operation on that next page.

13L. The device claimed in claim 13 wherein said processor has a sleep mode and is operable to swap out all modified pages from said secure memory and transition to the sleep mode.

13M. The device claimed in claim 13L wherein said processor is further operable to hash pages including pages and modified pages, and to generate a hash of hashes, and prior to the transition to the sleep mode to update the hash of hashes based on hashed pages and hashed modified pages.

14A. The device claimed in claim 14 wherein said processor is operable to selectively perform the page scavenging so that a swap out is included and a swap in is bypassed.

14B. The device claimed in claim 14 wherein said processor is operable to selectively perform the page scavenging so that page wiping is included and a swap out of a modified wiped page is deferred.

14C. The device claimed in claim 14B wherein said processor is operable to establish a queue identifying pages for which swap out is deferred.

14D. The device claimed in claim 14C wherein said processor is operable to subsequently swap out pages in response to the queue identifying pages for which swap out is deferred.

14E. The system claimed in claim 14 wherein the page scavenger includes a priority for wiping out a page.

14F. The system claimed in claim 14E wherein the page scavenger includes a subsequent page swapping out operation.

14G. The system claimed in claim 14 wherein said page scavenger is scheduled for an interval preceded by an interval for execution of the protected application.

14H. The system claimed in claim 14 wherein said processor is operable to perform a virtual machine context switch to load a protected application, run the protected application, and execute the page scavenger.

14J. The system claimed in claim 14 wherein said processor is operable to perform a first call to the page scavenger during a busier interval when the secure internal memory is full for paging purposes, and a second call to page scavenger during said at least one interval of lower-activity status.

14K. The system claimed in claim 14 wherein said processor is operable to perform a virtual machine context activation during an interval of lower-activity status.

14L. The system claimed in claim 14 wherein said processor is operable to perform a virtual machine context deactivation during an interval of lower-activity status.

Notes: Aspects are paragraphs which might be offered as claims in patent prosecution. The above dependently-written Aspects have leading digits and internal dependency designations to indicate the claims or aspects to which they pertain. Aspects having no internal dependency designations have leading digits and alphanumerics to indicate the position in the ordering of claims at which they might be situated if offered as claims in prosecution.

It is emphasized here that while some embodiments may have an entire feature totally absent or totally present, other embodiments have more or less complex arrangements that execute some code portions, selectively bypass others, and have some operations running concurrently sequentially regardless. Accordingly, words such as "enable," "disable," "operative," "inoperative" are to be interpreted relative to the code and circuitry they describe. For instance, disabling (or making inoperative) or bypassing of a first function can omit the first function with no other change, or introduce or modify other functionality, or decrease or increase the functionality represented by the first function. Bypassing or modifying code increases functionality in some embodiments and omits functionality in other embodiments.

A few preferred embodiments have been described in detail hereinabove. It is to be understood that the scope of the invention comprehends embodiments different from those described yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, and other circuitry, and digital computers including microprocessors and microcomputers of any architecture, or combinations thereof. Internal and external couplings and connections can be ohmic, capacitive, direct or indirect via intervening circuits or otherwise as desirable. Implementation is contemplated in discrete components or fully integrated circuits in any materials family and combinations thereof. Various embodiments of the invention employ hardware, software or firmware. Process diagrams herein are representative of flow diagrams for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A secure demand paging system comprising
a processor;
a cryptographic accelerator;
a hash accelerator; and
a secure memory coupled to said processor and coupled to transfer the same secure memory data to the cryptographic accelerator and the hash accelerator in parallel, the hashing accelerator operable to securely deliver a hash result directly to said processor, wherein the cryptographic accelerator is operable to encrypt the hash result upon completion of the parallel transfer of the data.

2. The secure demand paging system claimed in claim 1 wherein the hash accelerator is further operable to perform a hash on identification before said transfer in parallel.

3. The secure demand paging system claimed in claim 1 wherein the hash accelerator is further operable to perform a key hash before said transfer in parallel.

4. The secure demand paging system claimed in claim 1 further comprising a DMA (direct memory access) circuit operable to couple said secure memory to said cryptographic accelerator for encryption and to said hash accelerator.

5. The secure demand paging system claimed in claim 1 wherein said cryptographic accelerator and said hash accelerator are operable as two synchronous targets for said DMA circuit.

6. The secure demand paging system claimed in claim 5 further comprising an external volatile memory wherein said DMA circuit is further operable to couple said cryptographic accelerator to said external volatile memory.

7. The secure demand paging system claimed in claim 1 further comprising a DMA (direct memory access) circuit operable to couple a decryption stream from said cryptographic accelerator concurrently to said secure memory and to said hash accelerator.

8. The secure demand paging system claimed in claim 1 wherein said DMA circuit has virtual scatter/gather capability with virtual to physical lookups prior to a DMA operation.

9. The secure demand paging system claimed in claim 8 wherein the lookups provide a physical page list, and said DMA circuit has a secure interrupt handler and is operable at each page completion to start the next physical page transfer based on the physical page list.

10. The secure demand paging system claimed in claim 8 wherein said DMA has first and second logical channels and said DMA circuit is operable for DMA fetch to operate the first logical channel in response to the physical page list and operate the second logical channel to repeat each fetch by the first logical channel.

11. The secure demand paging system claimed in claim 1 wherein said hashing accelerator is operable to deliver the hash result directly to said processor to bypass said DMA circuit.

12. The secure demand paging system claimed in claim 1 further comprising a security key and wherein said hash accelerator is responsive to said security key.

13. A secure demand paging system comprising
a processor;
a cryptographic accelerator;
a hash accelerator;
a secure memory coupled to said processor and coupled to transfer the same secure memory data to the cryptographic accelerator and the hash accelerator in parallel, the hashing accelerator operable to securely deliver a hash result directly to said processor; and
a DMA (direct memory access) circuit operable to couple said secure memory to said cryptographic accelerator for encryption and to said hash accelerator, wherein said DMA circuit is coupled to activate said cryptographic accelerator and said hash accelerator by said DMA circuit itself.

14. A secure demand paging system comprising
a processor;
a cryptographic accelerator;
a hash accelerator;
a secure memory coupled to said processor and coupled to transfer the same secure memory data to the cryptographic accelerator and the hash accelerator in parallel, the hashing accelerator operable to securely deliver a hash result directly to said processor;
a DMA (direct memory access) circuit operable to couple a decryption stream from said cryptographic accelerator concurrently to said secure memory and to said hash accelerator; and
an external volatile memory and wherein said DMA circuit is operable to couple said external volatile memory to said cryptographic accelerator for decryption.

15. A secure demand paging system comprising
a processor;
a cryptographic accelerator;
a hash accelerator, wherein said hash accelerator supplies an interrupt request, and said processor is responsive to the interrupt request to read the hash result directly from the hashing accelerator; and
a secure memory coupled to said processor and coupled to transfer the same secure memory data to the cryptographic accelerator and the hash accelerator in parallel, the hashing accelerator operable to securely deliver a hash result directly to said processor.

16. A secure demand paging system comprising
a processor;
a cryptographic accelerator;
a hash accelerator;
a secure memory coupled to said processor and coupled to transfer the same secure memory data to the cryptographic accelerator and the hash accelerator in parallel, the hashing accelerator operable to securely deliver a hash result directly to said processor; and
an external volatile memory coupled to said secure memory to receive pages from said secure memory hashed by said hash accelerator and encrypted by said cryptographic accelerator.

17. A secure demand paging system comprising
a processor;
a cryptographic accelerator;
a hash accelerator; and
a secure memory coupled to said processor and coupled to transfer the same secure memory data to the cryptographic accelerator and the hash accelerator in parallel, the hashing accelerator operable to securely deliver a hash result directly to said processor; and
an external memory coupled to said secure memory to feed pages from said external memory to said secure memory, the pages decrypted by said cryptographic accelerator and hash-checked by said hash accelerator in parallel.

18. A secure demand paging system comprising
a processor;
a cryptographic accelerator;
a hash accelerator; and
a secure memory coupled to said processor and coupled to transfer the same secure memory data to the cryptographic accelerator and the hash accelerator in parallel, the hashing accelerator operable to securely deliver a hash result directly to said processor; and
a source of rotating cryptographic keys coupled to said cryptographic accelerator.

19. A secure demand paging system comprising
a processor;
a cryptographic accelerator;
a hash accelerator; and
a secure memory coupled to said processor and coupled to transfer the same secure memory data to the cryptographic accelerator and the hash accelerator in parallel, the hashing accelerator operable to securely deliver a hash result directly to said processor; and
a source of rotating cryptographic keys coupled to said hash accelerator.

20. A method of secure demand paging in a system comprising:
a processor;
a cryptographic accelerator;
a hash accelerator; and
a secure memory including data, said method comprising;
transferring the same secure memory data to the cryptographic accelerator and to the hash accelerator in parallel; and
delivering a hash result from said hash accelerator to said processor; and
encrypting said hash result.

21. The method of claim 20, further comprising the step of performing in said hash accelerator a hash on identification information in said secure memory data.

22. The method of claim 20, further comprising the step of performing in said hash accelerator a key hash.

23. The method of claim 20, wherein said system comprises a direct memory access (DMA) circuit, and wherein said method further comprises the step of coupling said secure memory to said cryptographic accelerator and to said hash accelerator through said DMA circuit.

24. The method of claim 23 further comprising the step of using the DMA circuit to activate said cryptographic accelerator and said hash accelerator.

25. The method of claim 23 further comprising the step of making said cryptographic accelerator and said hash accelerator synchronous targets of said DMA circuit.

26. The method of claim 25, wherein said system comprises a volatile memory, and wherein said method further comprises the step of using the DMA circuit to couple said cryptographic accelerator to said volatile memory.

27. The method of claim 26, further comprising the step of coupling said volatile memory to said cryptographic accelerator for decryption.

28. The method of claim 23 further comprising the step of directing a decryption stream from said cryptographic accelerator concurrently to said secure memory and to said hash accelerator.

29. The method of claim 23, further comprising the step of bypassing said DMA circuit to deliver said hash result to said processor.

30. A method of secure demand paging in a system comprising:
a processor;
a cryptographic accelerator;
a hash accelerator;
a secure memory including data, said method comprising:
transferring the same secure memory data to the cryptographic accelerator and to the hash accelerator in parallel;
delivering a hash result from said hash accelerator to said processor; and
wherein said system comprises a direct memory access (DMA) circuit, and wherein said method further comprises the step of coupling said secure memory to said cryptographic accelerator and to said hash accelerator through said DMA circuit; and performing a scatter/gather operation with said DMA circuit subsequent to performing virtual to physical lookups.

31. The method of claim 30 wherein said step of performing virtual to physical lookups results in a physical page list, said method further comprising the step of starting a next physical page transfer based on said physical page list at the completion of the prior page transfer.

32. The method of claim 30 wherein said DMA circuit has first and second logical channels, said method further comprising the step of fetching in the first logical channel in accordance with said physical page list, and further comprising the step of fetching in the second logical channel to repeat each fetch made in the first logical channel.

33. A method of secure demand paging in a system comprising:
a processor;
a cryptographic accelerator;
a hash accelerator; and
a secure memory including data, said method comprising:
transferring the same secure memory data to the cryptographic accelerator and to the hash accelerator in parallel; and
delivering a hash result from said hash accelerator to said processor; and
reading said hash result from said hashing accelerator in response from an interrupt request from said hash accelerator to said processor.

34. A method of secure demand paging in a system comprising:
a processor;
a cryptographic accelerator;
a hash accelerator; and
a secure memory including data, said method comprising:
transferring the same secure memory data to the cryptographic accelerator and to the hash accelerator in parallel;
delivering a hash result from said hash accelerator to said processor; and
a volatile memory coupled to said secure memory, said method further comprising the step of hashing and encrypting pages from said secure memory and sending the results to said volatile memory.

35. A method of secure demand paging in a system comprising:
a processor;
a cryptographic accelerator;
a hash accelerator; and
a secure memory including data, said method comprising:
transferring the same secure memory data to the cryptographic accelerator and to the hash accelerator in parallel;
delivering a hash result from said hash accelerator to said processor; and
a second memory coupled to said secure memory, wherein said method further comprises the step of decrypting and hash-checking pages transferred from said second memory to said secure memory in parallel.

36. A method of secure demand paging in a system comprising:
a processor;
a cryptographic accelerator;
a hash accelerator; and a secure memory including data, said method comprising:
transferring the same secure memory data to the cryptographic accelerator and to the hash accelerator in parallel;
delivering a hash result from said hash accelerator to said processor; and
supplying said cryptographic accelerator with a rotating source of cryptographic keys.

37. A method of secure demand paging in a system comprising:
a processor;
a cryptographic accelerator;
a hash accelerator; and
a secure memory including data, said method comprising:
transferring the same secure memory data to the cryptographic accelerator and to the hash accelerator in parallel;
delivering a hash result from said hash accelerator to said processor; and
supplying said hash accelerator with a rotating source of cryptographic keys.

38. A communications apparatus, comprising:
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor;
a DMA circuit coupled to activate said cryptographic accelerator and said hash accelerator by said DMA circuit itself; and
a user interface coupled to the processor.

39. The communications apparatus in claim 38 wherein the hash accelerator is further operable to perform a hash on identification information before said transfer in parallel.

40. The communications apparatus in claim 39 wherein the hash accelerator is further operable to perform a key hash before said transfer in parallel.

41. The communications apparatus in claim 39 further comprising a DMA (direct memory access) circuit operable to couple said secure memory to said cryptographic accelerator for encryption and to said hash accelerator.

42. The communications apparatus in claim 39 further comprising a DMA (direct memory access) circuit operable to couple a decryption stream from said cryptographic accelerator concurrently to said secure memory and to said hash accelerator.

43. The communications apparatus in claim 39 further comprising a security key and wherein said hash accelerator is responsive to said security key.

44. The communications apparatus in claim 38 wherein said cryptographic accelerator and said hash accelerator are operable as two synchronous targets for said DMA circuit.

45. The communications apparatus in claim 38 further comprising an external volatile memory wherein said DMA circuit is further operable to couple said cryptographic accelerator to said external volatile memory.

46. A communications apparatus, comprising:
an antenna;
a receiver and a transmitter coupled to said antenna;
a processor coupled to the receiver and transmitter, said processor having a cryptographic accelerator and a hash accelerator;

a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a key hash before said transfer in parallel, and wherein the cryptographic accelerator is operable to encrypt the has result upon completion of the parallel transfer of the data; and a user interface coupled to the processor.

47. The communications apparatus in claim 46 wherein said DMA circuit has virtual scatter/gather capability with virtual to physical lookups prior to a DMA operation.

48. The communications apparatus in claim 47 wherein the lookups provide a physical page list, and said DMA circuit has a secure interrupt handler and is operable at each page completion to start the next physical page transfer based on the physical page list.

49. The communications apparatus in claim 47 wherein said DMA has first and second logical channels and said DMA circuit is operable for DMA fetch to operate the first logical channel in response to the physical page list and operate the second logical channel to repeat each fetch by the first logical channel.

50. The communications apparatus in claim 46 wherein said hashing accelerator is operable to deliver the hash result directly to said processor to bypass said DMA circuit.

51. A communications apparatus, comprising:
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel;
a DMA (direct memory access) circuit operable to couple a decryption stream from said cryptographic accelerator concurrently to said secure memory and to said hash accelerator;
an external volatile memory and wherein said DMA circuit is operable to couple said external volatile memory to said cryptographic accelerator for decryption; and
a user interface coupled to the processor.

52. A communications apparatus, comprising;
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel, wherein said hash accelerator supplies an interrupt request, and said processor is responsive to the interrupt request to read the hash result directly from the hashing accelerator; and
a user interface coupled to the processor.

53. A communications apparatus, comprising:
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel;
an external volatile memory coupled to said secure memory to receive pages from said secure memory hashed by said hash accelerator and encrypted by said cryptographic accelerator; and
a user interface coupled to the processor.

54. A communications apparatus, comprising:
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel;
an external memory coupled to said secure memory to feed pages from said external memory to said secure memory, the pages decrypted by said cryptographic accelerator and hash-checked by said hash accelerator in parallel; and
a user interface coupled to the processor.

55. A communications apparatus, comprising:
an antenna;
a receiver and a transmitter coupled to said antenna;
a processor coupled to the receiver and transmitter, said processor having a cryptographic accelerator and a hash accelerator;
a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel;
a source of rotating cryptographic keys coupled to said cryptographic accelerator; and
a user interface coupled to the processor.

56. A communications apparatus, comprising:
an antenna;
a receiver and a transmitter coupled to said antenna;
a processor coupled to the receiver and transmitter, said processor having a cryptographic accelerator and a hash accelerator;

a secure memory coupled to said processor and coupled to transfer the same secure memory data to the cryptographic accelerator and the hash accelerator in parallel, the hashing accelerator operable to securely deliver a hash result directly to said processor, wherein the hash accelerator is further operable to perform a hash on identification information before said transfer in parallel;

a source of rotating cryptographic keys coupled to said hash accelerator; and a user interface coupled to the processor.

\* \* \* \* \*